US010660044B2

United States Patent
MolavianJazi et al.

(10) Patent No.: US 10,660,044 B2
(45) Date of Patent: May 19, 2020

(54) POWER CONTROL CONFIGURATION FOR UPLINK TRANSMISSIONS

(71) Applicant: Lenovo (Singapore) PTE. LTD., New Tech Park (SG)

(72) Inventors: Ebrahim MolavianJazi, Lincolnwood, IL (US); Hyejung Jung, Palatine, IL (US); Vijay Nangia, Woodridge, IL (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 16/195,751

(22) Filed: Nov. 19, 2018

(65) Prior Publication Data

US 2019/0159136 A1 May 23, 2019

Related U.S. Application Data

(60) Provisional application No. 62/588,288, filed on Nov. 17, 2017.

(51) Int. Cl.
*H04W 52/14* (2009.01)
*H04W 52/36* (2009.01)
(Continued)

(52) U.S. Cl.
CPC .......... *H04W 52/146* (2013.01); *H04L 5/001* (2013.01); *H04W 52/08* (2013.01); *H04W 52/10* (2013.01);
(Continued)

(58) Field of Classification Search
CPC ... H04W 52/14; H04W 52/08; H04W 52/146; H04W 52/367
(Continued)

(56) References Cited

U.S. PATENT DOCUMENTS 8,310,996 B2    11/2012  Nanda et al.
2012/0033629 A1  2/2012  Yajima et al.
(Continued)

FOREIGN PATENT DOCUMENTS

WO    2017196065 A1    11/2017

OTHER PUBLICATIONS

International Searching Authority, "Notification of Transmittal of the International Search Report and the Written Opinion of the International Searching Authority, or the Declaration", PCT/IB2018/001440, dated Apr. 18, 2019, pp. 1-43.
(Continued)

*Primary Examiner* — John J Lee
(74) *Attorney, Agent, or Firm* — Kunzler Bean & Adamson

(57) ABSTRACT

Apparatuses, methods, and systems are disclosed for transmission power control. One method includes receiving a first configuration indicating a plurality of bandwidth parts on a first serving cell and configuration information corresponding to the plurality of bandwidth parts. The configuration information comprises an open-loop power control configuration, a closed loop power control configuration, or a combination thereof corresponding to each bandwidth part of the plurality of bandwidth parts. The method comprises receiving scheduling information for a first uplink transmission on a first bandwidth part of the plurality of bandwidth parts. The method comprises determining a first transmission power for the first uplink transmission based on the configuration information and the scheduling information. The method comprises performing the first uplink transmission with the first transmission power.

25 Claims, 13 Drawing Sheets

(51) Int. Cl.

| | |
|---|---|
| *H04L 5/00* | (2006.01) |
| *H04W 52/08* | (2009.01) |
| *H04W 52/10* | (2009.01) |
| *H04W 52/24* | (2009.01) |
| *H04W 72/12* | (2009.01) |
| *H04B 7/06* | (2006.01) |
| *H04W 52/28* | (2009.01) |
| *H04W 52/38* | (2009.01) |
| *H04W 52/34* | (2009.01) |
| *H04W 52/26* | (2009.01) |

(52) U.S. Cl.
CPC ....... *H04W 52/242* (2013.01); *H04W 52/362* (2013.01); *H04W 52/365* (2013.01); *H04W 52/367* (2013.01); *H04W 72/1284* (2013.01); *H04B 7/0617* (2013.01); *H04L 5/0053* (2013.01); *H04L 5/0092* (2013.01); *H04W 52/265* (2013.01); *H04W 52/281* (2013.01); *H04W 52/34* (2013.01); *H04W 52/38* (2013.01)

(58) Field of Classification Search
USPC .......... 455/452.1, 509, 522, 69, 422.1, 67.11
See application file for complete search history.

(56) References Cited

U.S. PATENT DOCUMENTS

| | | | |
|---|---|---|---|
| 2016/0029239 A1* | 1/2016 | Sadeghi ................ | H04W 24/10 370/252 |
| 2016/0192386 A1 | 6/2016 | Kim et al. | |
| 2016/0262172 A1 | 9/2016 | Yan et al. | |
| 2019/0159135 A1 | 5/2019 | MolavianJazi et al. | |
| 2019/0159138 A1* | 5/2019 | Lee ..................... | H04W 52/146 |
| 2019/0230600 A1* | 7/2019 | Gao ..................... | H04L 5/0055 |

OTHER PUBLICATIONS

International Searching Authority, "Notification of Transmittal of the International Search Report and the Written Opinion of the International Searching Authority, or the Declaration", PCT/IB2018/001444, dated Apr. 5, 2019, pp. 1-14.
Catt, "Uplink power control discussions for CoMP", 3GPP TSG RAN WG1 Meeting #66bis R1-112964, Oct. 10-14, 2011, pp. 1-5.
Huawei, Hilsilicon, "UL power control for short TTI", 3GPP TSG RAN WG1 Meeting #88 R1-1701738, Feb. 13-17, 2017, pp. 1-4.
Samsung, "Power Control for Multiplexing of eMBB and URLLC", GPP TSG RAN WG1 Meeting #88 R1-1702995, Feb. 13-17, 2017, pp. 1-6.
Samsung, "Power Control for Transmissions with Different Numerologies", 3GPP TSG RAN WG1 Meeting #89 R1-1708065, May 15-19, 2017, pp. 1-5.
Samsung, "Power Control for UL CA", 3GPP TSG RAN WG1 #89 R1-1708067, May 15-19, 2017, pp. 1-3.
ZTE, "Power Control for CA and DC in NR", 3GPP TSG RAN WG1 NR Ad-Hoc#2 R1-1710911, Jun. 27-30, 2017, pp. 1-5.
Interdigital, Inc. "On Efficient UL Beam Management", 3GPP TSG RAN WG1 Meeting #90 R1-1714143, Aug. 21-25, 2017, pp. 1-4.
Huawei, Hilsilicon, "Power control for CA and DC", 3GPP TSG RAN WG1 Meeting 90bis R1-1717312, Oct. 9-13, 2017, pp. 1-5.
Samsung, "On UL Power Sharing for Multi-Cell Transmissions", 3GPP TSG RAN WG1 #90bis R1-1717693, Oct. 9-13, pp. 1-3.
Interdigital, Inc., "Power Control Modes for NR DC and NR CA", 3GPP TSG RAN WG1 Meeting 90bis R1-1718366 (R1-1716259), dated Oct. 9-13, 2017, pp. 1-7.
U.S. Appl. No. 16/195,746, "Office Action Summary", USPTO, dated Aug. 7, 2019, pp. 1-17.

* cited by examiner

POWER CONTROL CONFIGURATION FOR UPLINK TRANSMISSIONS

CROSS-REFERENCE TO RELATED APPLICATIONS

This application claims priority to U.S. Patent Application Ser. No. 62/588,288 entitled "UPLINK TRANSMISSION POWER CONTROL" and filed on Nov. 17, 2017 for Ebrahim MolavianJazi, which is incorporated herein by reference in its entirety.

FIELD

The subject matter disclosed herein relates generally to wireless communications and more particularly relates to transmission power control.

BACKGROUND

The following abbreviations are herewith defined, at least some of which are referred to within the following description: Third Generation Partnership Project ("3GPP"), 5$^{th}$ Generation ("5G"), Positive-Acknowledgment ("ACK"), Angle of Arrival ("AoA"), Angle of Departure ("AoD"), Additional MPR ("A-MPR"), Access Point ("AP"), Beam Failure Recovery ("BFR"), Binary Phase Shift Keying ("BPSK"), Buffer Status Report ("BSR"), Bandwidth ("BW"), Bandwidth Part ("BWP"), Carrier Aggregation ("CA"), Contention-Based Random Access ("CBRA"), Component Carrier ("CC"), Clear Channel Assessment ("CCA"), Cyclic Delay Diversity ("CDD"), Code Division Multiple Access ("CDMA"), Control Element ("CE"), Contention-Free Random Access ("CFRA"), Cell Group ("CG"), Closed-Loop ("CL"), Coordinated Multipoint ("CoMP"), Cyclic Prefix ("CP"), Cyclical Redundancy Check ("CRC"), Channel State Information ("CSI"), Common Search Space ("CSS"), Control Resource Set ("CORESET"), Discrete Fourier Transform Spread ("DFTS"), Dual Connectivity ("DC"), Downlink Control Information ("DCI"), Downlink ("DL"), Demodulation Reference Signal ("DMRS"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), General Packet Radio Services ("GPRS"), Guard Period ("GP"), Global System for Mobile Communications ("GSM"), Hybrid Automatic Repeat Request ("HARQ"), Identity or Identifier ("ID"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Machine Type Communication ("MTC"), massive MTC ("mMTC"), Multiple Input Multiple Output ("MIMO"), Maximum Power Reduction ("MPR"), Multi User Shared Access ("MUSA"), Narrowband ("NB"), Negative-Acknowledgment ("NACK") or ("NAK"), Next Generation Node B ("gNB"), Network Entity ("NE"), Non-Orthogonal Multiple Access ("NOMA"), New Radio ("NR"), Orthogonal Frequency Division Multiplexing ("OFDM"), Open-Loop ("OL"), Other System Information ("OSI"), Power Amplifier ("PA"), Power Angular Spectrum ("PAS"), Power Control ("PC"), Primary Cell ("PCell"), Physical Cell ID ("PCID"), Physical Broadcast Channel ("PBCH"), Physical Downlink Control Channel ("PDCCH"), Packet Data Convergence Protocol ("PDCP"), Physical Downlink Shared Channel ("PDSCH"), Pattern Division Multiple Access ("PDMA"), Physical Hybrid ARQ Indicator Channel ("PHICH"), Power Headroom ("PH"), Power Headroom Report ("PHR"), Physical Layer ("PHY"), Physical Random Access Channel ("PRACH"), Physical Resource Block ("PRB"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Radio Access Network ("RAN"), Radio Access Technology ("RAT"), Resource Element ("RE"), Radio Resource Control ("RRC"), Random Access Procedure ("RACH"), Random Access Response ("RAR"), Radio Link Control ("RLC"), Radio Link Monitoring ("RLM"), Radio Network Temporary Identifier ("RNTI"), Radio Resource Management ("RIM"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), Signal-to-Interference-Plus-Noise Ratio ("SINR"), System Information Block ("SIB"), SRS Resource Indicator ("SRI"), Synchronization Signal ("SS"), Synchronization Signal Block ("SSB"), Supplementary Uplink ("SUL"), Timing Advance Group ("TAG"), Transport Block ("TB"), Transport Block Size ("TBS"), Transmission Configuration Indicator ("TCI"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX").

In certain wireless communications networks, multiple transmissions may occur simultaneously. In such networks, uplink power control may be complicated.

BRIEF SUMMARY

Methods for transmission power control are disclosed. Apparatuses and systems also perform the functions of the apparatus. One embodiment of a method includes receiving first scheduling information for a first uplink transmission on a first serving cell at a first time instant. In such an embodiment, the first scheduling information comprises a first transmission period and a first numerology. In some embodiments, the method comprises receiving second scheduling information for a second uplink transmission on a second serving cell at a second time instant. In such embodiments, the second scheduling information comprises a second transmission period and a second numerology, and the first transmission period at least partially overlaps the second transmission period. In certain embodiments, the method comprises determining a first transmission power for the first uplink transmission based at least partly on the first scheduling information. In various embodiments, the method comprises transmitting a first portion of the first uplink transmission with the first transmission power during a first time period in which the first transmission period does not overlap with the second transmission period. In such embodiments, a first total transmission power during the first time period equals the first transmission power. In one embodiment, the method comprises transmitting a second portion of the first uplink transmission during a second time period in which the first transmission period overlaps with the second transmission period. In such an embodiment: a second total transmission power during the second time period is greater than or equal to the first total transmission power; and, in response to the second total transmission power being equal to the first total transmission power, the second portion of the first uplink transmission is transmitted with a transmission power less than the first transmission power.

One apparatus for transmission power control includes a receiver that: receives first scheduling information for a first uplink transmission on a first serving cell at a first time instant, wherein the first scheduling information comprises a first transmission period and a first numerology; and receives second scheduling information for a second uplink transmission on a second serving cell at a second time instant. In such an embodiment, the second scheduling information comprises a second transmission period and a second numerology, and the first transmission period at least partially overlaps the second transmission period. In some embodiments, the apparatus comprises a processor that determines a first transmission power for the first uplink transmission based at least partly on the first scheduling information. In certain embodiments, the apparatus comprises a transmitter that: transmits a first portion of the first uplink transmission with the first transmission power during a first time period in which the first transmission period does not overlap with the second transmission period, wherein a first total transmission power during the first time period equals the first transmission power; and transmits a second portion of the first uplink transmission during a second time period in which the first transmission period overlaps with the second transmission period. In such embodiments: a second total transmission power during the second time period is greater than or equal to the first total transmission power; and, in response to the second total transmission power being equal to the first total transmission power, the second portion of the first uplink transmission is transmitted with a transmission power less than the first transmission power.

One method for transmission power control includes transmitting first scheduling information for a first uplink transmission on a first serving cell at a first time instant. In such an embodiment, the first scheduling information comprises a first transmission period and a first numerology. In various embodiments, the method comprises transmitting second scheduling information for a second uplink transmission on a second serving cell at a second time instant. In such embodiments, the second scheduling information comprises a second transmission period and a second numerology, and the first transmission period at least partially overlaps the second transmission period. In certain embodiments, the method comprises receiving a first portion of the first uplink transmission with a first transmission power during a first time period in which the first transmission period does not overlap with the second transmission period. In such embodiments, the first transmission power is based at least partly on the first scheduling information, and a first total transmission power during the first time period equals the first transmission power. In some embodiments, the method comprises receiving a second portion of the first uplink transmission during a second time period in which the first transmission period overlaps with the second transmission period. In such embodiments: a second total transmission power during the second time period is greater than or equal to the first total transmission power; and, in response to the second total transmission power being equal to the first total transmission power, the second portion of the first uplink transmission is received with a transmission power less than the first transmission power.

One apparatus for transmission power control includes a transmitter that: transmits first scheduling information for a first uplink transmission on a first serving cell at a first time instant, wherein the first scheduling information comprises a first transmission period and a first numerology; and transmits second scheduling information for a second uplink transmission on a second serving cell at a second time instant. In such an embodiment, the second scheduling information comprises a second transmission period and a second numerology, and the first transmission period at least partially overlaps the second transmission period. In certain embodiments, the apparatus comprises a receiver that: receives a first portion of the first uplink transmission with a first transmission power during a first time period in which the first transmission period does not overlap with the second transmission period, wherein the first transmission power is based at least partly on the first scheduling information, and a first total transmission power during the first time period equals the first transmission power; and receives a second portion of the first uplink transmission during a second time period in which the first transmission period overlaps with the second transmission period. In such embodiments: a second total transmission power during the second time period is greater than or equal to the first total transmission power; and, in response to the second total transmission power being equal to the first total transmission power, the second portion of the first uplink transmission is received with a transmission power less than the first transmission power.

One method for transmission power control includes receiving a first configuration indicating a plurality of bandwidth parts on a first serving cell and configuration information corresponding to the plurality of bandwidth parts. In such embodiments, the configuration information comprises an open-loop power control configuration, a closed loop power control configuration, or a combination thereof corresponding to each bandwidth part of the plurality of bandwidth parts. In some embodiments, the method comprises receiving scheduling information for a first uplink transmission on a first bandwidth part of the plurality of bandwidth parts. In certain embodiments, the method comprises determining a first transmission power for the first uplink transmission based on the configuration information and the scheduling information. In various embodiments, the method comprises performing the first uplink transmission with the first transmission power.

One apparatus for transmission power control includes a receiver that: receives a first configuration indicating a plurality of bandwidth parts on a first serving cell and configuration information corresponding to the plurality of bandwidth parts, wherein the configuration information comprises an open-loop power control configuration, a closed loop power control configuration, or a combination thereof corresponding to each bandwidth part of the plurality of bandwidth parts; and receives scheduling information for a first uplink transmission on a first bandwidth part of the plurality of bandwidth parts. In some embodiments, the apparatus comprises a processor that: determines a first transmission power for the first uplink transmission based on the configuration information and the scheduling information; and performs the first uplink transmission with the first transmission power.

One method for transmission power control includes transmitting a first configuration indicating a plurality of bandwidth parts on a first serving cell and configuration information corresponding to the plurality of bandwidth parts. In such an embodiment, the configuration information comprises an open-loop power control configuration, a closed loop power control configuration, or a combination thereof corresponding to each bandwidth part of the plurality of bandwidth parts. In various embodiments, the method comprises transmitting scheduling information for a first uplink transmission on a first bandwidth part of the plurality of bandwidth parts. In certain embodiments, the method comprises receiving the first uplink transmission with a first transmission power. In such embodiments, the first transmission power is determined based on the configuration information and the scheduling information.

One apparatus for transmission power control includes a transmitter that: transmits a first configuration indicating a plurality of bandwidth parts on a first serving cell and configuration information corresponding to the plurality of bandwidth parts, wherein the configuration information comprises an open-loop power control configuration, a closed loop power control configuration, or a combination thereof corresponding to each bandwidth part of the plurality of bandwidth parts; and transmits scheduling information for a first uplink transmission on a first bandwidth part of the plurality of bandwidth parts. In some embodiments, the apparatus comprises a receiver that receives the first uplink transmission with a first transmission power, wherein the first transmission power is determined based on the configuration information and the scheduling information.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
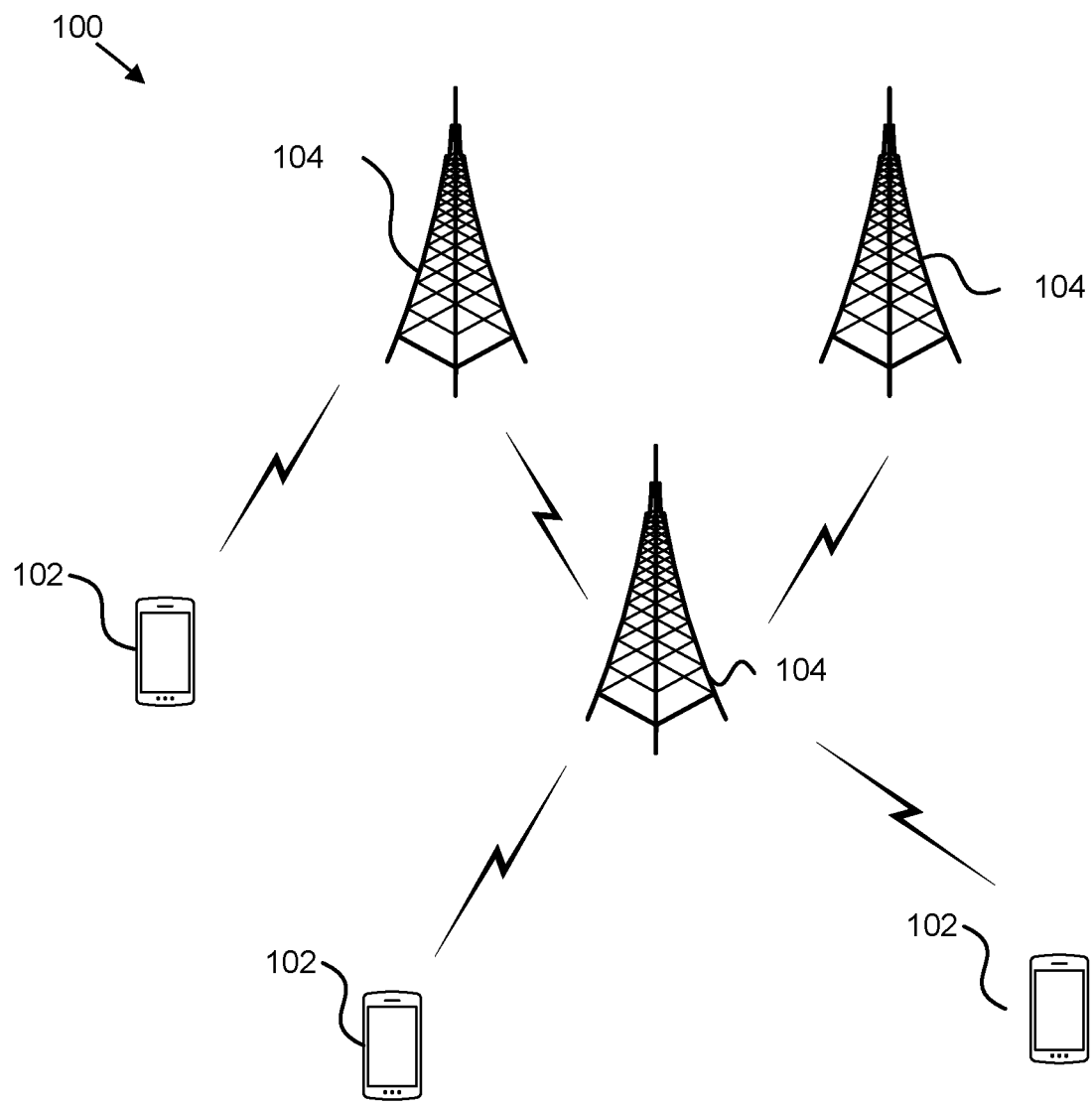
FIG. 1 is a schematic block diagram illustrating one embodiment of a wireless communication system for transmission power control.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmission power control. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may receive first scheduling information for a first uplink transmission on a first serving cell at a first time instant. In such an embodiment, the first scheduling information comprises a first transmission period and a first numerology. In some embodiments, the remote unit 102 may receive second scheduling information for a second uplink transmission on a second serving cell at a second time instant. In such embodiments, the second scheduling information comprises a second transmission period and a second numerology, and the first transmission period at least partially overlaps the second transmission period. In certain embodiments, the remote unit 102 may determine a first transmission power for the first uplink transmission based at least partly on the first scheduling information. In various embodiments, the remote unit 102 may transmit a first portion of the first uplink transmission with the first transmission power during a first time period in which the first transmission period does not overlap with the second transmission period. In such embodiments, a first total transmission power during the first time period equals the first transmission power. In one embodiment, the remote unit 102 may transmit a second portion of the first uplink transmission during a second time period in which the first transmission period overlaps with the second transmission period. In such an embodiment: a second total transmission power during the second time period is greater than or equal to the first total transmission power; and, in response to the second total transmission power being equal to the first total transmission power, the second portion of the first uplink transmission is transmitted with a transmission power less than the first transmission power. Accordingly, the remote unit 102 may be used for transmission power control.

In certain embodiments, a network unit 104 may transmit first scheduling information for a first uplink transmission on a first serving cell at a first time instant. In such embodiments, the first scheduling information comprises a first transmission period and a first numerology. In various embodiments, the network unit 104 may transmit second scheduling information for a second uplink transmission on a second serving cell at a second time instant. In such embodiments, the second scheduling information comprises a second transmission period and a second numerology, and the first transmission period at least partially overlaps the second transmission period. In certain embodiments, the network unit 104 may receive a first portion of the first uplink transmission with a first transmission power during a first time period in which the first transmission period does not overlap with the second transmission period. In such embodiments, the first transmission power is based at least partly on the first scheduling information, and a first total transmission power during the first time period equals the first transmission power. In some embodiments, the network unit 104 may receive a second portion of the first uplink transmission during a second time period in which the first transmission period overlaps with the second transmission period. In such embodiments: a second total transmission power during the second time period is greater than or equal to the first total transmission power; and, in response to the second total transmission power being equal to the first total transmission power, the second portion of the first uplink transmission is received with a transmission power less than the first transmission power. Accordingly, the network unit 104 may be used for transmission power control.

In one embodiment, a remote unit 102 may receive a first configuration indicating a plurality of bandwidth parts on a first serving cell and configuration information corresponding to the plurality of bandwidth parts. In such an embodiment, the configuration information comprises an open-loop power control configuration, a closed loop power control configuration, or a combination thereof corresponding to each bandwidth part of the plurality of bandwidth parts. In some embodiments, the remote unit 102 may receive scheduling information for a first uplink transmission on a first bandwidth part of the plurality of bandwidth parts. In certain embodiments, the remote unit 102 may determine a first transmission power for the first uplink transmission based on the configuration information and the scheduling information. In various embodiments, the remote unit 102 may perform the first uplink transmission with the first transmission power. Accordingly, the remote unit 102 may be used for transmission power control.

In certain embodiments, a network unit 104 may transmitting a first configuration indicating a plurality of bandwidth parts on a first serving cell and configuration information corresponding to the plurality of bandwidth parts. In such embodiments, the configuration information comprises an open-loop power control configuration, a closed loop power control configuration, or a combination thereof corresponding to each bandwidth part of the plurality of bandwidth parts. In various embodiments, the network unit 104 may transmit scheduling information for a first uplink transmission on a first bandwidth part of the plurality of bandwidth parts. In certain embodiments, the network unit 104 may receive the first uplink transmission with a first transmission power. In such embodiments, the first transmission power is determined based on the configuration information and the scheduling information. Accordingly, the network unit 104 may be used for transmission power control.

Figure 2:
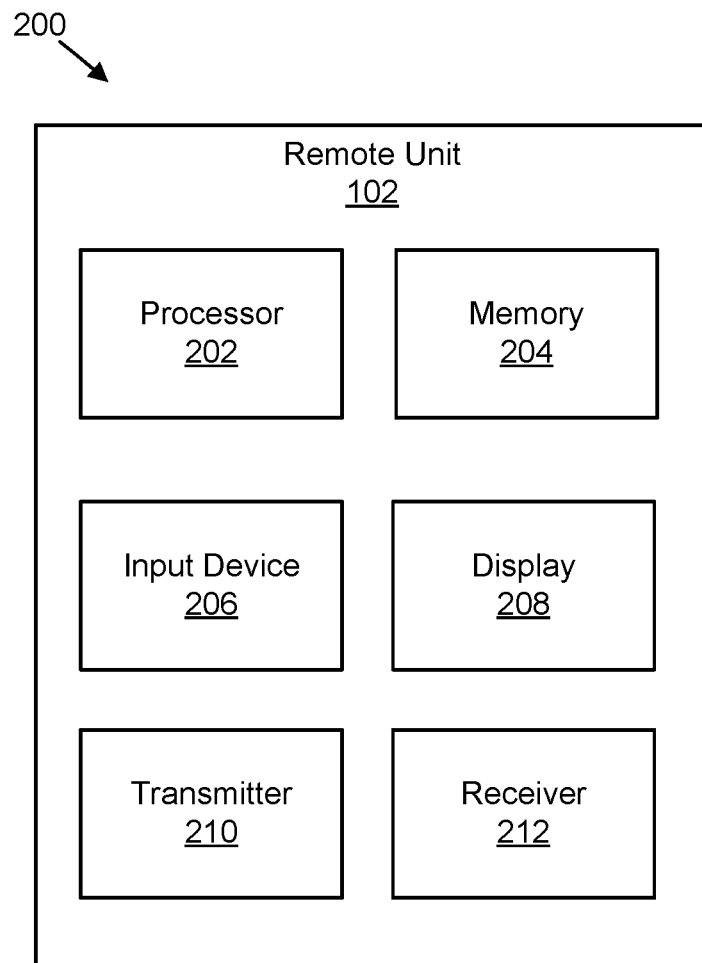
FIG. 2 is a schematic block diagram illustrating one embodiment of an apparatus that may be used for transmission power control.

FIG. 2 depicts one embodiment of an apparatus 200 that may be used for transmission power control. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may determine a first transmission power for a first uplink transmission based at least partly on first scheduling information. In certain embodiments, the processor 202 may: determine a first transmission power for a first uplink transmission based on configuration information and scheduling information; and perform the first uplink transmission with a first transmission power. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212: receives first scheduling information for a first uplink transmission on a first serving cell at a first time instant, wherein the first scheduling information comprises a first transmission period and a first numerology; and receives second scheduling information for a second uplink transmission on a second serving cell at a second time instant. In such an embodiment, the second scheduling information comprises a second transmission period and a second numerology, and the first transmission period at least partially overlaps the second transmission period. In certain embodiments, the transmitter 210: transmits a first portion of the first uplink transmission with the first transmission power during a first time period in which the first transmission period does not overlap with the second transmission period, wherein a first total transmission power during the first time period equals the first transmission power; and transmits a second portion of the first uplink transmission during a second time period in which the first transmission period overlaps with the second transmission period. In such embodiments: a second total transmission power during the second time period is greater than or equal to the first total transmission power; and, in response to the second total transmission power being equal to the first total transmission power, the second portion of the first uplink transmission is transmitted with a transmission power less than the first transmission power.

In one embodiment, the receiver 212: receives a first configuration indicating a plurality of bandwidth parts on a first serving cell and configuration information corresponding to the plurality of bandwidth parts, wherein the configuration information comprises an open-loop power control configuration, a closed loop power control configuration, or a combination thereof corresponding to each bandwidth part of the plurality of bandwidth parts; and receives scheduling information for a first uplink transmission on a first bandwidth part of the plurality of bandwidth parts.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
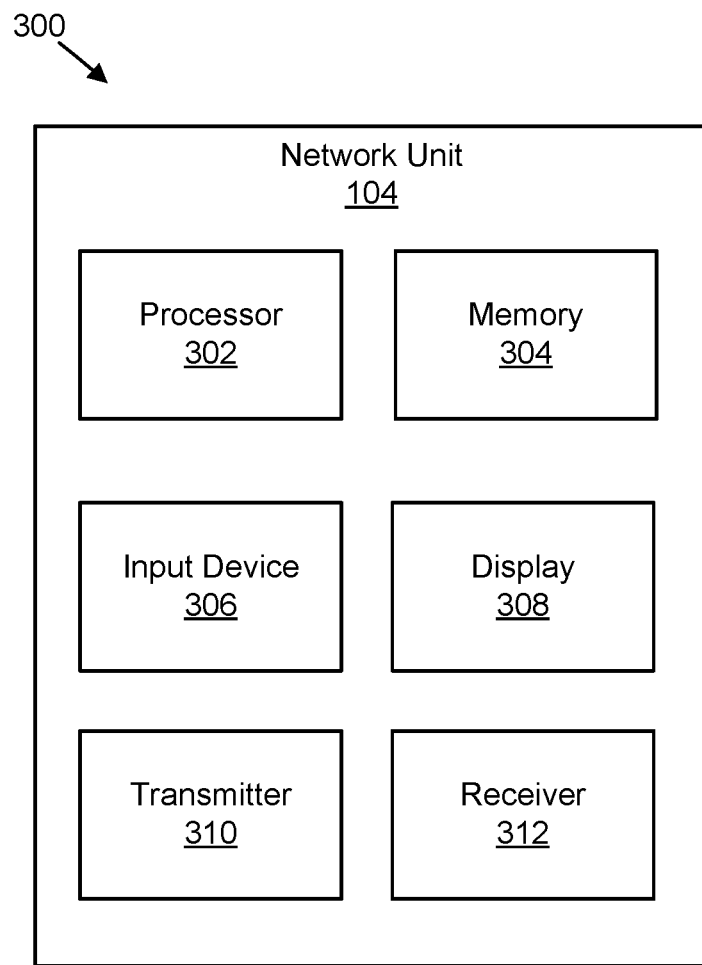
FIG. 3 is a schematic block diagram illustrating one embodiment of an apparatus that may be used for transmission power control.

FIG. 3 depicts one embodiment of an apparatus 300 that may be used for transmission power control. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310: transmits first scheduling information for a first uplink transmission on a first serving cell at a first time instant, wherein the first scheduling information comprises a first transmission period and a first numerology; and transmits second scheduling information for a second uplink transmission on a second serving cell at a second time instant. In such an embodiment, the second scheduling information comprises a second transmission period and a second numerology, and the first transmission period at least partially overlaps the second transmission period. In certain embodiments, the receiver 312: receives a first portion of the first uplink transmission with a first transmission power during a first time period in which the first transmission period does not overlap with the second transmission period, wherein the first transmission power is based at least partly on the first scheduling information, and a first total transmission power during the first time period equals the first transmission power; and receives a second portion of the first uplink transmission during a second time period in which the first transmission period overlaps with the second transmission period. In such embodiments: a second total transmission power during the second time period is greater than or equal to the first total transmission power; and, in response to the second total transmission power being equal to the first total transmission power, the second portion of the first uplink transmission is received with a transmission power less than the first transmission power.

In some embodiments, the transmitter 310: transmits a first configuration indicating a plurality of bandwidth parts on a first serving cell and configuration information corresponding to the plurality of bandwidth parts, wherein the configuration information comprises an open-loop power control configuration, a closed loop power control configuration, or a combination thereof corresponding to each bandwidth part of the plurality of bandwidth parts; and transmits scheduling information for a first uplink transmission on a first bandwidth part of the plurality of bandwidth parts. In some embodiments, the receiver 312 receives the first uplink transmission with a first transmission power, wherein the first transmission power is determined based on the configuration information and the scheduling information.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

As used herein, in some embodiments, a TX beam and RX beam correspondence configured at a TRP and a UE may be as follows: a TX beam and RX beam correspondence at a TRP may be maintained if at least one of the following is satisfied: 1) the TRP is able to determine a TRP RX beam for uplink reception based on a UE's downlink measurement on the TRP's one or more TX beams; and 2) the TRP is able to determine a TRP TX beam for downlink transmission based on the TRP's uplink measurement on the TRP's one or more RX beams; and a TX beam and RX beam correspondence at a UE may be maintained if at least one of the following is satisfied: 1) the UE is able to determine a UE TX beam for an uplink transmission based on the UE's downlink measurement on the UE's one or more RX beams; and the UE is able to determine a UE RX beam for downlink reception based on the TRP's indication based on an uplink measurement on the UE's one or more TX beams.

Moreover, as used herein, an antenna port may be defined such that a channel over which a symbol on the antenna port is conveyed may be inferred from a channel over which another symbol on the same antenna port is conveyed.

Furthermore, as used herein, two antenna ports may be considered QCL if large-scale properties of a channel over which a symbol on one antenna port is conveyed may be inferred from the channel over which a symbol on the other antenna port is conveyed. The large-scale properties may include one or more of: delay spread, doppler spread, doppler shift, average gain, average delay, and spatial RX parameters. In addition, two antenna ports may be QCL with respect to a subset of the large-scale properties. Moreover, spatial RX parameters may include one or more of: AoA, dominant AoA, average AoA, angular spread, PAS of AoA, average AoD, PAS of AoD, transmit and/or receive channel correlation, transmit and/or receive beamforming, spatial channel correlation, and so forth.

As used herein, an antenna port may be a logical port that may correspond to a beam (resulting from beamforming) or may correspond to a physical antenna on a device. In some embodiments, a physical antenna may be mapped directly to a single antenna port. In such embodiments, an antenna port corresponds to an actual physical antenna. In certain embodiments, a set of physical antennas, a subset of physical antennas, an antenna set, an antenna array, or an antenna sub-array may be mapped to one or more antenna ports after applying complex weighting, a cyclic delay, or both to a signal on each physical antenna. In some embodiments, a physical antenna set may have antennas from a single module, a single panel, multiple modules, or multiple panels. The weights may be fixed as in an antenna virtualization scheme, such as CDD. In some embodiments, a procedure used to determine antenna ports corresponding to physical antennas may be specific to a device implementation and may be transparent to other devices.

In some embodiments, DL TX antenna ports may correspond to antenna ports of a single CSI-RS resource, or antenna ports of different CSI-RS resources (e.g., a first subset including at least one DL TX antenna port corresponding to a first CSI-RS resource, and a second subset including at least one DL TX antenna port corresponding to a second CSI-RS resource).

In certain embodiments, a DL TX antenna port may be associated with one or more SS blocks. In such embodiments, each SS block may have a corresponding SS block index (e.g., a number or value that indicates an SS block). In various embodiments, an antenna port associated with a first SS block (e.g., having a first SS block index) may correspond to a first DL TX beam (e.g., beamforming pattern), and an antenna port associated with a second SS block (e.g., having a second SS block index) may correspond to a second DL TX beam. In such embodiments, depending on the SS block, an antenna port may correspond to different DL TX beams (e.g., the first DL TX beam or the second DL TX beam). As may be appreciated, the first DL TX beam may be different from the second DL TX beam. Furthermore, the first SS block may be different from the second SS block resulting in the first SS block index being different from the second SS block index. In some embodiments, a first SS block may be transmitted at a first time instance and a second SS block may be transmitted at a second time instance. In other embodiments, first and second SS block transmission instances may overlap either completely or at least partially. In one embodiment, a UE may assume that any transmission instance of an SS block with the same SS block index is transmitted on the same antenna port. In certain embodiments, a UE may not assume that a channel over which a first SS block with a first SS block index is conveyed may be inferred from a channel over a second SS block with a second SS block index (e.g., the second SS block index is different from the first SS block index) is conveyed even if the first and second SS blocks are transmitted on the same antenna port.

In various embodiments, a DL TX antenna port may be associated with one or more CSI-RS resources. In some embodiments, an antenna port associated with a first CSI-RS resource (e.g., having a first CSI-RS resource index) may correspond to a first DL TX beam (e.g., beamforming pattern), and an antenna port associated with a second CSI-RS resource (e.g., having a second CSI-RS resource index) may correspond to a second DL TX beam. In such embodiments, depending on the CSI-RS resource, an antenna port may correspond to different DL TX beams (e.g., the first DL TX beam or the second DL TX beam. As may be appreciated, the first DL TX beam may be different from the second DL TX beam. Furthermore, the first CSI-RS resource may be different from the second CSI-RS resource resulting in the first CSI-RS resource index being different from the second CSI-RS resource index. In some embodiments, the first CSI-RS resource may be transmitted at a first time instance and the second CSI-RS resource may be transmitted at a second time instance. In other embodiments, first and second CSI-RS resource transmission instances may overlap either completely or at least partially. In one embodiment, a UE may assume that any transmission instance of a CSI-RS resource with the same CSI-RS resource index is transmitted on the same antenna port. In certain embodiments, a UE may not assume that a channel over which a first CSI-RS resource with a first CSI-RS resource index is conveyed may be inferred from a channel over a second CSI-RS resource with a second CSI-RS resource index (e.g., the second CSI-RS resource index is different from the first CSI-RS resource index) is conveyed even if the first and second CSI-RS resources are transmitted on the same antenna port.

In various configurations, such as 5G NR RAT that supports both single carrier and multiple carrier operations, a UE may communicate with one or more serving cells to enhance coverage, facilitate efficient use of a spectrum, support various network deployments, access different services, and/or access different traffic types. In such configurations, CA may provide a framework for the UE to operate with multiple CCs in a coherent fashion. In certain configurations, there may be three different modes of operation for CA that include: intra-band contiguous CA, intra-band non-contiguous CA, and inter-band CA. In some embodiments, such as for intra-band contiguous CA and/or intra-band non-contiguous CA, a UE may have a single PA for operating on one or more CCs. In various embodiments, such as for inter-band CA and/or intra-band non-contiguous CA, a UE may have different PAs for operating on one or more CCs.

In some configurations, such as in an LTE-CA framework, there may be one or more of fixed slots, subframe sizes, fixed numerologies, SCSs, and/or fixed grant-to-transmission timing offsets for different serving cells. In various configurations, such as for intra-band contiguous CA, a UE may handle a delay spread of up to 0.26 us among different component carriers (e.g., monitored at a receiver), and for intra-band non-contiguous CA and inter-band CA, a UE may handle a delay spread of up to 30.26 us among different component carriers (e.g., monitored at the receiver). Such a delay spread of up to 30.26 us may be at most half an LTE-symbol.

In various configurations, such as in a 5G-NR CA framework, a slot size may vary (e.g., the slot size may have between 2 and 14 symbols), a numerology and/or an SCS may be different, and/or a grant-to-transmission timing offset may be different for different serving cells. In some configurations, multiple services may be offered with different performance requirements and/or priorities. Therefore, in some embodiments, a UE operating with NR-CA may use multiple heterogeneous UL transmissions for different serving cells. These heterogeneous UL transmissions may be categorized into the following categories: (i) slot-level synchronous and/or symbol-level synchronous, and/or (ii) slot-level asynchronous and/or symbol-level asynchronous. As may be appreciated, starting times of different UL transmissions for different serving cells may be different. According, various heterogeneous overlapping UL transmissions may be categorized as slot-level asynchronous and/or symbol-level asynchronous. Thus, a UE (e.g., in a 5G-NR CA framework) may be designed to handle a transmission timing offset of up to 500 us between the two CGs.

In various embodiments, a missing element in various solutions for heterogeneous UL transmissions (e.g., in a 5G-NR CA framework) may be that an abrupt phase change in the PA, that may be caused by suddenly changing from a certain total power level for one set of transmissions to a certain different total power level for another set of transmissions, may not be addressed. Such an abrupt phase change invalidates the previous channel estimation and prevents the coherent demodulation facilitated by a previous DMRS to be applicable for the second set of transmissions. Note that, not puncturing the DMRS or keeping a constant power for DMRS cannot resolve this issue. As described herein, a fixed total power for a power amplifier may be kept in order to avoid phase discontinuity, or "additional" DMRS may be inserted in the transmissions, e.g., immediately at the beginning of the second set of transmissions (and in general, immediately following any abrupt power change to the PA), if there is an abrupt power change and/or phase change/discontinuity.

In some embodiments, to facilitate diverse heterogeneous UL transmissions that overlap in time and each have certain SINR requirements, appropriate power allocation for UE transmissions may be important. In certain embodiments, a UE may ensure that, regardless of an operating mode and diverse heterogeneous UL transmissions, maximum transmission power levels per serving cell and a total power level for all serving cells set by a network are adhered to.

Various methods described herein present, for a UE in a wireless network (e.g., 5G NR) operated with multiple CCs in a CA fashion, power allocation methods for overlapping UL transmissions with different durations, required power levels, and/or priorities for a UE with single/multiple PA(s), along with qualitative criteria for the network/UE to select an appropriate method based on the properties of different transmissions. In various methods, a key focus may be to make sure appropriate channel estimation and coherent decoding is always guaranteed irrespective of the varying transmission powers and the resulting phase discontinuity.

Various methods described herein relate to configurations in which a UE performs one or more heterogeneous UL transmissions at the same time (e.g., multiplexing of slot based PUSCH, non-slot based PUSCH, long PUCCH, short PUCCH, the same SCS among UL transmissions, and/or different SCS among UL transmissions). The one or more heterogeneous UL transmissions either at least partially overlap in time or fully overlap in time, and each UL transmission of the one or more heterogeneous UL transmissions may have a different duration, a different required transmit power, and/or a different priority. The one or more heterogeneous UL transmissions may occur within one serving cell and/or across different serving cells of different carrier frequencies. The different carrier frequencies may be in the same frequency band or different frequency bands. In one embodiment, if one or more heterogeneous transmissions occur within one cell or across different cells of intra-band contiguous CA and/or co-located cells, symbol timing of one UL transmission of a longer symbol duration may be aligned with symbol timing of another UL transmission of a shorter symbol duration (e.g., if the serving cells are in the same TAG). In another embodiment, if one or more heterogeneous transmissions occur across different cells of intra-band non-contiguous CA and/or non-co-located cells, symbol timing of one UL transmission of a longer symbol duration may not be aligned with symbol timing of another UL transmission of a shorter symbol duration (e.g., if the serving cells are in different TAG). In some embodiments, a UE may use one PA for multiple transmissions within one cell or across aggregated carriers for intra-band contiguous CA and/or intra-band non-contiguous CA, while the UE may use separate PAs for inter-band CA and/or intra-band non-contiguous CA.

Figure 4:
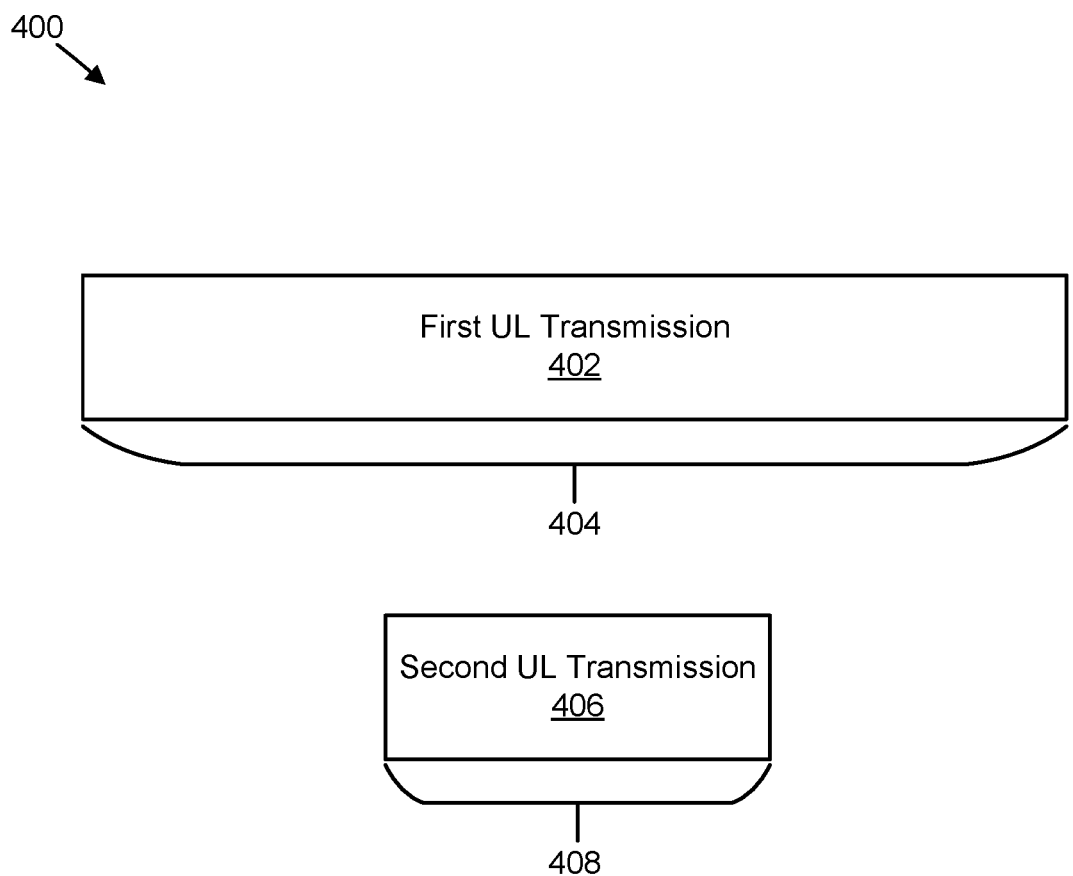
FIG. 4 is a schematic block diagram illustrating one embodiment of a system including overlapping transmissions.

FIG. 4 is a schematic block diagram illustrating one embodiment of a system 400 including overlapping transmissions. The system 400 includes a first UL transmission 402 ("UL1") that occurs over a first transmission period 404 ("T1"), and a second UL transmission 406 ("UL2") that occurs over a second transmission period 408 ("T2"). The first transmission period 404 may have a greater duration than the second transmission period 408. Moreover, the first transmission period 404 at least partially overlaps or completely overlaps in time with the second transmission period 408.

In some embodiments, a CA-capable UE may be scheduled (e.g., either by grant-based scheduling or grant-free based scheduling) for the first UL transmission 402 and for the second UL transmission 406 (e.g., the second UL transmission 406 may be scheduled after the first UL transmission 402). The first UL transmission 402 may have a first numerology and/or SCS ("$\mu1$"), and a first transmit power ("P1") on a first serving cell ("c1") on a first component carrier ("CC1"). In various embodiments, the first UL transmission 402 may be for eMBB and/or slot-based PUSCH. The second UL transmission 406 may have a second numerology and/or SCS ("$\mu2$"), and second transmit power ("P2") on a second serving cell ("c2") on a second component carrier ("CC2"). In some embodiments, the second UL transmission 406 may be for URLLC and/or PUCCH. In certain embodiments, the second UL transmission 406 may have a higher priority than the first UL transmission 402. In various embodiments, slot-timing and/or symbol-timing of c1 and c2 are asynchronous for a UE. Accordingly, a UE receiver detects different DL slot-boundaries and/or symbol-boundaries for c1 and c2 even if the serving cells have a common numerology and/or SCS. Various methods are described in relation to FIGS. 5 through 9 for a UE to perform two heterogeneous UL transmissions using one PA.

Figure 5:
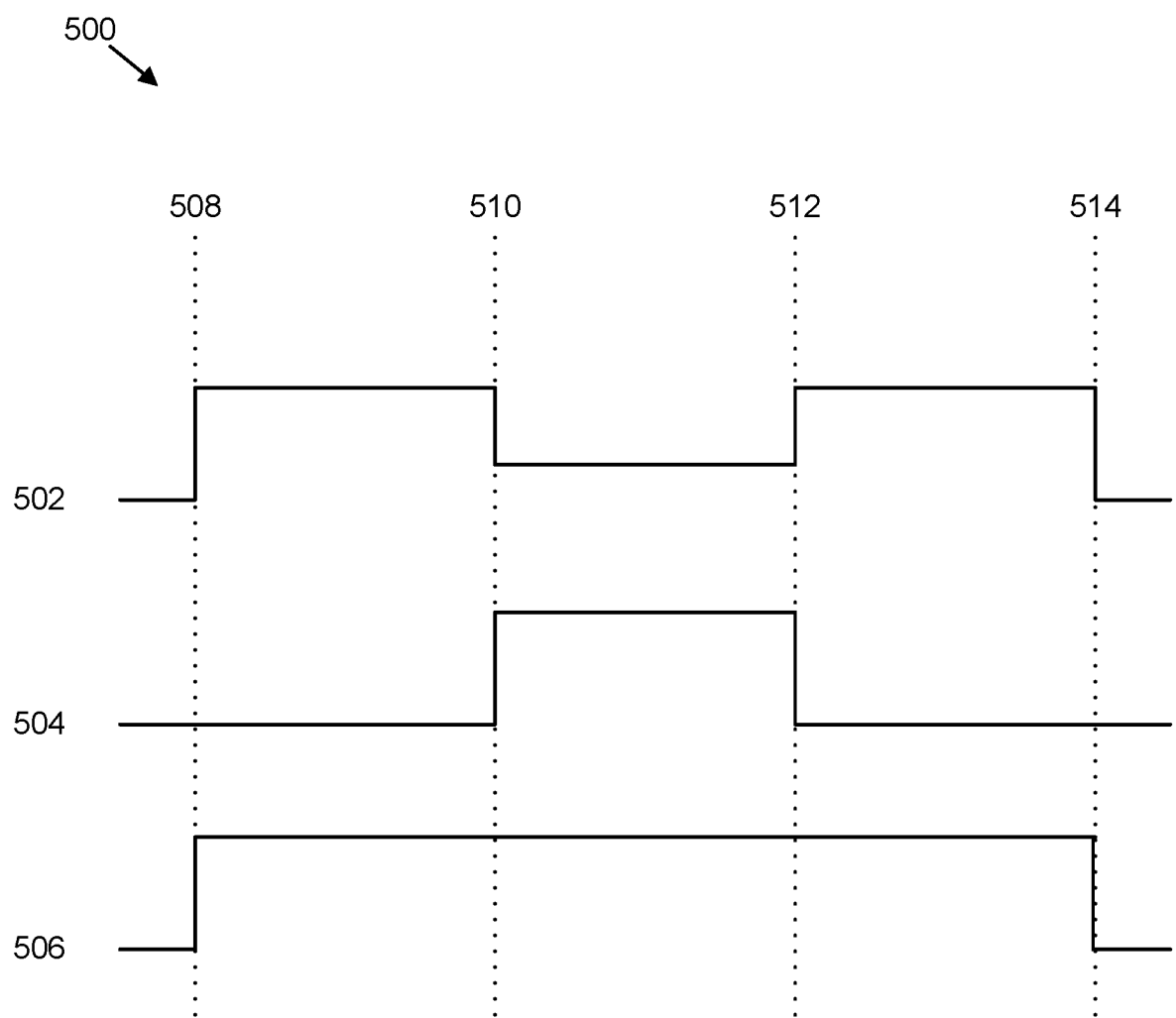
FIG. 5 is a schematic block diagram illustrating one embodiment of a timing diagram of power settings.

FIG. 5 is a schematic block diagram illustrating one embodiment of a timing diagram 500 of power settings. The timing diagram 500 illustrates a first transmission power 502 for the first UL transmission 402 described in FIG. 4, a second transmission power 504 for the second UL transmission 406 described in FIG. 4, and a total transmission power 506 that is a sum of the first transmission power 502 and the second transmission power 504. Furthermore, the timing diagram 500 illustrates a first time 508, a second time 510, a third time 512, and a fourth time 514. The first time 508 corresponds to a starting time of the first UL transmission 402, and the fourth time 514 corresponds to an ending time of the first UL transmission 402, thus, the first transmission period 404 of FIG. 4 equals the time between the first time 508 and the fourth time 514. Moreover, the second time 510 corresponds to a starting time of the second UL transmission 406, and the third time 512 corresponds to an ending time of the second UL transmission 406, thus, the second transmission period 408 of FIG. 4 equals the time between the second time 510 and the third time 512.

In the embodiment illustrated in FIG. 5, a UE attempts to keep the total transmission power 506 constant during the first transmission period 404 which encompasses the second transmission period 408. In one embodiment, the first UL transmission 402 is scheduled prior to the second UL transmission 406, and the UE determines the power settings based on a first power requirement P1 for the first UL transmission 402 and does not take into account the power requirement P2 for the second UL transmission 406.

As illustrated, the UE may transmit, with power P1, the first N1 symbols (e.g., having a duration less than the first transmission period 404) of the first UL transmission 402 prior to and up to the start of the second UL transmission 406. Thus, between the first time 508 and the second time 510, the first transmission power 502 equals P1. In some embodiments, the duration between the first time 508 and the second time 510 may be in units corresponding to a symbol duration of the first UL transmission 402 symbol duration. The symbol duration may be based on the first numerology and/or subcarrier-spacing μ1. In certain embodiments, a UE implementation may determine if and what waveform the UE transmits between the end of the last symbol (e.g., symbol boundary) of the N1 symbols of the first UL transmission 402 just prior to the start of the second UL transmission 406 and the start of the first symbol of the second UL transmission 406 to facilitate proper decoding using a first DMRS ("DMRS1") within the first N1 symbols. In one embodiment, the first DMRS is transmitted at or near the beginning of the first UL transmission 402 (e.g., front-loaded near the beginning of the first N1 symbols).

During the second transmission period 408, the UE may transmit the second UL transmission 406 with a power $\tilde{P}_2 = \min\{P2, P1\}$. Thus, between the second time 510 and the third time 512, the second transmission power 504 equals a minimum of P1 and P2. Because the second transmission period 408 starts at the second time 510 and ends at the third time 512, the second transmission power 504 equals zero between the first time 508 and the second time 510, and between the third time 512 and the fourth time 514.

During the first transmission period 404 between the second time 510 and the third time 512, the first transmission power 502 equals a maximum of 0 and P1 minus P2 (e.g., $\text{Max}\{0, P1-P2\}$) or equivalently a maximum of 0 and P1 minus $\tilde{P}_2$ (e.g., $\text{Max}\{0, P1-\tilde{P}_2\}$). Accordingly, if P1≤P2 (or P1≤$\tilde{P}_2$), the UE may cease the transmission of the first UL transmission 402 for the duration of T2 (e.g., the portion and/or duration of the overlapped transmission between UL1 and UL2, some fraction of a UL1 symbol duration may also be included as overlapped transmission time immediately prior to and/or after the UL2 transmission to account for any symbol boundary misalignment between UL1 and UL2), and resume the first UL transmission 402 (with the same symbol-timing as that for the transmitted first N1 symbols of UL1) of second N2 symbols with power P1 upon completion of the second UL transmission 406. In other words, during the first transmission period 404 between the third time 512 and the fourth time 514, the first transmission power 502 equals P1. Accordingly, the total transmission power 506 of the PA is fixed at P1 (e.g., constantly held at P1) for the duration of the first transmission period 404. Thus, for the duration of the first transmission period 404, there may be no phase discontinuity between the first N1 symbols transmission of the first UL transmission 402 and the second N2 symbols transmission of the first UL transmission 402 (e.g., the symbols following the duration T2). In one embodiment, some subcarriers (e.g., RE) of an OFDM and/or DFTS-OFDM symbol of the first UL transmission 402 may be reserved in advance (e.g., the UE performs rate-matching around those reserved subcarriers), and the UE may use those reserved subcarriers to send an indication to a network entity (e.g., gNB) to indicate whether puncturing of the first UL transmission 402 due to a power limitation is performed (e.g., by sending an indication to cell c1 with a flag "F1" set to zero to denote puncturing, in one example F1 (e.g., having one or more bits) may represent a power offset term corresponding to any change in UL1 transmit power during the overlap duration T2 with one of the states of F1 representing puncturing).

Moreover, if P1>P2 (or P1>$\tilde{P}_2$), the UE may adjust and/or scale the first UL transmission 402 to result in the first transmission power 502 equal to $\tilde{P}_1 (=P1-P2)$ during T2. Upon completion of the second UL transmission 406, the UE may re-adjust and/or re-scale the first UL transmission 402 back to the first transmission power 502 being equal to P1 for the second N2 symbols of the first UL transmission 402. In one embodiment, the UE may transmit an indication to cell c1 with the flag F1=1 denoting no puncturing. As may be appreciated, the front-loaded demodulation reference signal DMRS1 may facilitate coherent decoding of UL1 because the PA power setting is unchanged over the duration T1.

Figure 6:
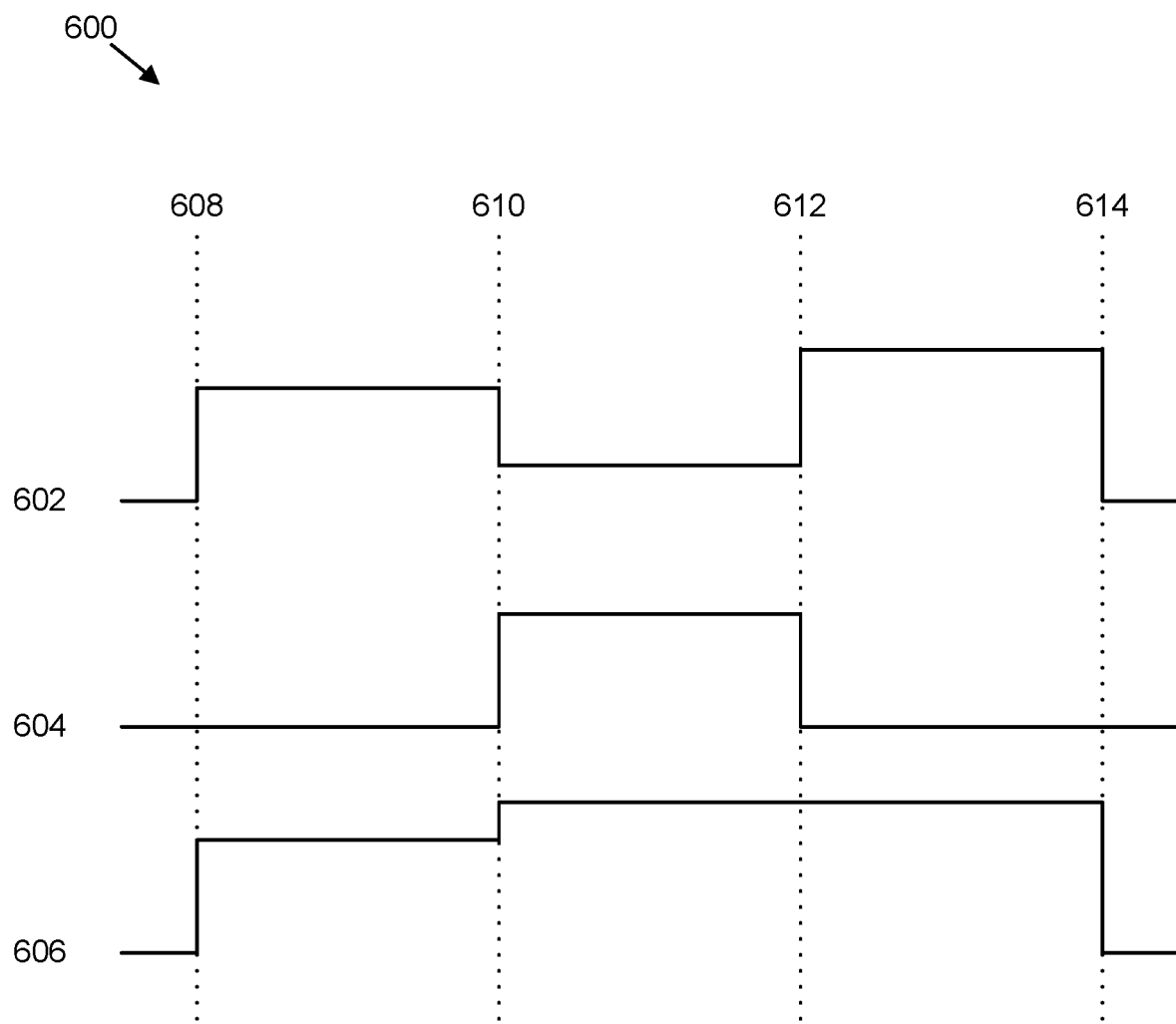
FIG. 6 is a schematic block diagram illustrating another embodiment of a timing diagram of power settings.

FIG. 6 is a schematic block diagram illustrating another embodiment of a timing diagram 600 of power settings. The timing diagram 600 illustrates a first transmission power 602 for the first UL transmission 402 described in FIG. 4, a second transmission power 604 for the second UL transmission 406 described in FIG. 4, and a total transmission power 606 that is a sum of the first transmission power 602 and the second transmission power 604. Furthermore, the timing diagram 600 illustrates a first time 608, a second time 610, a third time 612, and a fourth time 614. The first time 608 corresponds to a starting time of the first UL transmission 402, and the fourth time 614 corresponds to an ending time of the first UL transmission 402, thus, the first transmission period 404 of FIG. 4 equals the time between the first time 608 and the fourth time 614. Moreover, the second time 610 corresponds to a starting time of the second UL transmission 406, and the third time 612 corresponds to an ending time of the second UL transmission 406, thus, the second transmission period 408 of FIG. 4 equals the time between the second time 610 and the third time 612.

In the embodiment illustrated in FIG. 6, a UE does not aim for a constant total transmission power 606 over the first transmission period 404 which encompasses the second transmission period 408, but may assign a higher power level to the second UL transmission 406 than in the embodiment illustrated in FIG. 5. Moreover, the embodiment illustrated in FIG. 6 attempts to avoid puncturing of the first UL transmission 402 thereby requiring insertion of additional DMRS as the total transmission power 606 changes.

As illustrated, the UE may transmit, with power P1, the first N1 symbols (e.g., having a duration less than the first transmission period 404) of the first UL transmission 402 prior to and up to the start of the second UL transmission 406. Thus, between the first time 608 and the second time 610, the first transmission power 602 equals P1. In one embodiment, a first DMRS is transmitted at or near the beginning of the first UL transmission 402 (e.g., front-loaded near the beginning of the first N1 symbols).

During the second transmission period 408, the UE may transmit the second UL transmission 406 with the power P2. Thus, between the second time 610 and the third time 612, the second transmission power 604 equals P2. Because the second transmission period 408 starts at the second time 610 and ends at the third time 612, the second transmission power 604 equals zero between the first time 608 and the second time 610, and between the third time 612 and the fourth time 614.

During the first transmission period 404 between the second time 610 and the third time 612, the first transmission power 602 equals $\text{Min}\{\text{Max}\{0, PC_{MAX,c1}-P2\}, P1\}$. Moreover, during the first transmission period 404 between the third time 612 and the fourth time 614, the first transmission power 602 equals Min{Max{P2, $P_{CMAX,c1}$}, P1+P2}. Accordingly, if P2≥$P_{CMAX,c1}$, where $P_{CMAX,c1}$ is the maximum configured output power for serving cell c1, the UE may cease the transmission of the first UL transmission 402 for the duration of T2, and resume the first UL transmission 402 with the first transmission power 602 equal to $\tilde{P}_1$ (=$P_{CMAX,c1}$) upon completion of the second UL transmission 406. In one embodiment, the UE may send an indication to cell c1 (e.g., a flag F2=0) to indicate puncturing. Because the UE output power setting is changed from P1 to $\tilde{P}_1$ (=$P_{CMAX,c1}$) during the first UL transmission 402, the UE may multiplex an additional demodulation reference signal ("DMRS2") into the first UL transmission 402 to facilitate coherent decoding after changing the total power transmission 606 at the third time 612. As may be appreciated, with a change of the PA power setting, a phase of an output signal may abruptly change resulting in a phase discontinuity and, accordingly, a new DMRS may be used to enable a gNB receiver to update its phase estimation. For example, a UE may not transmit (e.g., puncture) scheduled data on some or all subcarriers of an OFDM and/or DFTS-OFDM symbol of the first UL transmission 402 immediately following the second UL transmission 406 and may transmit DMRS2 on those subcarriers. As may be appreciated, if $\tilde{P}_1$>P1, power boosting for the remaining transmission time of the first UL transmission 402 after the third time 612 may compensate for a potential performance loss occurring due to power reduction (e.g., puncturing) occurring during the overlap duration T2.

Moreover, if P2<$P_{CMAX,c1}$ and $P_{CMAX,c1}$–P2<P1, the UE may adjust the first UL transmission 402 to result in the first transmission power 602 equal to $\tilde{P}_1$(=$P_{CMAX,c1}$–P2) during T2. Upon completion of the second UL transmission 406, the UE may re-adjust the first UL transmission 402 to result in the first transmission power 602 equal to $P_{CMAX,c1}$ and complete the first UL transmission 402. In some embodiments, the UE may send an indication to cell c1 to indicate puncturing (e.g., a flag F2=1) that may occur if additional signals are transmitted, such as additional DMRS. Because the UE output power setting is changed from P1 to $P_{CMAX,c1}$ during the first UL transmission 402, the UE may multiplex the additional demodulation reference signal DMRS2 into the first UL transmission 402 to facilitate coherent decoding after changing the total power transmission 606 at the second time 610.

Furthermore, if P2<$P_{CMAX,c1}$ and $P_{CMAX,c1}$–P2≥P1, the UE may continue transmitting the first UL transmission 602 with the first transmission power 602 equal to P1 during T2. Upon completion of the second UL transmission 406, the UE may re-adjust the first UL transmission 402 to result in the first transmission power 602 equal to P1+P2 and complete the first UL transmission 402. (the UE may send an indication to cell c1, e.g., a flag F2=1). In some embodiments, the UE may send an indication to cell c1 to indicate puncturing (e.g., a flag F2=1). Because the UE output power setting is changed from P1 to P1+P2 during the first UL transmission 402, the UE may multiplex the additional demodulation reference signal DMRS2 into the first UL transmission 402 to facilitate coherent decoding after changing the total power transmission 606 at the second time 610. The total power transmission 606 is equal to P1 between the first time 608 and the second time 610, and the total power transmission 606 is equal to Min{$P_{CMAX,c1}$, P1+P2} between the second time 610 and the fourth time 614.

Figure 7:
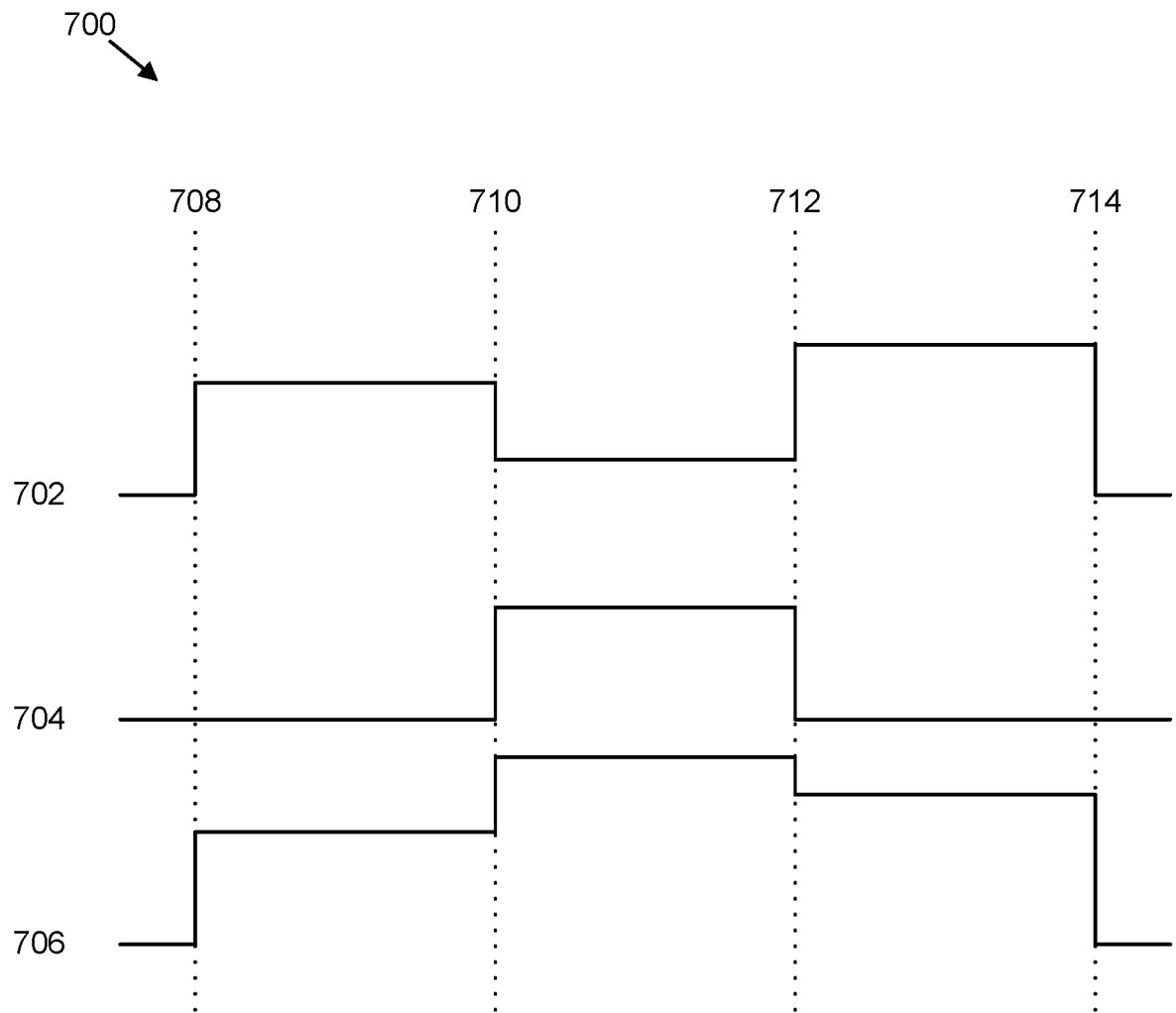
FIG. 7 is a schematic block diagram illustrating a further embodiment of a timing diagram of power settings.

FIG. 7 is a schematic block diagram illustrating a further embodiment of a timing diagram 700 of power settings. The timing diagram 700 illustrates a first transmission power 702 for the first UL transmission 402 described in FIG. 4, a second transmission power 704 for the second UL transmission 406 described in FIG. 4, and a total transmission power 706 that is a sum of the first transmission power 702 and the second transmission power 704. Furthermore, the timing diagram 700 illustrates a first time 708, a second time 710, a third time 712, and a fourth time 714. The first time 708 corresponds to a starting time of the first UL transmission 402, and the fourth time 714 corresponds to an ending time of the first UL transmission 402, thus, the first transmission period 404 of FIG. 4 equals the time between the first time 708 and the fourth time 714. Moreover, the second time 710 corresponds to a starting time of the second UL transmission 406, and the third time 712 corresponds to an ending time of the second UL transmission 406, thus, the second transmission period 408 of FIG. 4 equals the time between the second time 710 and the third time 712.

In the embodiment illustrated in FIG. 7, a UE does not aim for a constant total transmission power 706 over the first transmission period 404 which encompasses the second transmission period 408, but unlike the embodiment illustrated in FIG. 6, the UE attempts to assign a maximum available power level to each UL transmission thereby reducing a chance of repetitive puncturing of one or more symbols of the first UL transmission 402, but requiring additional DMRS each time the total transmission power 706 changes.

As illustrated, the UE may transmit, with power P1, the first N1 symbols (e.g., having a duration less than the first transmission period 404) of the first UL transmission 402 prior to and up to the start of the second UL transmission 406. Thus, between the first time 708 and the second time 710, the first transmission power 702 equals P1. In one embodiment, a first DMRS is transmitted at or near the beginning of the first UL transmission 402 (e.g., front-loaded near the beginning of the first N1 symbols).

During the second transmission period 408, the UE may transmit the second UL transmission 406 with the power P2. Thus, between the second time 710 and the third time 712, the second transmission power 704 equals P2. Because the second transmission period 408 starts at the second time 710 and ends at the third time 712, the second transmission power 704 equals zero between the first time 708 and the second time 710, and between the third time 712 and the fourth time 714.

During the first transmission period 404 between the second time 710 and the third time 712, the first transmission power 702 equals Min{$P_{CMAX,c1}$, $P_{CMAX,total}$–P2, (1+γ)P1}. Moreover, during the first transmission period 404 between the third time 712 and the fourth time 714, the first transmission power 702 equals Min{$P_{CMAX,c1}$, (1+γ)P1}. Accordingly, if P2=$P_{CMAX,total}$, where $P_{CMAX,total}$ is the maximum configured total and/or aggregate output power across all cells (e.g., CC1 and CC2 in this example) for carrier aggregation or dual connectivity (e.g., in the notation of 3GPP LTE and/or NR specifications, $P_{CMAX}$(i1) for CA in subframe and/or slot index i, or $P_{CMAX}$(i1,i2) for DC in subframe and/or slot pair indices i1 and i2), the UE may cease the transmission of the first UL transmission 402 for the duration of T2, and resume the first UL transmission 402 with the first transmission power 702 equal to $\tilde{P}_1$ (=$P_{CMAX,c1}$) upon completion of the second UL transmission 406. In one embodiment, the UE may send an indication to cell c1 (e.g., a flag F3=0) to indicate puncturing. Because the UE total output power setting is changed from P1 to P2 (=$P_{CMAX,total}$) and then to $\tilde{P}_1$ (=$P_{CMAX,c1}$) during the first UL transmission 402, and the UE stops the first UL transmission 402 during T2, the UE may multiplex an additional demodulation reference signal DMRS2 into the first UL transmission 402 (e.g., during the duration in which the first transmission power 702 is equal to $\tilde{P}_1$) to facilitate coherent after upon changing the total power transmission 706 at the third time 712. For example, a UE may not transmit (e.g., puncture) scheduled data on some or all of the subcarriers of the OFDM and/or DFTS-OFDM symbol of the first UL transmission 402 immediately following the completion of the second UL transmission 406 and may transmit DMRS2 on those subcarriers.

Moreover, if $P2<P_{CMAX,total}$, the UE may adjust the first UL transmission power 402 to result in the first transmission power 702 equal to $\tilde{P}_1$ (=min$\{P_{CMAX,c1}, P_{CMAX,total}-P2, (1+\gamma)P1\}$) during T2, where $\gamma \geq$ is a maximum boosting factor for the power of the first UL transmission 402. Upon completion of the second UL transmission 406, the UE may re-adjust the first UL transmission 402 to result in the first transmission power 702 power equal to $\overline{P}_1$ (=min$\{P_{CMAX,c1}, (1+\gamma)P1\}$) and complete the first UL transmission 402. In some embodiments, the UE may send an indication to cell c1 to indicate puncturing (e.g., a flag F3=1) that may occur if additional signals are transmitted, such as additional DMRS. Because the UE output power setting is changed from P1 to $\tilde{P}_1$ and then again to $\overline{P}_1$ during the first UL transmission 402, the UE may multiplex two sets of additional demodulation reference signal, DMRS2 and DMRS3, into the first UL transmission 402 to facilitate coherent decoding upon each instance of changing the total output power setting (e.g., immediately at the starting time of the second UL transmission 406—the second time 712, and immediately after completion time of the second UL transmission 406—the third time 714). In some embodiments, one incentive for power boosting for the first UL transmission 402 and assigning a power level larger than the originally configured power P1 is to increase the reliability of the first UL transmission 402 as much as possible by increasing the transmission power and to minimize and/or compensate for any penalizing impact on the performance of the first UL transmission 402 caused by puncturing the data of the first UL transmission 402 for insertion of additional DMRS. The total power transmission 706 is equal to P1 between the first time 708 and the second time 710, the total power transmission 706 is equal to Min$\{P_{CMAX,c1}+P2, P_{CMAX,total}, (1+\gamma) P1+P2\}$ between the second time 710 and the third time 712, and the total power transmission 706 is equal to Min$\{P_{CMAX,c1}, (1+\gamma)P1\}$ between the third time 712 and the fourth time 714.

In various embodiments described herein, the flags F1, F2, and/or F3 may include one or more bits and may represent a power offset term corresponding any change in the first UL transmission 402 transmit power during an overlap between the first transmission period 404 and the second transmission period 408. In such embodiments, one of the states of the flags F1, F2, and/or F3 may represent puncturing or no transmission.

The various embodiments described in FIGS. 5 through 7 may be applied to configurations in which slot-timing and/or symbol-timing of first and second serving cells are synchronous. In such configurations, a UE receiver may detect the same DL slot-boundaries and/or symbol-boundaries for the first and second serving cells for a given numerology and/or SCS. In some embodiments, if a symbol of one UL transmission having a first symbol duration that partially or completely overlaps one or more symbols of an other UL transmission having a second symbol duration, and if a transmission power of the symbol of the first symbol duration needs to be adjusted (e.g., to reduce power or for no transmission) to accommodate the other UL transmission of the second symbol duration, the adjusted power may be applied for the entire symbol having the first symbol duration.

Moreover, the various embodiments described in FIGS. 5 through 7 may be applied to configurations in which there is a partial overlap between first and second UL transmissions (e.g., if only part of the time duration T2 for the second UL transmission 406 overlaps with the first UL transmission 402). In certain embodiments, a UE may apply the various embodiments described in FIGS. 5 through 7 with the exception that operations and/or procedures described for an overlapping time may be applied only to a partial overlap duration, and the operations and/or procedures described for the remaining symbols of the first UL transmission 402 after the completion of the second UL transmission 406 may not be needed if there is no remaining first UL transmission 402 after the partial overlap duration.

Furthermore, in the various embodiments described in FIGS. 5 through 7, in order for a gNB to decode heterogeneous transmissions in view of abrupt power changes, the gNB may estimate a RX power change (or estimate of TX power differences between UL1 and UL2 transmissions based on an estimate from PHR), and then scale LLRs to account for power changes for the first UL transmission 402.

The various embodiments described in FIGS. 5 through 7 may differently impact performance corresponding to the first UL transmission 402 and the second UL transmission 406. Therefore, a gNB may determine one of the embodiments described in FIGS. 5 through 7 to use and may indicate the determined embodiment to a UE based on configurations of two concurrent UL transmissions. The gNB may determine the embodiment to use based on: a difference between an estimate by the gNB of power P1 for the first UL transmission 402 and a maximum configured power $P_{CMAX,c1}$ for serving cell c1; a difference between a maximum configured total and/or aggregate power $P_{CMAX,total}$ across two serving cells and the maximum configured power $P_{CMAX,c1}$ for serving cell c1; a power P2 for the second UL transmission 406; the time duration T2 for the second UL transmission 406; a number of symbols left for the first UL transmission 402 after completion of the second UL transmission 406; and/or a contents of symbols at a starting time and/or a completion time of the second UL transmission 406 (e.g., whether the symbols include UCI).

In one embodiment, a gNB may configure a UE to use one of the embodiments described in FIGS. 5 through 7 based on high-layer signaling (e.g., using a MAC control element, using RRC signaling, etc.). In another example, a UE may decide and indicate (e.g., dynamically, semi-dynamically, and/or semi-statically) to the gNB which method it will select based on the configurations of the two UL transmissions including the aspects above.

In certain embodiments, if P1 has a value close to $P_{CMAX,c1}$ (e.g., a difference between P1 and $P_{CMAX,c1}$ is smaller than a predetermined threshold), then a UE may use the embodiment described in relation to FIG. 5. In some embodiments, if symbols of the first UL transmission 402 near a starting time and/or a completion time of the second UL transmission 406 include UCI, then a UE may adopt the embodiment described in relation to FIG. 5 to reduce abrupt power and/or phase change that may necessitate puncturing UCI symbols for insertion of additional DMRS. In various embodiments, if a difference between $P_{CMAX,c1}$ and $P_{CMAX,total}$ is small (e.g., smaller than a first threshold), the time duration T2 for the second UL transmission 406 is small (e.g., smaller than a second threshold) and/or few symbols are left for the first UL transmission 402 after completion of the second UL transmission 406 (e.g., smaller than a third threshold), then a UE may use the embodiment described in relation to FIG. 6 to reduce repetitive puncturing of the first UL transmission 402. In certain embodiments, if a difference between $P_{CMAX,c1}$ and $P_{CMAX,total}$ is large (e.g., larger than a first threshold), P2 is large (e.g., larger than a second threshold), the time duration T2 for the second UL transmission 406 is large (e.g., larger than a third threshold), and/or many symbols are left for the first UL transmission 402 after completion of the second UL transmission 406 (e.g., larger than a fourth threshold), then a UE may use the embodiment described in relation to FIG. 7 to provide power boosting for the first UL transmission 402 and/or to reduce performance loss resulting from high power and long overlap with the second UL transmission. In a further example, the UE may cease/drop the first UL transmission after the completion of the second transmission if few symbols are left (e.g., less than a certain threshold) or if the corresponding allocated power in either second or third method or variations thereof is small (e.g., smaller than another certain threshold).

In some embodiments, the second UL transmission 406 having transmit power P2 (e.g., also having a shorter transmission duration and/or a higher priority than the first UL transmission 402) may occur semi-persistently within the first UL transmission 402. For example, the second UL transmission 406 may include short PUCCHs carrying HARQ-ACK feedback for semi-persistently scheduled non-slot based PDSCHs, therefore, a UE may change the first UL transmission 402 power between Min{Max{0, $P_{CMAX,c1}$–P2}, P1} and Min{$P_{CMAX,c1}$, P1+P2} depending on whether the first UL transmission 402 overlaps the second UL transmission 406 (e.g., Min{Max{0, $P_{CMAX,c1}$–P2}, P1} during overlapping portions and Min{$P_{CMAX,c1}$, P1+P2} during non-overlapping portions).

In various embodiments, if a UE performs one or more heterogeneous uplink transmissions using multiple power amplifiers (e.g., for inter-band CA or possibly intra-band non-contiguous CA), a constant PA power setting for the entire transmission duration or changing the power setting with insertion of additional DMRS may be determined per PA. In an embodiment illustrated in FIG. 8, a UE may puncture the first UL transmission 402 completely during T2, and may boost transmission power to P1'($\leq P_{cmax,c1}$) upon completion of the second UL transmission 406 (and may multiplex an additional DMRS for new phase and/or channel estimation). In such an embodiment, power boosting for the remaining transmission time of the first UL transmission 402 may compensate for a potential performance loss due to puncturing during T2. In an embodiment illustrated in FIG. 9, a UE may adjust a transmit power of the first UL transmission 402 from P1 to Min{Max{0, $P_{CMAX,c1}$–P2}, P1}, wherein a difference between P1 and the new power level Min{Max{0, $P_{CMAX,c1}$–P2}, P1} may not be significant (e.g., less than a configured, predefined, and/or dynamically signaled threshold value), and maintain the adjusted transmit power until the end of the first UL transmission 402. As may be appreciated, by maintaining the same adjusted transmit power for the remaining transmission, the UE can rely on a single additional DMRS2 for coherent demodulation during and after the overlap time with the second UL transmission 406 and may avoid inserting a further additional DMRS (i.e., a total of at least two sets of additional DMRSs).

Figure 8:
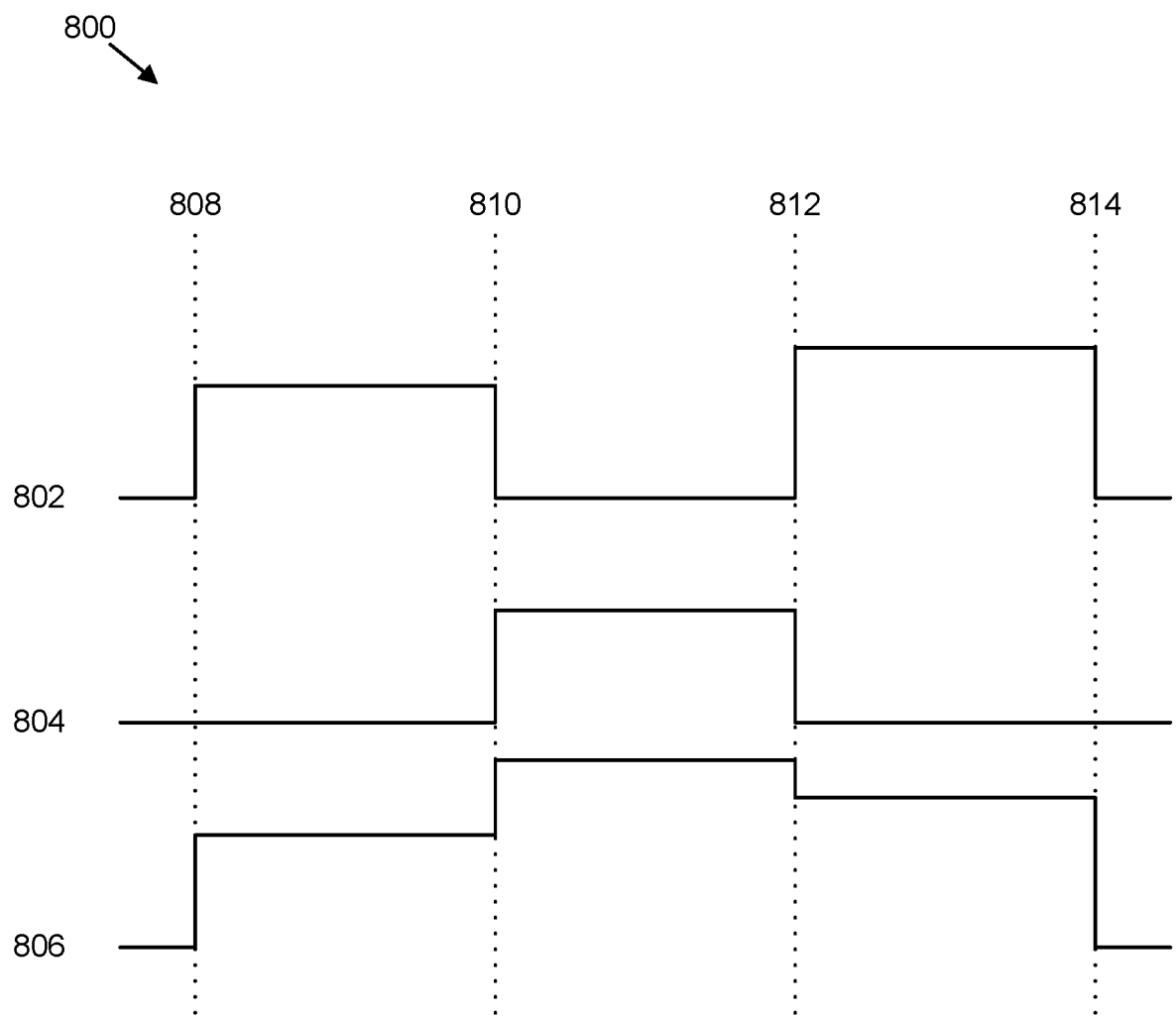
FIG. 8 is a schematic block diagram illustrating yet another embodiment of a timing diagram of power settings.

FIG. 8 is a schematic block diagram illustrating yet another embodiment of a timing diagram 800 of power settings. The timing diagram 800 illustrates a first transmission power 802 for the first UL transmission 402 described in FIG. 4, a second transmission power 804 for the second UL transmission 406 described in FIG. 4, and a total transmission power 806 that is a sum of the first transmission power 802 and the second transmission power 804. Furthermore, the timing diagram 800 illustrates a first time 808, a second time 810, a third time 812, and a fourth time 814. The first time 808 corresponds to a starting time of the first UL transmission 402, and the fourth time 814 corresponds to an ending time of the first UL transmission 402, thus, the first transmission period 404 of FIG. 4 equals the time between the first time 808 and the fourth time 814. Moreover, the second time 810 corresponds to a starting time of the second UL transmission 406, and the third time 812 corresponds to an ending time of the second UL transmission 406, thus, the second transmission period 408 of FIG. 4 equals the time between the second time 810 and the third time 812.

As illustrated, the UE may transmit, with power P1, the first N1 symbols (e.g., having a duration less than the first transmission period 404) of the first UL transmission 402 prior to and up to the start of the second UL transmission 406. Thus, between the first time 808 and the second time 810, the first transmission power 802 equals P1. In one embodiment, a first DMRS is transmitted at or near the beginning of the first UL transmission 402 (e.g., front-loaded near the beginning of the first N1 symbols).

During the second transmission period 408, the UE may transmit the second UL transmission 406 with the power P2. Thus, between the second time 810 and the third time 812, the second transmission power 804 equals P2. Because the second transmission period 408 starts at the second time 810 and ends at the third time 812, the second transmission power 804 equals zero between the first time 808 and the second time 810, and between the third time 812 and the fourth time 814.

During the first transmission period 404 between the second time 810 and the third time 812, the first transmission power 802 equals 0. Moreover, during the first transmission period 404 between the third time 812 and the fourth time 814, the first transmission power 802 is $\leq P_{cmax,c1}$.

The total power transmission 806 is equal to P1 between the first time 808 and the second time 810, the total power transmission 806 is equal to P2 between the second time 810 and the third time 812, and the total power transmission 806 is $\leq P_{cmax,c1}$ between the third time 812 and the fourth time 814.

Figure 9:
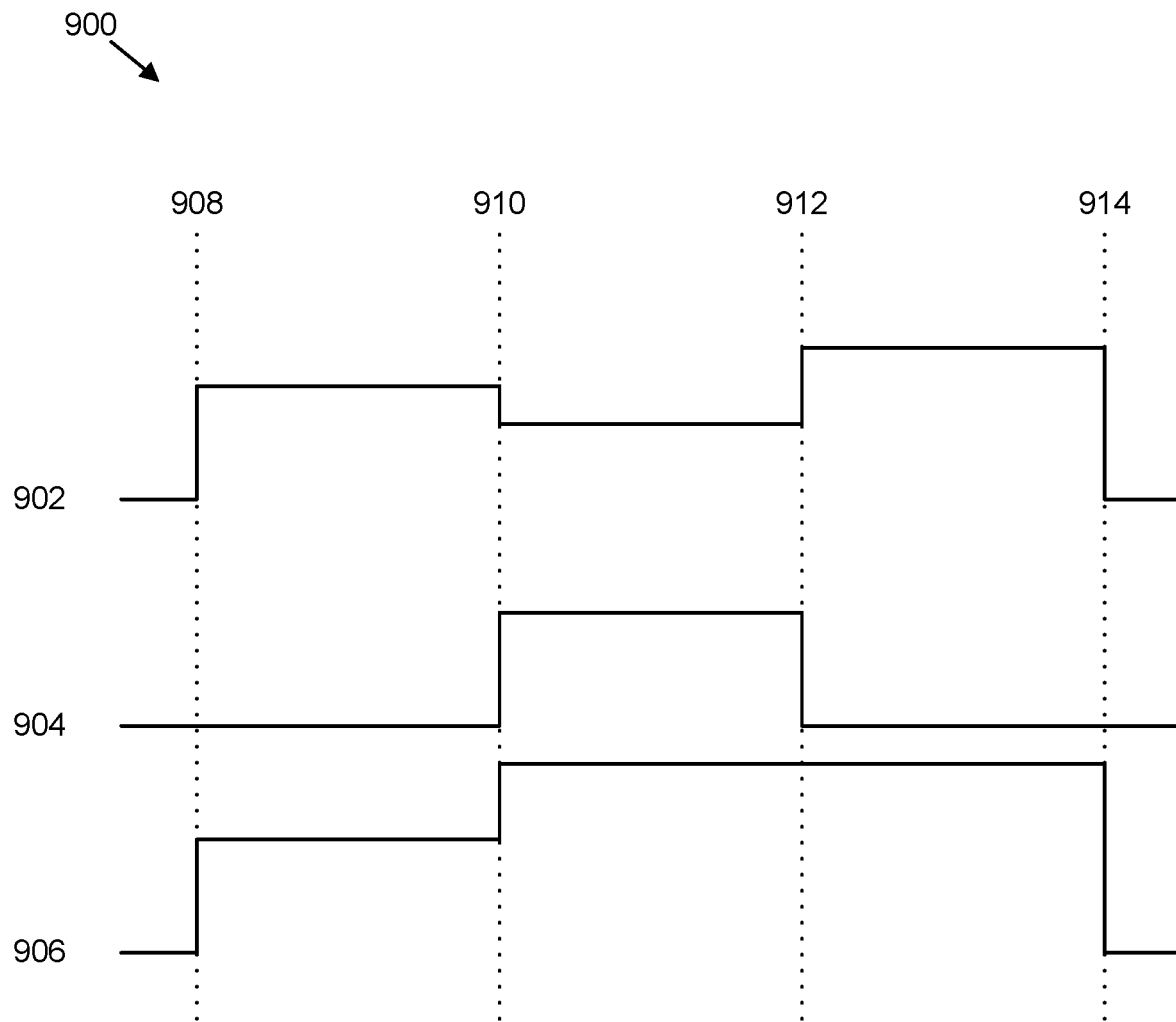
FIG. 9 is a schematic block diagram illustrating yet a further embodiment of a timing diagram of power settings.

FIG. 9 is a schematic block diagram illustrating yet a further embodiment of a timing diagram 900 of power settings. The timing diagram 900 illustrates a first transmission power 902 for the first UL transmission 402 described in FIG. 4, a second transmission power 904 for the second UL transmission 406 described in FIG. 4, and a total transmission power 906 that is a sum of the first transmission power 902 and the second transmission power 904. Furthermore, the timing diagram 900 illustrates a first time 908, a second time 910, a third time 912, and a fourth time 914. The first time 908 corresponds to a starting time of the first UL transmission 402, and the fourth time 914 corresponds to an ending time of the first UL transmission 402, thus, the first transmission period 404 of FIG. 4 equals the time between the first time 908 and the fourth time 914. Moreover, the second time 910 corresponds to a starting time of the second UL transmission 406, and the third time 912 corresponds to an ending time of the second UL transmission 406, thus, the second transmission period 408 of FIG. 4 equals the time between the second time 910 and the third time 912.

As illustrated, the UE may transmit, with power P1, the first N1 symbols (e.g., having a duration less than the first transmission period 404) of the first UL transmission 402 prior to and up to the start of the second UL transmission 406. Thus, between the first time 908 and the second time 910, the first transmission power 902 equals P1. In one embodiment, a first DMRS is transmitted at or near the beginning of the first UL transmission 402 (e.g., front-loaded near the beginning of the first N1 symbols).

During the second transmission period 408, the UE may transmit the second UL transmission 406 with the power P2. Thus, between the second time 910 and the third time 912, the second transmission power 904 equals P2. Because the second transmission period 408 starts at the second time 910 and ends at the third time 912, the second transmission power 904 equals zero between the first time 908 and the second time 910, and between the third time 912 and the fourth time 914.

During the first transmission period 404 between the second time 910 and the fourth time 914, the first transmission power 902 equals Min{Max{0, $P_{CMAX,c1}$−P2}, P1}.

The total power transmission 906 is equal to P1 between the first time 908 and the second time 910, and the total power transmission 906 is equal to Min{$P_{CMAX,c1}$, P1+P2} between the second time 910 and the fourth time 914.

In one embodiment, a UE may maintain a collection of the following pathloss estimates for the purpose of PUSCH, PUCCH, and/or SRS power control in a multi-beam wireless network: (a) pathloss estimates for all or a subset of gNB beams corresponding to actually-transmitted SS blocks; (b) pathloss estimates for all or a subset of active gNB beams for PUSCH and/or SRS transmission (e.g., a gNB SS block and/or CSI-RS beams configured for current monitoring—CSI acquisition—and/or potential PUSCH scheduling); (c) pathloss estimates for all or a subset of alternative and/or candidate gNB beams (e.g., beams used for beam switching); (d) pathloss estimates for all or a subset of gNB beams corresponding to and/or associated with configured SRS resources for an UL beam management procedure; (e) pathloss estimates for all or a subset of active gNB beams for PUCCH transmission, if different from PUSCH beams (e.g., for robust transmission of control information), including beams configured for a beam failure detection procedure; and/or (f) pathloss estimates for all or a subset of configured gNB beams for mobility, RRM, RLM, and/or BFR procedures. As may be appreciated, the above sets of pathloss estimates may not be mutually exclusive and/or may have non-empty overlaps.

In certain embodiments, for a system with a beam reporting procedure and a beam management procedure, a number of pathloss estimates to maintain may not exceed a number of transmitted SS blocks and a fraction, multiple, or offset of a number of reported beams. For example, if a UE reports up to 4 good and/or active beams to a gNB, then the UE may maintain no more than 8 pathloss estimates (e.g., 8 is a multiple of 4) for 8 beams corresponding to some of the transmitted SS blocks, active CSI-RS beams, and/or candidate beams.

In various embodiments, a gNB may categorize sets of pathloss estimates based on a channel and/or signal for which power control is considered. In one embodiment, a gNB and/or UE may configure pathloss options (a), (b), (c), and/or (f) described herein for PUSCH power control; options (a), (b), (c), (d), and/or (f) described herein for SRS power control; and/or options (a), (b), (c), (e), and/or (f) described herein for PUCCH power control.

In some embodiments, if a CA-capable UE is configured with multiple bandwidth parts with different numerologies, the UE may be configured with different open-loop power control parameters (e.g., different target SINR P0 and fractional pathloss compensation factor alpha and/or pathloss reference signal) and/or different closed-loop power control loops.

In certain embodiments, a first time a UE is configured and/or reconfigured with a bandwidth part having a corresponding numerology different from a numerology corresponding to bandwidth parts that the UE is configured with, a PHR may be triggered to inform a gNB of an updated estimate of interference and/or pathloss of a channel associated with the configured and/or reconfigured bandwidth part.

In various embodiments, if a UE is configured to operate with one cell (perhaps among other configured cells), the UE may be configured with the following OL power control configuration (e.g., target SINR P0 and/or fractional pathloss compensation factor alpha) for dynamic scheduling: at least 2 distinct OL configurations for eMBB and URLLC services; at least 2 distinct OL configurations for the two uplinks of a SUL configuration; and/or up to N_max distinct OL configurations for different PUSCH beams, where N_max corresponds to a maximum number of good and/or active beams the UE reports in a beam management procedure. It should be noted that the above examples do not consider the impact of slot sets, or the impact of slot sets are considered to be captured along with the OL-PC configuration allocation for beams.

In certain embodiments, a separate OL-PC configuration for PRACH transmission may be used. Furthermore, in some embodiments, a separate OL-PC configuration for grant-free transmission may be used.

In various embodiments, a UE may have up to 4 active beams. Accordingly, the UE may have at least 14+1+1=16 different OL-PC configurations.

In one embodiment, if a UE in a multi-beam wireless network is configured with multiple closed loops for PUSCH power control (e.g., 2 closed loops), a selection of a closed-loop configuration (e.g., a first closed loop, a second closed loop) may depend on an indication from a gNB beam from a set of active gNB beams for PUSCH transmission to the UE (and perhaps the supplementary uplink (SUL) and/or slot-sets), but may not depend on other PUSCH transmission features and/or attributes such as grant type, service type, traffic type, and so forth. In such an embodiment, all PUSCH transmissions operating with the same gNB beam may be configured with the same closed loop power control regardless of a grant type, traffic type, service type, and/or other PUSCH transmission features and/or attributes.

In certain embodiments, if a UE operates in a multi-beam wireless network, regardless of whether a PUCSCH transmission is configured with a single or multiple (e.g., 2) closed loops for power control, a step size δ_PUSCH for TPC command and/or an application-time K_PUSCH may depend on a grant type, a service type, a traffic type, and/or other PUSCH transmission features and/or attributes. For example, URLLC (in comparison with eMBB) or grant-free transmission (in comparison with dynamic-grant-based transmission) may have a larger step size δ_PUSCH and/or a shorter application time K_PUSCH for faster convergence of closed-loop power control.

In various embodiments, if a new gNB beam is added to a set of active gNB beams for a UE, and that gNB beam has similar spatial characteristic and/or QCL assumptions with an existing active gNB beam for the UE, then a current accumulation status of a closed-loop power control for the existing active gNB beam may be applied to the newly added beam. In such an embodiment, the gNB beam addition may not count as an RRC reconfiguration (e.g., reconfiguration of TCI and/or other power control related RRC parameters) and/or may not cause any reset of a closed-loop power control parameter.

In some embodiments, if a new gNB beam is added to a set of active gNB beams for a UE, and that gNB beam has significantly different spatial characteristic and/or QCL assumptions with all existing active gNB beams for the UE, then the accumulation of only the closed-loop power control linked to the new gNB beam (and all other gNB beams sharing the same closed-loop power control) may be reset, but no other closed-loops may reset upon this beam configuration and/or reconfiguration.

In one embodiment, if some spatial relations in a TCI get updated and/or reconfigured, for all PUSCH, SRS, and/or PUCCH transmissions that correspond to the TCI update and/or reconfiguration, the accumulation status of a corresponding closed-loop power control process after the TCI update may reset or may inherit a current and/or last accumulation status that existed before the TCI update and/or reconfiguration. In such an embodiment, a decision to reset the accumulation may depend on a similarity and/or difference of the spatial relations before and/or after the TCI update. Moreover, in such an embodiment, for any PUSCH, SRS, and/or PUCCH transmissions that do not correspond to or associate with that TCI update and/or reconfiguration, the accumulation status of a corresponding closed-loop power control process may not reset after the TCI update and/or reconfiguration (e.g., the corresponding closed-loop power control process may carry over a current status and/or last status of a CL-PC process before the TCI update and/or reconfiguration).

In certain embodiments, if a first group of spatially similar gNB beams (e.g., those corresponding to one panel of a TRP) have significantly different spatial characteristic and/or QCL assumptions than a second group of gNB beam (e.g., those corresponding to a second panel of a TRP), a closed-loop power control configuration for a UE may choose one the following two configurations: either each of the first and second groups of gNB beams may correspond to different closed loops for power control; or if the UE attempts to switch from communication with a beam from the first group to communication with a beam in the second beam group, a corresponding closed-loop configuration may reset its accumulation In various embodiments, if a multi-panel UE operates with a gNB beam using a UE beam to a UE panel, and the UE is configured with a positive TPC command that may cause the UE to exceed a maximum configured output power for the UE panel (e.g., $P_{CMAX,c,b}$) or the UE is operating in a power-limited mode, the UE may initiate an UE TX beam sweeping (e.g., a U3 UL beam management procedure) to determine whether any other UE beams from any other UE panel exists that can operate with the same gNB beam but facilitate a larger panel-$P_{CMAX,c,b}$. In such embodiments, if the UE finds any such UE TX beams, the UE may autonomously perform a UE TX beam switching that is transparent to the gNB.

In some embodiments, if a UE is configured with multiple power control parameter sets for PUSCH corresponding to a set of active gNB beams for potential PUSCH transmission, a set of service types and/or traffic types (e.g., eMBB and/or URLLC), a set of grant types (e.g., grant-based, grant-free, and/or RAR), and/or any other PUSCH attributes, and if the UE is configured with several SRS resources for UL and/or DL CSI acquisition of active gNB beams for potential PUSCH transmission (or multiple SRS resource sets each consisting of one or more of those gNB beams), a configuration of power control parameter sets for the SRS resources may be tied to a configuration of power control parameter sets for the active PUSCH beam, but may not be tied to different service types, grant types, and so forth. For example, a configuration of a power control parameter set for each SRS resource aimed at UL and/or DL CSI acquisition of an active gNB beam for PUSCH transmission may be tied to (e.g., follow, use the same values, use same values plus a configured offset, and so forth) a configuration of power control parameter sets for a corresponding active gNB PUSCH beam and: (i) a fixed default set of PUSCH transmission features and/or attributes such as a service type, a grant type, and so forth; or (ii) a semi-statically varying set of PUSCH transmission features and/or attributes such as a service type, a grant type, and so forth, based on a previous UE scheduling history (e.g., based on mostly used UE PUSCH transmission features and/or attributes in a time interval). In certain embodiments, if a high-layer power control configuration for SRS resources aimed at UL and/or DL CSI acquisition of active gNB PUSCH beams is tied to a high-layer power control configuration for those gNB PUSCH beam, and if a UE is scheduled with transmission of a certain SRS resource that is aimed at UL and/or DL CSI acquisition of an active gNB PUSCH beam (e.g., based on a low-overhead mechanism for activation and/or triggering of SRS resources by indicating an SRS resource set that includes all SRS resources aimed at UL and/or DL CSI acquisition), the SRS resource indicator SRI (or an indicator for the SRS resource set aimed at UL and/or DL CSI acquisition) may be indicated to the UE that may signal to the UE which SRS and/or PUSCH power control configuration to follow.

In one embodiment, if a UE capability report includes an UL and/or DL non-correspondence feature (e.g., the UE reports that it may not support beam correspondence due to one or some of the following reasons: the UE sometimes and/or always uses different panels for TX than RX; the UE has poor calibration such as because there is a large phase offset between the RX beams and the TX beams; the UE has restrictions on the usage of the TX beams, for example, all beams are possible for RX, but the UE can use only certain beams for TX due to EIRP-like limitations; the TX and RX beams of the UE have different beam widths such as a narrower beam for RX, but wider beams for TX; the TX and RX phasing network of that UE have different granularities such as that RX uses finer phase shifts, but TX uses coarser phase shifts; and/or the UE beamforming capabilities are different for TX and RX such as only a limited number of beams (or beam patterns) may be used for TX, but all of those beams (and beam patterns) as well as their linear combinations may be used for RX), then the UE may report to the gNB an average UL and/or DL mismatch offset for each gNB beam. The average UL and/or DL mismatch may be a UE estimated average power offset caused by any and/or all of the abovementioned non-correspondence features existing in the UE calculated for each gNB beam if operating with a best UE beam as determined based on an UL beam management procedure. For example, the average UL and/or DL mismatch offset may be based on a statistical analysis to bound performance of electronic, PA, RF, and/or antenna components or based on an empirical average of power variation measurements in UE electronic, PA, RF, and/or antenna components over a time interval. In some embodiments, a gNB may take gNB beam specific average UL and/or DL mismatch offset into account if configuring a power control parameter sets for a UE. As may be appreciated, incorporating the average UL and/or DL mismatch offset may facilitates the gNB configuring a single gNB beam as a DL reference signal for pathloss estimation for beam non-correspondence (e.g., as opposed to configuring multiple gNB beam as DL-RS for pathloss estimation through a uniform and/or weighted average), and any remaining error and discrepancy may be small enough to be captured by a gNB TPC command with fast convergence in a timely manner.

In certain embodiments, if multiple UEs are configured with the same set of active gNB beams for PUSCH transmission, or if multiple UEs may share a subset of gNB beams among configured gNB beams for their PUSCH transmission, the gNB may group that set and/or subset of gNB beams, and may attempt UL and/or DL CSI acquisition for that set and/or subset of gNB beams jointly for the multiple UEs by jointly triggering and/or activating SRS resources corresponding to that set and/or subset of gNB PUSCH beams (e.g., based on a low-overhead mechanism for activation and/or triggering those SRS resources such as by configuring and indicating an SRS resource set that includes all SRS resources relating to UL and/or DL CSI acquisition of that set and/or subset of gNB PUSCH beams). In such embodiments, the gNB may configure the multiple UEs with a group-common TPC command as part of group-DCI using TPC-SRS-RNTI to facilitate a joint and/or low-overhead mechanism to signal power control adjustments for the SRS resources.

In various embodiments, if an SRS resource set and/or group is associated with a set of gNB beams in an UL beam management procedure (e.g., for beam determination, switching, sweeping, and/or refinement), and if the SRS resource set and/or group is configured for multiple UEs (e.g., for lower overhead operation in any of the procedures: beam management, triggering, activation, and/or power control), the gNB may configure the multiple UEs with a group-common TPC command as part of group-DCI using TPC-SRS-RNTI.

In some embodiments, if SRS transmission is not tied to any PUSCH transmissions (e.g., SRS transmission is not aimed at UL and/or DL CSI acquisition of any active gNB beam for potential PUSCH transmission), a gNB may configure a UE with one independent closed-loop power control or no closed-loop power control. In one example, if SRS transmission is configured for SRS antenna switching and/or SRS carrier switching, with no correspondence to PUSCH and/or PUCCH transmission, then a separate independent closed-loop may be configured for the SRS transmission. In another example, if an SRS resource set and/or group contains multiple periodic SRS resources (of the same periodicity) aimed at UL beam management, the gNB may configure an independent closed-loop power for the SRS resource set and/or group. In yet another example, if a first SRS resource set and/or group includes multiple aperiodic SRS resources for UL beam management, and if the aperiodic SRS resources are associated with the same gNB beams (or a subset of those gNB beam of size larger than a certain threshold) that a second SRS resource set having periodic SRS resources is also associated with, then a closed-loop power control of the second SRS resource set and/or group may be configured for the first SRS resource set and/or group, and any accumulated status may carry over. In a further example, if an SRS resource set and/or group includes multiple aperiodic SRS resources that correspond to a set of gNB beams that are not associated with any other SRS resource sets and/or groups having periodic SRS resources (e.g., if aperiodic SRS resources correspond to a new set of gNb beams as new candidates that are not previously configured before in the UL beam management procedure), then the gNB may configure no closed loop power control for that SRS resource set (e.g., to rely only on open loop power control).

Figure 10:
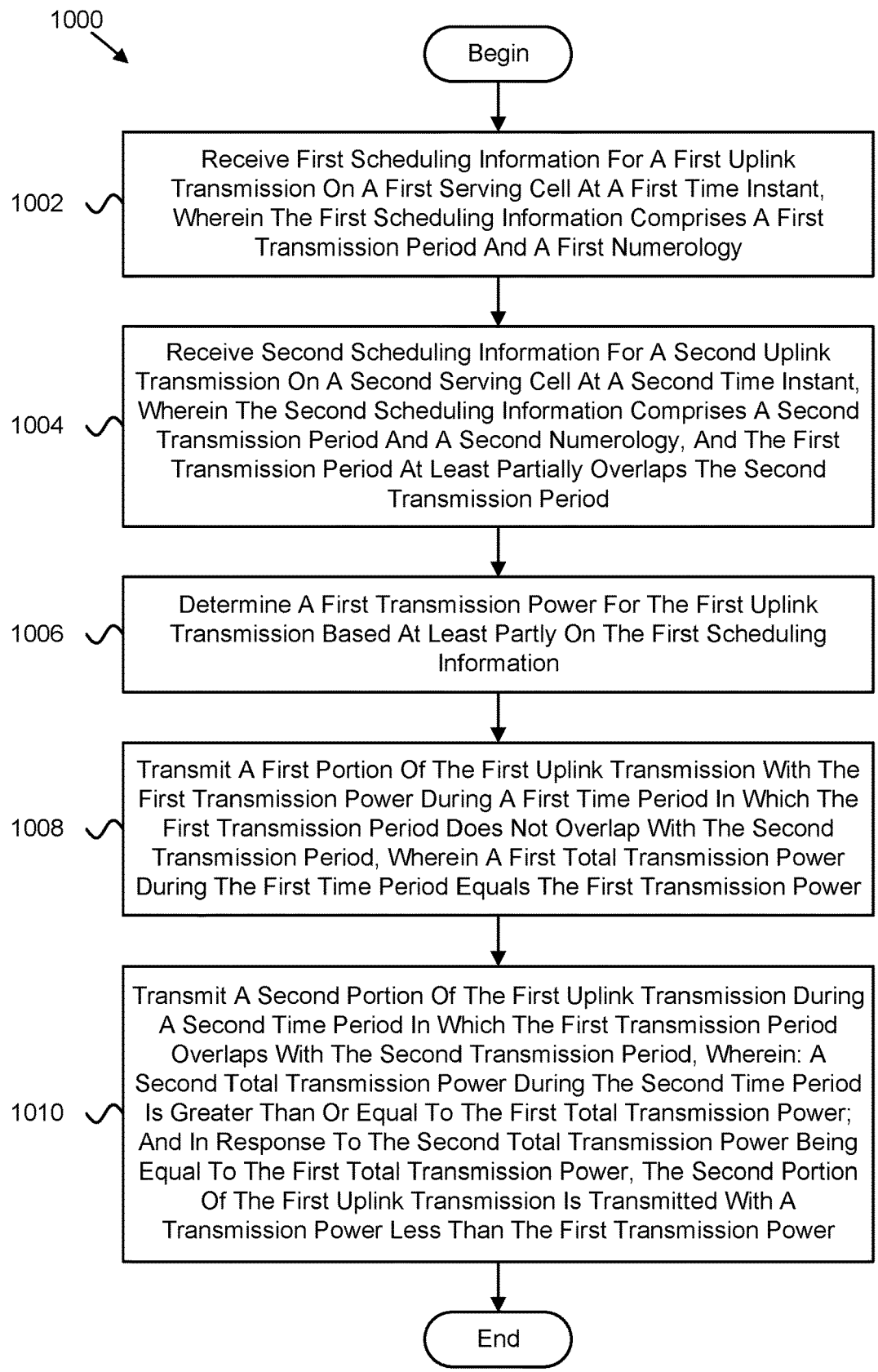
FIG. 10 is a flow chart diagram illustrating one embodiment of a method for transmission power control.

FIG. 10 is a flow chart diagram illustrating one embodiment of a method 1000 for transmission power control. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

The method 1000 may include receiving 1002 first scheduling information for a first uplink transmission on a first serving cell at a first time instant. In such an embodiment, the first scheduling information comprises a first transmission period and a first numerology. In some embodiments, the method 1000 comprises receiving 1004 second scheduling information for a second uplink transmission on a second serving cell at a second time instant. In such embodiments, the second scheduling information comprises a second transmission period and a second numerology, and the first transmission period at least partially overlaps the second transmission period. In certain embodiments, the method 1000 comprises determining 1006 a first transmission power for the first uplink transmission based at least partly on the first scheduling information. In various embodiments, the method 1000 comprises transmitting 1008 a first portion of the first uplink transmission with the first transmission power during a first time period in which the first transmission period does not overlap with the second transmission period. In such embodiments, a first total transmission power during the first time period equals the first transmission power. In one embodiment, the method 1000 comprises transmitting 1010 a second portion of the first uplink transmission during a second time period in which the first transmission period overlaps with the second transmission period. In such an embodiment: a second total transmission power during the second time period is greater than or equal to the first total transmission power; and, in response to the second total transmission power being equal to the first total transmission power, the second portion of the first uplink transmission is transmitted with a transmission power less than the first transmission power.

In certain embodiments, the method 1000 comprises: determining a second transmission power for the second uplink transmission based at least partly on the second scheduling information; determining a third transmission power equal to a minimum of: the first transmission power; and the second transmission power; transmitting, during the second time period, the second uplink transmission with the third transmission power; determining a fourth transmission power equal to a maximum of: zero; and the first transmission power minus the third transmission power; and transmitting, during the second time period, the second portion of the first uplink transmission with the fourth transmission power.

In some embodiments, the method 1000 comprises transmitting, during a third time period after the second time period, a third portion of the first uplink transmission with the first transmission power. In various embodiments, the first portion of the first uplink transmission, the second portion of the first uplink transmission, and the third portion of the first uplink transmission have a same symbol timing. In one embodiment, the method 1000 comprises ceasing transmission of the second portion of the first uplink transmission in response to the fourth transmission power being less than a predetermined threshold, a configured threshold, a dynamically indicated threshold, a semi dynamically indicated threshold, or some combination thereof.

In certain embodiments, a first demodulation reference signal is transmitted with the first uplink transmission, and, in response to the second total transmission power being greater than the first total transmission power, the first demodulation reference signal is transmitted with the first portion of the first uplink transmission and a second demodulation reference signal is transmitted with the second portion of the first uplink transmission. In some embodiments, the method 1000 comprises transmitting an indication indicating that the first uplink transmission is ceased, punctured, dropped, power scaled, or some combination thereof during the second time period. In various embodiments, the indication comprises a power offset field that indicates a transmit power change from the first time period to the second time period for the first uplink transmission.

In one embodiment, the indication is transmitted on a set of subcarriers on resources of a symbol of the first uplink transmission, the set of subcarriers is predetermined or configured, and the symbol is predetermined or configured. In certain embodiments, the second time instant occurs after the first time instant. In some embodiments, the first numerology comprises a first subcarrier spacing, a first symbol length for a cyclic prefix, or a combination thereof.

In various embodiments, the first transmission power is determined so that a total transmission power is constant during the first transmission period and the second transmission period. In one embodiment, the method 1000 comprises determining a second transmission power for the second uplink transmission, wherein the first transmission power is determined before the second transmission power. In certain embodiments, the method 1000 comprises determining a second transmission power for the second uplink transmission, wherein the first transmission power is determined based on the second transmission power.

In some embodiments, one power amplifier is used to transmit the first uplink transmission and the second uplink transmission. In various embodiments, the first serving cell is on a first carrier, the second serving cell is on a second carrier, and the first carrier and the second carrier are in a same frequency band. In one embodiment, the first carrier and the second carrier are contiguous in the same frequency band.

In certain embodiments, the first portion of the first uplink transmission is transmitted with the first transmission power up to an end of a latest transmission symbol of the first uplink transmission prior to a start of the second time period. In some embodiments, a duration of the transmission symbol is based on the first numerology. In various embodiments, the first portion of the first uplink transmission and the second portion of the first uplink transmission have a same symbol timing.

In one embodiment, the method 1000 comprises: determining a second transmission power for the second uplink transmission based at least partly on the second scheduling information; transmitting, during the second time period, the second uplink transmission with the second transmission power; determining a third transmission power for transmitting the second portion of the first uplink transmission; and transmitting, during the second time period, the second portion of the first uplink transmission and a first demodulation reference signal with the third transmission power; wherein the first demodulation reference signal punctures a portion of the first uplink transmission.

In certain embodiments, the method 1000 comprises transmitting, in a third time period after the second time period, a third portion of the first uplink transmission with a fourth transmission power, wherein the fourth transmission power is determined based on: the first transmission power; the second transmission power; the third transmission power; a power boosting factor for the first uplink transmission, the second uplink transmission, or a combination thereof; a scale factor for the first uplink transmission, the second uplink transmission, or a combination thereof; a configured maximum output power for the first serving cell; a total configured maximum output power; or some combination thereof.

In some embodiments, in response to a difference between the fourth transmission power and the second total transmission power being greater than a threshold, the transmission of the third portion of the first uplink transmission includes a second demodulation reference signal. In various embodiments, the method 1000 comprises, in response to the difference between the fourth transmission power and the second total transmission power being less than the threshold, transmitting the third portion of the first uplink transmission with the second total transmission power and not transmitting the second demodulation reference signal. In one embodiment, the method 1000 comprises ceasing transmission of the third portion of the first uplink transmission in response to: a number of symbols of the third portion being smaller than a first threshold; the fourth transmission power being smaller than a second threshold; or a combination thereof.

In certain embodiments, the fourth transmission power is equal to the second total transmission power. In some embodiments, the third transmission power is determined based on: the first transmission power; the second transmission power; a power boosting factor for the first uplink transmission, the second uplink transmission, or a combination thereof; a scale factor for the first uplink transmission, the second uplink transmission, or a combination thereof; a configured maximum output power for the first serving cell; a total configured maximum output power; or some combination thereof. In various embodiments, the method 1000 comprises transmitting an indication indicating that the first uplink transmission is ceased, punctured, dropped, power scaled, or some combination thereof after the second time period.

In one embodiment, the indication comprises a power offset field that indicates a transmit power change from the third transmission power to the fourth transmission power for the first uplink transmission. In certain embodiments, the indication is transmitted on a set of subcarriers on resources of a symbol of the first uplink transmission, the set of subcarriers is predetermined or configured, and the symbol is predetermined or configured. In some embodiments, the first scheduling information corresponds to a dynamic scheduling grant, a configured grant, or a combination thereof.

In various embodiments, power scaling a first symbol of the first uplink transmission, power boosting the first symbol, ceasing transmission of the first symbol, puncturing transmission of the first symbol, dropping transmission of the first symbol, or some combination thereof applies to an entire length of the first symbol if the first symbol overlaps a second symbol of the second uplink transmission.

In one embodiment, the method 1000 comprises receiving an indication indicating information for determining a third transmission power for transmitting the second uplink transmission during the second time period and for determining a fourth transmission power for transmitting the second portion of the first uplink transmission during the second time period, the information comprising: a first difference between the first transmission power and a configured maximum power for the first serving cell; a second difference between the configured maximum power and a configured maximum total power; the first transmission power; a second transmission power corresponding to the second uplink transmission; a duration of the first time period; a duration of the second time period; a first priority of contents of the first uplink transmission during the first time period and the second time period; a second priority of contents of the second uplink transmission; or some combination thereof.

In certain embodiments, the first priority of the contents of the first uplink transmission is based on a predetermined priority rule for uplink transmissions that gives higher priority to contents comprising uplink control information. In some embodiments, the first priority corresponds to the contents of the first uplink transmission during the first time period, the second time period, and the third time period. In various embodiments, the first uplink transmission and the second uplink transmission are decoded based on an estimated received power change, power limiting information that indicates whether a user equipment is power limited, an estimated transmit power difference, or some combination thereof, and the estimated received power change, the power limiting information, the estimated transmit power difference, or some combination thereof is used to scale a log likelihood ratio.

In one embodiment, the second uplink transmission occurs semi-persistently within the first transmission period such that there are alternating periods of time in which the first uplink transmission and the second uplink transmission overlap, and transmission power for the first uplink transmission alternates between a second transmission power while the first uplink transmission and the second uplink transmission overlap and a third transmission power while the first uplink transmission and the second uplink transmission do not overlap.

Figure 11:
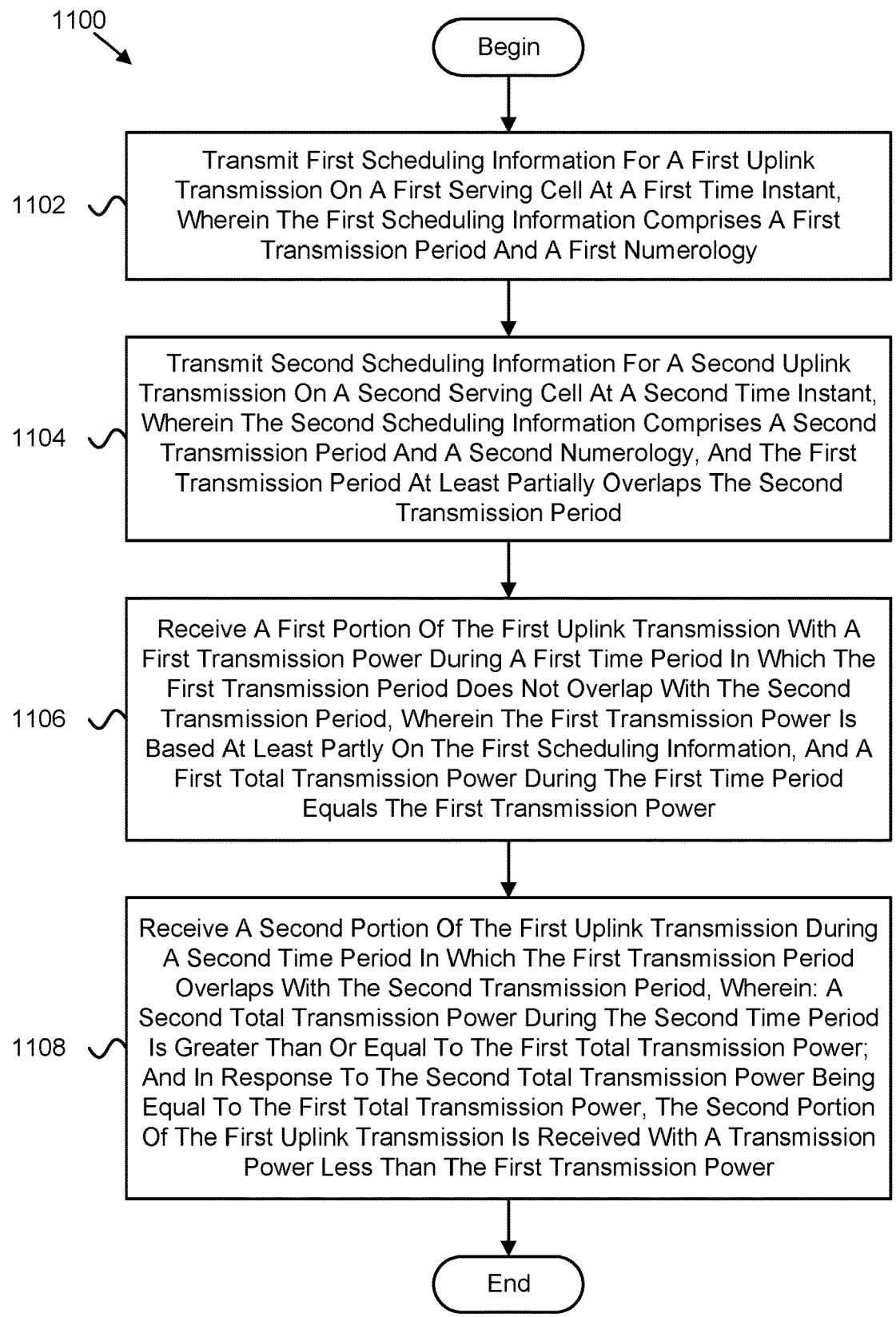
FIG. 11 is a flow chart diagram illustrating another embodiment of a method for transmission power control.

FIG. 11 is a flow chart diagram illustrating another embodiment of a method 1100 for transmission power control. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

The method 1100 may include transmitting 1102 first scheduling information for a first uplink transmission on a first serving cell at a first time instant. In such an embodiment, the first scheduling information comprises a first transmission period and a first numerology. In various embodiments, the method 1100 comprises transmitting 1104 second scheduling information for a second uplink transmission on a second serving cell at a second time instant. In such embodiments, the second scheduling information comprises a second transmission period and a second numerology, and the first transmission period at least partially overlaps the second transmission period. In certain embodiments, the method 1100 comprises receiving 1106 a first portion of the first uplink transmission with a first transmission power during a first time period in which the first transmission period does not overlap with the second transmission period. In such embodiments, the first transmission power is based at least partly on the first scheduling information, and a first total transmission power during the first time period equals the first transmission power. In some embodiments, the method 1100 comprises receiving 1108 a second portion of the first uplink transmission during a second time period in which the first transmission period overlaps with the second transmission period. In such embodiments: a second total transmission power during the second time period is greater than or equal to the first total transmission power; and, in response to the second total transmission power being equal to the first total transmission power, the second portion of the first uplink transmission is received with a transmission power less than the first transmission power.

In certain embodiments, the method 1100 comprises: receiving, during the second time period, the second uplink transmission with a third transmission power, wherein the third transmission power is determined to be equal to a minimum of the first transmission power and a second transmission power, and the second transmission power is determined based at least partly on the second scheduling information; and receiving, during the second time period, the second portion of the first uplink transmission with a fourth transmission power, wherein the fourth transmission power is equal to a maximum of zero and the first transmission power minus the third transmission power. In some embodiments, the method 1100 comprises receiving, during a third time period after the second time period, a third portion of the first uplink transmission with the first transmission power. In various embodiments, the first portion of the first uplink transmission, the second portion of the first uplink transmission, and the third portion of the first uplink transmission have a same symbol timing.

In one embodiment, a first demodulation reference signal is received with the first uplink transmission, and, in response to the second total transmission power being greater than the first total transmission power, the first demodulation reference signal is received with the first portion of the first uplink transmission and a second demodulation reference signal is received with the second portion of the first uplink transmission. In certain embodiments, the method 1100 comprises receiving an indication indicating that the first uplink transmission is ceased, punctured, dropped, power scaled, or some combination thereof during the second time period. In some embodiments, the indication comprises a power offset field that indicates a transmit power change from the first time period to the second time period for the first uplink transmission.

In various embodiments, the indication is received on a set of subcarriers on resources of a symbol of the first uplink transmission, the set of subcarriers is predetermined or configured, and the symbol is predetermined or configured. In one embodiment, the second time instant occurs after the first time instant. In certain embodiments, the first numerology comprises a first subcarrier spacing, a first symbol length for a cyclic prefix, or a combination thereof.

In some embodiments, the first transmission power is determined so that a total transmission power is constant during the first transmission period and the second transmission period. In various embodiments, the first serving cell is on a first carrier, the second serving cell is on a second carrier, and the first carrier and the second carrier are in a same frequency band. In one embodiment, the first carrier and the second carrier are contiguous in the same frequency band.

In certain embodiments, the first portion of the first uplink transmission is received with the first transmission power up to an end of a latest transmission symbol of the first uplink transmission prior to a start of the second time period. In some embodiments, a duration of the transmission symbol is based on the first numerology. In various embodiments, the first portion of the first uplink transmission and the second portion of the first uplink transmission have a same symbol timing.

In one embodiment, the method 1100 comprises: receiving, during the second time period, the second uplink transmission with a second transmission power, wherein the second transmission power is determined based at least partly on the second scheduling information; and receiving, during the second time period, the second portion of the first uplink transmission and a first demodulation reference signal with a third transmission power; wherein the first demodulation reference signal punctures a portion of the first uplink transmission.

In certain embodiments, the method 1100 comprises receiving, in a third time period after the second time period, a third portion of the first uplink transmission with a fourth transmission power, wherein the fourth transmission power is determined based on: the first transmission power; the second transmission power; the third transmission power; a power boosting factor for the first uplink transmission, the second uplink transmission, or a combination thereof; a scale factor for the first uplink transmission, the second uplink transmission, or a combination thereof; a configured maximum output power for the first serving cell; a total configured maximum output power; or some combination thereof.

In some embodiments, in response to a difference between the fourth transmission power and the second total transmission power being greater than a threshold, the reception of the third portion of the first uplink transmission includes a second demodulation reference signal. In various embodiments, the method 1100 comprises, in response to the difference between the fourth transmission power and the second total transmission power being less than the threshold, receiving the third portion of the first uplink transmission with the second total transmission power and not receiving the second demodulation reference signal. In one embodiment, the fourth transmission power is equal to the second total transmission power.

In certain embodiments, the third transmission power is determined based on: the first transmission power; the second transmission power; a power boosting factor for the first uplink transmission, the second uplink transmission, or a combination thereof a scale factor for the first uplink transmission, the second uplink transmission, or a combination thereof; a configured maximum output power for the first serving cell; a total configured maximum output power; or some combination thereof. In some embodiments, the method 1100 comprises receiving an indication indicating that the first uplink transmission is ceased, punctured, dropped, power scaled, or some combination thereof after the second time period. In various embodiments, the indication comprises a power offset field that indicates a transmit power change from the third transmission power to the fourth transmission power for the first uplink transmission.

In one embodiment, the indication is received on a set of subcarriers on resources of a symbol of the first uplink transmission, the set of subcarriers is predetermined or configured, and the symbol is predetermined or configured. In certain embodiments, the first scheduling information corresponds to a dynamic scheduling grant, a configured grant, or a combination thereof.

In some embodiments, the method 1100 comprises transmitting an indication indicating information for determining a third transmission power for receiving the second uplink transmission during the second time period and for determining a fourth transmission power for receiving the second portion of the first uplink transmission during the second time period, the information comprising: a first difference between the first transmission power and a configured maximum power for the first serving cell; a second difference between the configured maximum power and a configured maximum total power; the first transmission power; a second transmission power corresponding to the second uplink transmission; a duration of the first time period; a duration of the second time period; a first priority of contents of the first uplink transmission during the first time period and the second time period; a second priority of contents of the second uplink transmission; or some combination thereof.

In various embodiments, the first priority of the contents of the first uplink transmission is based on a predetermined priority rule for uplink transmissions that gives higher priority to contents comprising uplink control information. In one embodiment, the first priority corresponds to the contents of the first uplink transmission during the first time period, the second time period, and the third time period. In certain embodiments, the method 1100 comprises decoding the first uplink transmission and the second uplink transmission based on an estimated received power change, power limiting information that indicates whether a user equipment is power limited, an estimated transmit power difference, or some combination thereof, and the estimated received power change, the power limiting information, the estimated transmit power difference, or some combination thereof is used to scale a log likelihood ratio.

In some embodiments, the second uplink transmission occurs semi-persistently within the first transmission period such that there are alternating periods of time in which the first uplink transmission and the second uplink transmission overlap, and transmission power for the first uplink transmission alternates between a second transmission power while the first uplink transmission and the second uplink transmission overlap and a third transmission power while the first uplink transmission and the second uplink transmission do not overlap.

Figure 12:
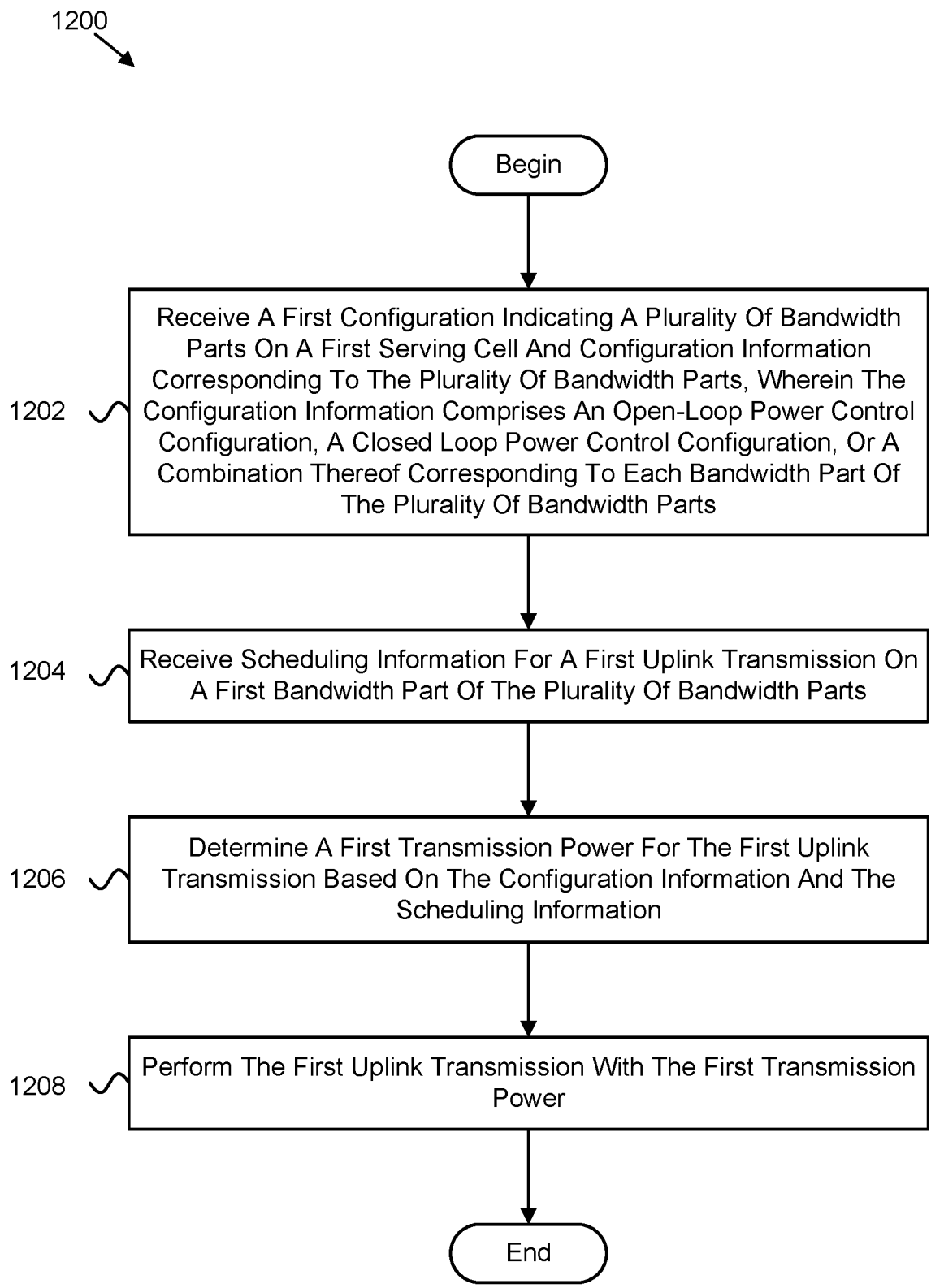
FIG. 12 is a flow chart diagram illustrating a further embodiment of a method for transmission power control.

FIG. 12 is a flow chart diagram illustrating a further embodiment of a method 1200 for transmission power control. In some embodiments, the method 1200 is performed by an apparatus, such as the remote unit 102. In certain embodiments, the method 1200 may be performed by a processor executing program code, for example, a microcontroller, a microprocessor, a CPU, a GPU, an auxiliary processing unit, a FPGA, or the like.

The method 1200 may include receiving 1202 a first configuration indicating a plurality of bandwidth parts on a first serving cell and configuration information corresponding to the plurality of bandwidth parts. In such embodiments, the configuration information comprises an open-loop power control configuration, a closed loop power control configuration, or a combination thereof corresponding to each bandwidth part of the plurality of bandwidth parts. In some embodiments, the method 1200 comprises receiving 1204 scheduling information for a first uplink transmission on a first bandwidth part of the plurality of bandwidth parts. In certain embodiments, the method 1200 comprises determining 1206 a first transmission power for the first uplink transmission based on the configuration information and the scheduling information. In various embodiments, the method 1200 comprises performing 1208 the first uplink transmission with the first transmission power.

In certain embodiments, the method 1200 comprises triggering a power headroom report in response to an initial configuration of a bandwidth part of the plurality of bandwidth parts. In some embodiments, the open-loop power control configuration comprises pathloss estimation reference signal information.

In various embodiments, the pathloss estimation reference signal information comprises: a first set of pathloss estimation reference signals for at least one spatial transmit filter corresponding to a transmitted synchronization signal block or physical broadcast channel; a second set of pathloss estimation reference signals for at least one spatial transmit filter corresponding to a physical uplink shared channel configuration, at least one configured sounding reference signal resource for physical uplink shared channel transmission, at least one configured sounding reference signal resource for channel state information acquisition, or a combination thereof; a third set of pathloss estimation reference signals for at least one spatial transmit filter corresponding to at least one channel state information reference signal resource for channel state information acquisition; a fourth set of pathloss estimation reference signals for at least one spatial transmit filter corresponding to at least one configured sounding reference signal resource for an uplink beam management procedure; a fifth set of pathloss estimation reference signals for at least one spatial transmit filter corresponding to a physical uplink control channel configuration; a sixth set of pathloss estimates for at least one network beam configured for a radio link monitoring procedure, a radio link failure procedure, a beam failure recovery procedure, a link recovery procedure, a beam failure detection procedure, a link failure detection procedure, or some combination thereof; or some combination thereof.

In one embodiment, a number of pathloss estimation reference signals simultaneously maintained at a user equipment is bounded by a function corresponding to: a number of transmitted synchronization signal blocks; a number of physical broadcast channels; a number equal to a function, multiple, offset, or combination thereof of a number of spatial transmission filters configured for operation; or some combination thereof. In certain embodiments, the pathloss estimation reference signal information for a physical uplink shared channel comprises the first set of pathloss estimation reference signals, the second set of pathloss estimation reference signals, the third set of pathloss estimation reference signals, the sixth set of pathloss estimation reference signals, or some combination thereof. In some embodiments, the pathloss estimation reference signal information for sounding reference signal transmission comprises the first set of pathloss estimation reference signals, the second set of pathloss estimation reference signals, the third set of pathloss estimation reference signals, the fourth set of pathloss estimation reference signals, the sixth set of pathloss estimation reference signals, or some combination thereof.

In various embodiments, the pathloss estimation reference signal information for a physical uplink control channel comprises the first set of pathloss estimation reference signals, the second set of pathloss estimation reference signals, the third set of pathloss estimation reference signals, the fifth set of pathloss estimation reference signals, the sixth set of pathloss estimation reference signals, or some combination thereof. In one embodiment, the open loop power control configuration comprises a configuration for: an enhanced mobile broadband service; an ultra-reliable low-latency communication service; two uplinks of a supplementary uplink configuration; different spatial transmission filters for uplink transmission; a configured grant operation; or some combination thereof. In certain embodiments, a number of uplink power control configurations is bounded by a number of supported traffic types, a number of supported service types, a number of uplinks per serving cell, a number of spatial transmission filters for uplink transmission, a number of configured grant configurations, or some combination thereof.

In some embodiments, the closed loop power control configuration is dependent upon at least a set of spatial transmission filters configured for uplink transmission. In various embodiments, a same closed loop power control process is configured for a first traffic type, a first service type, or a combination thereof and a second traffic type, a second service type, or a combination thereof, in response to a same spatial transmission filter configuration for both the first traffic type, the first service type, or the combination thereof and the second traffic type, the second service type, or the combination thereof. In one embodiment, a same closed loop power control process is configured for a first dynamically scheduled uplink transmission and a second configured grant uplink transmission, in response to a same spatial transmission filter configuration for both the first dynamically scheduled uplink transmission and the second configured grant uplink transmission.

In certain embodiments, the closed loop power control configuration includes at least one step size for a transmit power control command and at least one application time for the transmit power control command for each closed loop power control configuration of a plurality of closed loop power control configurations. In some embodiments, the at least one step size for the transmit power control command and the at least one application time for the transmit power control command are configured to be based on a grant type, a service type, a traffic type, or some combination thereof corresponding to each closed loop power control configuration of the plurality of closed loop power control configurations. In various embodiments, step sizes for the transmit power control command configured for an ultra-reliable low-latency communication service are larger than those configured for an enhanced mobile broadband service.

In one embodiment, application times for the transmit power control command configured for an ultra-reliable low-latency communication service are smaller than those configured for an enhanced mobile broadband service. In certain embodiments, step sizes for the transmit power control command configured for a configured grant uplink transmission are larger than those configured for a dynamically scheduled uplink transmission. In some embodiments, application times for the transmit power control command configured for a configured grant uplink transmission are smaller than those configured for a dynamically scheduled uplink transmission.

In various embodiments, the method 1200 comprises receiving a second configuration indicating: a new spatial transmission filter to be added to a set of configured spatial transmission filters; a new pathloss estimation reference signal to be added to a set of configured pathloss estimation reference signals; or a combination thereof. In one embodiment, a current accumulation status of a closed-loop power control corresponding to an existing spatial transmission filter of the set of configured spatial transmission filters is applied to the new spatial transmission filter in response to the new spatial transmission filter having spatial characteristics, quasi-location information, or a combination thereof similar to the existing spatial transmission filter. In certain embodiments, a current accumulation status of a closed-loop power control corresponding to an existing pathloss estimation reference signal of the set of configured pathloss estimation reference signals is applied to the new pathloss estimation reference signal in response to the new pathloss estimation reference signal having spatial characteristics, quasi-location information, or a combination thereof similar to the pathloss estimation reference signal.

In some embodiments, an accumulation status of a closed-loop power control corresponding to the new spatial transmission filter is reset in response to the new spatial transmission filter having spatial characteristics, quasi-location information, or a combination thereof different from existing spatial transmission filters in the set of configured spatial transmission filters. In various embodiments, an accumulation status of a closed-loop power control corresponding to the new pathloss estimation reference signal is reset in response to the new pathloss estimation reference signal having spatial characteristics, quasi-location information, or a combination thereof different from existing pathloss estimation reference signals in the set of configured pathloss estimation reference signals. In one embodiment, in response to a sounding reference signal resource not being tied to a physical uplink shared channel transmission, the closed loop power control configuration comprises one separate closed-loop power control for the sounding reference signal resource.

In certain embodiments, in response to a sounding reference signal resource not being tied to a physical uplink shared channel transmission, the closed loop power control configuration comprises no closed-loop power control for the sounding reference signal resource. In some embodiments, in response to: a first periodic sounding reference signal resource set for uplink beam management and a second aperiodic sounding reference signal resource set for uplink beam management being associated with a same set of spatial transmission filters; and the closed loop power control configuration comprising a first configured closed loop power control process for the first periodic sounding reference signal resource set; then the closed loop power control configuration comprises the first configured closed loop power control process for the second aperiodic sounding reference signal resource set.

In various embodiments, the first configured closed loop power control process carries over an accumulated power control adjustment state if switching transmission between the first periodic sounding reference signal resource set and the second aperiodic sounding reference signal resource set. In one embodiment, in response to a third aperiodic sounding reference signal resource set for uplink beam management being associated with a different set of spatial transmission filters than those associated with any periodic sounding reference signal resource sets for uplink beam management, the closed loop power control configuration comprises no closed-loop power control for the third aperiodic sounding reference signal resource set.

Figure 13:
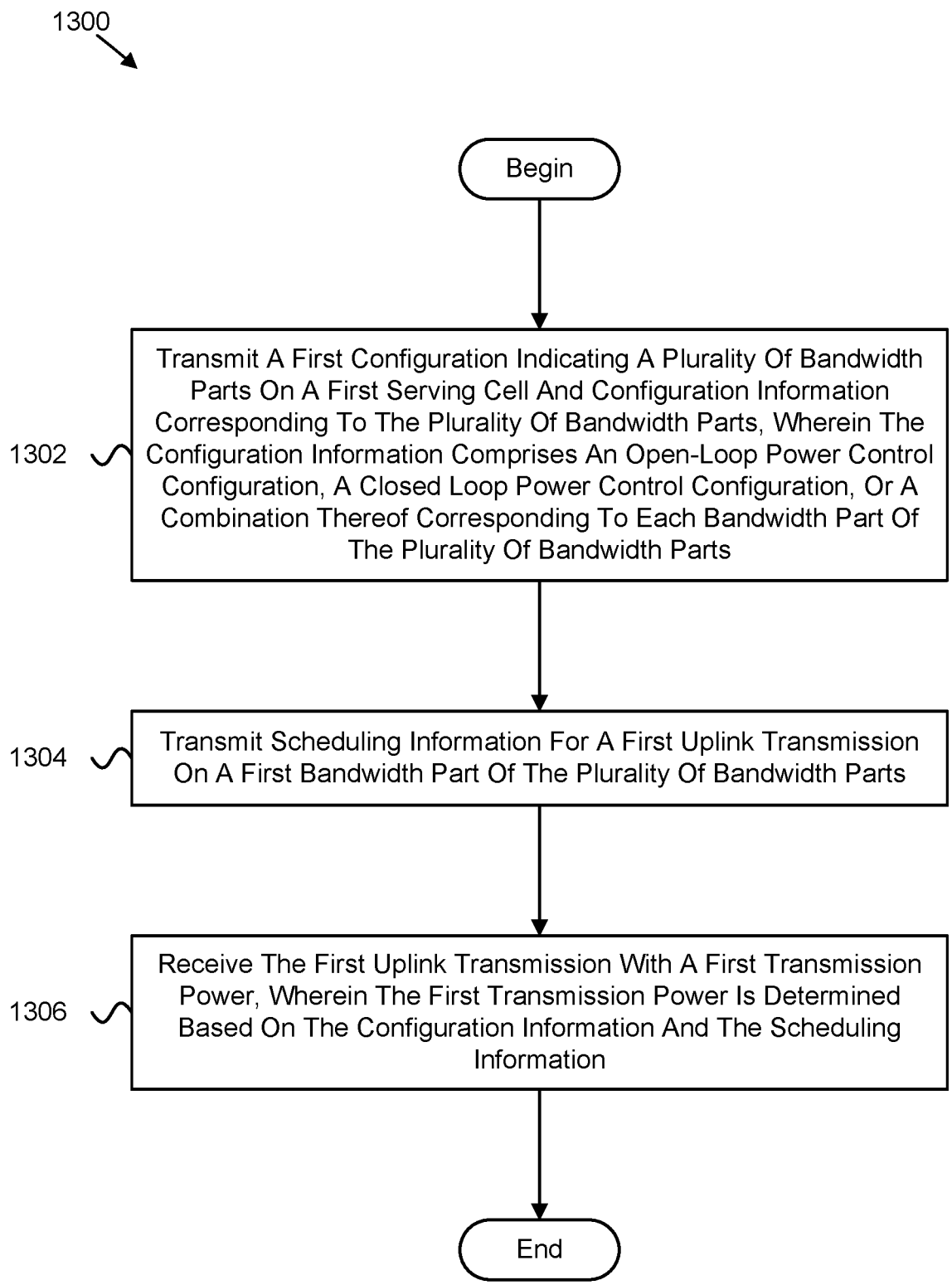
FIG. 13 is a flow chart diagram illustrating yet another embodiment of a method for transmission power control.

FIG. 13 is a flow chart diagram illustrating yet another embodiment of a method 1300 for transmission power control. In some embodiments, the method 1300 is performed by an apparatus, such as the network unit 104. In certain embodiments, the method 1300 may be performed by a processor executing program code, for example, a microcontroller, a microprocessor, a CPU, a GPU, an auxiliary processing unit, a FPGA, or the like.

The method 1300 may include transmitting 1302 a first configuration indicating a plurality of bandwidth parts on a first serving cell and configuration information corresponding to the plurality of bandwidth parts. In such an embodiment, the configuration information comprises an open-loop power control configuration, a closed loop power control configuration, or a combination thereof corresponding to each bandwidth part of the plurality of bandwidth parts. In various embodiments, the method 1300 comprises transmitting 1304 scheduling information for a first uplink transmission on a first bandwidth part of the plurality of bandwidth parts. In certain embodiments, the method 1300 comprises receiving 1306 the first uplink transmission with a first transmission power. In such embodiments, the first transmission power is determined based on the configuration information and the scheduling information.

In certain embodiments, the open-loop power control configuration comprises pathloss estimation reference signal information. In some embodiments, the pathloss estimation reference signal information comprises: a first set of pathloss estimation reference signals for at least one spatial transmit filter corresponding to a transmitted synchronization signal block or physical broadcast channel; a second set of pathloss estimation reference signals for at least one spatial transmit filter corresponding to a physical uplink shared channel configuration, at least one configured sounding reference signal resource for physical uplink shared channel transmission, at least one configured sounding reference signal resource for channel state information acquisition, or a combination thereof; a third set of pathloss estimation reference signals for at least one spatial transmit filter corresponding to at least one channel state information reference signal resource for channel state information acquisition; a fourth set of pathloss estimation reference signals for at least one spatial transmit filter corresponding to at least one configured sounding reference signal resource for an uplink beam management procedure; a fifth set of pathloss estimation reference signals for at least one spatial transmit filter corresponding to a physical uplink control channel configuration; a sixth set of pathloss estimates for at least one network beam configured for a radio link monitoring procedure, a radio link failure procedure, a beam failure recovery procedure, a link recovery procedure, a beam failure detection procedure, a link failure detection procedure, or some combination thereof; or some combination thereof.

In various embodiments, a number of pathloss estimation reference signals simultaneously maintained at a user equipment is bounded by a function corresponding to: a number of transmitted synchronization signal blocks; a number of physical broadcast channels; a number equal to a function, multiple, offset, or combination thereof of a number of spatial transmission filters configured for operation; or some combination thereof. In one embodiment, the pathloss estimation reference signal information for a physical uplink shared channel comprises the first set of pathloss estimation reference signals, the second set of pathloss estimation reference signals, the third set of pathloss estimation reference signals, the sixth set of pathloss estimation reference signals, or some combination thereof. In certain embodiments, the pathloss estimation reference signal information for sounding reference signal transmission comprises the first set of pathloss estimation reference signals, the second set of pathloss estimation reference signals, the third set of pathloss estimation reference signals, the fourth set of pathloss estimation reference signals, the sixth set of pathloss estimation reference signals, or some combination thereof.

In some embodiments, the pathloss estimation reference signal information for a physical uplink control channel comprises the first set of pathloss estimation reference signals, the second set of pathloss estimation reference signals, the third set of pathloss estimation reference signals, the fifth set of pathloss estimation reference signals, the sixth set of pathloss estimation reference signals, or some combination thereof. In various embodiments, the open loop power control configuration comprises a configuration for: an enhanced mobile broadband service; an ultra-reliable low-latency communication service; two uplinks of a supplementary uplink configuration; different spatial transmission filters for uplink transmission; a configured grant operation; or some combination thereof. In one embodiment, a number of uplink power control configurations is bounded by a number of supported traffic types, a number of supported service types, a number of uplinks per serving cell, a number of spatial transmission filters for uplink transmission, a number of configured grant configurations, or some combination thereof.

In certain embodiments, the closed loop power control configuration is dependent upon at least a set of spatial transmission filters configured for uplink transmission. In some embodiments, a same closed loop power control process is configured for a first traffic type, a first service type, or a combination thereof and a second traffic type, a second service type, or a combination thereof, in response to a same spatial transmission filter configuration for both the first traffic type, the first service type, or the combination thereof and the second traffic type, the second service type, or the combination thereof. In various embodiments, a same closed loop power control process is configured for a first dynamically scheduled uplink transmission and a second configured grant uplink transmission, in response to a same spatial transmission filter configuration for both the first dynamically scheduled uplink transmission and the second configured grant uplink transmission.

In one embodiment, the closed loop power control configuration includes at least one step size for a transmit power control command and at least one application time for the transmit power control command for each closed loop power control configuration of a plurality of closed loop power control configurations. In certain embodiments, the at least one step size for the transmit power control command and the at least one application time for the transmit power control command are configured to be based on a grant type, a service type, a traffic type, or some combination thereof corresponding to each closed loop power control configuration of the plurality of closed loop power control configurations. In some embodiments, step sizes for the transmit power control command configured for an ultra-reliable low-latency communication service are larger than those configured for an enhanced mobile broadband service.

In various embodiments, application times for the transmit power control command configured for an ultra-reliable low-latency communication service are smaller than those configured for an enhanced mobile broadband service. In one embodiment, step sizes for the transmit power control command configured for a configured grant uplink transmission are larger than those configured for a dynamically scheduled uplink transmission. In certain embodiments, application times for the transmit power control command configured for a configured grant uplink transmission are smaller than those configured for a dynamically scheduled uplink transmission.

In some embodiments, the method 1300 comprises transmitting a second configuration indicating: a new spatial transmission filter to be added to a set of configured spatial transmission filters; a new pathloss estimation reference signal to be added to a set of configured pathloss estimation reference signals; or a combination thereof. In various embodiments, a current accumulation status of a closed-loop power control corresponding to an existing spatial transmission filter of the set of configured spatial transmission filters is applied to the new spatial transmission filter in response to the new spatial transmission filter having spatial characteristics, quasi-location information, or a combination thereof similar to the existing spatial transmission filter. In one embodiment, a current accumulation status of a closed-loop power control corresponding to an existing pathloss estimation reference signal of the set of configured pathloss estimation reference signals is applied to the new pathloss estimation reference signal in response to the new pathloss estimation reference signal having spatial characteristics, quasi-location information, or a combination thereof similar to the pathloss estimation reference signal.

In certain embodiments, an accumulation status of a closed-loop power control corresponding to the new spatial transmission filter is reset in response to the new spatial transmission filter having spatial characteristics, quasi-location information, or a combination thereof different from existing spatial transmission filters in the set of configured spatial transmission filters. In some embodiments, an accumulation status of a closed-loop power control corresponding to the new pathloss estimation reference signal is reset in response to the new pathloss estimation reference signal having spatial characteristics, quasi-location information, or a combination thereof different from existing pathloss estimation reference signals in the set of configured pathloss estimation reference signals. In various embodiments, in response to a sounding reference signal resource not being tied to a physical uplink shared channel transmission, the closed loop power control configuration comprises one separate closed-loop power control for the sounding reference signal resource.

In one embodiment, in response to a sounding reference signal resource not being tied to a physical uplink shared channel transmission, the closed loop power control configuration comprises no closed-loop power control for the sounding reference signal resource. In certain embodiments, in response to: a first periodic sounding reference signal resource set for uplink beam management and a second aperiodic sounding reference signal resource set for uplink beam management being associated with a same set of spatial transmission filters; and the closed loop power control configuration comprising a first configured closed loop power control process for the first periodic sounding reference signal resource set; then the closed loop power control configuration comprises the first configured closed loop power control process for the second aperiodic sounding reference signal resource set. In some embodiments, the first configured closed loop power control process carries over an accumulated power control adjustment state if switching transmission between the first periodic sounding reference signal resource set and the second aperiodic sounding reference signal resource set.

In various embodiments, in response to a third aperiodic sounding reference signal resource set for uplink beam management being associated with a different set of spatial transmission filters than those associated with any periodic sounding reference signal resource sets for uplink beam management, the closed loop power control configuration comprises no closed-loop power control for the third aperiodic sounding reference signal resource set.

In one embodiment, a method comprises: receiving first scheduling information for a first uplink transmission on a first serving cell at a first time instant, wherein the first scheduling information comprises a first transmission period and a first numerology; receiving second scheduling information for a second uplink transmission on a second serving cell at a second time instant, wherein the second scheduling information comprises a second transmission period and a second numerology, and the first transmission period at least partially overlaps the second transmission period; determining a first transmission power for the first uplink transmission based at least partly on the first scheduling information; transmitting a first portion of the first uplink transmission with the first transmission power during a first time period in which the first transmission period does not overlap with the second transmission period, wherein a first total transmission power during the first time period equals the first transmission power; and transmitting a second portion of the first uplink transmission during a second time period in which the first transmission period overlaps with the second transmission period, wherein: a second total transmission power during the second time period is greater than or equal to the first total transmission power; and in response to the second total transmission power being equal to the first total transmission power, the second portion of the first uplink transmission is transmitted with a transmission power less than the first transmission power.

In certain embodiments, the method comprises: determining a second transmission power for the second uplink transmission based at least partly on the second scheduling information; determining a third transmission power equal to a minimum of: the first transmission power; and the second transmission power; transmitting, during the second time period, the second uplink transmission with the third transmission power; determining a fourth transmission power equal to a maximum of: zero; and the first transmission power minus the third transmission power; and transmitting, during the second time period, the second portion of the first uplink transmission with the fourth transmission power.

In some embodiments, the method comprises transmitting, during a third time period after the second time period, a third portion of the first uplink transmission with the first transmission power.

In various embodiments, the first portion of the first uplink transmission, the second portion of the first uplink transmission, and the third portion of the first uplink transmission have a same symbol timing.

In one embodiment, the method comprises ceasing transmission of the second portion of the first uplink transmission in response to the fourth transmission power being less than a predetermined threshold, a configured threshold, a dynamically indicated threshold, a semi dynamically indicated threshold, or some combination thereof.

In certain embodiments, a first demodulation reference signal is transmitted with the first uplink transmission, and, in response to the second total transmission power being greater than the first total transmission power, the first demodulation reference signal is transmitted with the first portion of the first uplink transmission and a second demodulation reference signal is transmitted with the second portion of the first uplink transmission.

In some embodiments, the method comprises transmitting an indication indicating that the first uplink transmission is ceased, punctured, dropped, power scaled, or some combination thereof during the second time period.

In various embodiments, the indication comprises a power offset field that indicates a transmit power change from the first time period to the second time period for the first uplink transmission.

In one embodiment, the indication is transmitted on a set of subcarriers on resources of a symbol of the first uplink transmission, the set of subcarriers is predetermined or configured, and the symbol is predetermined or configured.

In certain embodiments, the second time instant occurs after the first time instant.

In some embodiments, the first numerology comprises a first subcarrier spacing, a first symbol length for a cyclic prefix, or a combination thereof.

In various embodiments, the first transmission power is determined so that a total transmission power is constant during the first transmission period and the second transmission period.

In one embodiment, the method comprises determining a second transmission power for the second uplink transmission, wherein the first transmission power is determined before the second transmission power.

In certain embodiments, the method comprises determining a second transmission power for the second uplink transmission, wherein the first transmission power is determined based on the second transmission power.

In some embodiments, one power amplifier is used to transmit the first uplink transmission and the second uplink transmission.

In various embodiments, the first serving cell is on a first carrier, the second serving cell is on a second carrier, and the first carrier and the second carrier are in a same frequency band.

In one embodiment, the first carrier and the second carrier are contiguous in the same frequency band.

In certain embodiments, the first portion of the first uplink transmission is transmitted with the first transmission power up to an end of a latest transmission symbol of the first uplink transmission prior to a start of the second time period.

In some embodiments, a duration of the transmission symbol is based on the first numerology.

In various embodiments, the first portion of the first uplink transmission and the second portion of the first uplink transmission have a same symbol timing.

In one embodiment, the method comprises: determining a second transmission power for the second uplink transmission based at least partly on the second scheduling information; transmitting, during the second time period, the second uplink transmission with the second transmission power; determining a third transmission power for transmitting the second portion of the first uplink transmission; and transmitting, during the second time period, the second portion of the first uplink transmission and a first demodulation reference signal with the third transmission power; wherein the first demodulation reference signal punctures a portion of the first uplink transmission.

In certain embodiments, the method comprises transmitting, in a third time period after the second time period, a third portion of the first uplink transmission with a fourth transmission power, wherein the fourth transmission power is determined based on: the first transmission power; the second transmission power; the third transmission power; a power boosting factor for the first uplink transmission, the second uplink transmission, or a combination thereof; a scale factor for the first uplink transmission, the second uplink transmission, or a combination thereof; a configured maximum output power for the first serving cell; a total configured maximum output power; or some combination thereof.

In some embodiments, in response to a difference between the fourth transmission power and the second total transmission power being greater than a threshold, the transmission of the third portion of the first uplink transmission includes a second demodulation reference signal.

In various embodiments, the method comprises, in response to the difference between the fourth transmission power and the second total transmission power being less than the threshold, transmitting the third portion of the first uplink transmission with the second total transmission power and not transmitting the second demodulation reference signal.

In one embodiment, the method comprises ceasing transmission of the third portion of the first uplink transmission in response to: a number of symbols of the third portion being smaller than a first threshold; the fourth transmission power being smaller than a second threshold; or a combination thereof.

In certain embodiments, the fourth transmission power is equal to the second total transmission power.

In some embodiments, the third transmission power is determined based on: the first transmission power; the second transmission power; a power boosting factor for the first uplink transmission, the second uplink transmission, or a combination thereof; a scale factor for the first uplink transmission, the second uplink transmission, or a combination thereof; a configured maximum output power for the first serving cell; a total configured maximum output power; or some combination thereof.

In various embodiments, the method comprises transmitting an indication indicating that the first uplink transmission is ceased, punctured, dropped, power scaled, or some combination thereof after the second time period.

In one embodiment, the indication comprises a power offset field that indicates a transmit power change from the third transmission power to the fourth transmission power for the first uplink transmission.

In certain embodiments, the indication is transmitted on a set of subcarriers on resources of a symbol of the first uplink transmission, the set of subcarriers is predetermined or configured, and the symbol is predetermined or configured.

In some embodiments, the first scheduling information corresponds to a dynamic scheduling grant, a configured grant, or a combination thereof.

In various embodiments, power scaling a first symbol of the first uplink transmission, power boosting the first symbol, ceasing transmission of the first symbol, puncturing transmission of the first symbol, dropping transmission of the first symbol, or some combination thereof applies to an entire length of the first symbol if the first symbol overlaps a second symbol of the second uplink transmission.

In one embodiment, the method comprises receiving an indication indicating information for determining a third transmission power for transmitting the second uplink transmission during the second time period and for determining a fourth transmission power for transmitting the second portion of the first uplink transmission during the second time period, the information comprising: a first difference between the first transmission power and a configured maximum power for the first serving cell; a second difference between the configured maximum power and a configured maximum total power; the first transmission power; a second transmission power corresponding to the second uplink transmission; a duration of the first time period; a duration of the second time period; a first priority of contents of the first uplink transmission during the first time period and the second time period; a second priority of contents of the second uplink transmission; or some combination thereof.

In certain embodiments, the first priority of the contents of the first uplink transmission is based on a predetermined priority rule for uplink transmissions that gives higher priority to contents comprising uplink control information.

In some embodiments, the first priority corresponds to the contents of the first uplink transmission during the first time period, the second time period, and the third time period.

In various embodiments, the first uplink transmission and the second uplink transmission are decoded based on an estimated received power change, power limiting information that indicates whether a user equipment is power limited, an estimated transmit power difference, or some combination thereof, and the estimated received power change, the power limiting information, the estimated transmit power difference, or some combination thereof is used to scale a log likelihood ratio.

In one embodiment, the second uplink transmission occurs semi-persistently within the first transmission period such that there are alternating periods of time in which the first uplink transmission and the second uplink transmission overlap, and transmission power for the first uplink transmission alternates between a second transmission power while the first uplink transmission and the second uplink transmission overlap and a third transmission power while the first uplink transmission and the second uplink transmission do not overlap.

In one embodiment, an apparatus comprises: a receiver that: receives first scheduling information for a first uplink transmission on a first serving cell at a first time instant, wherein the first scheduling information comprises a first transmission period and a first numerology; and receives second scheduling information for a second uplink transmission on a second serving cell at a second time instant, wherein the second scheduling information comprises a second transmission period and a second numerology, and the first transmission period at least partially overlaps the second transmission period; a processor that determines a first transmission power for the first uplink transmission based at least partly on the first scheduling information; and a transmitter that: transmits a first portion of the first uplink transmission with the first transmission power during a first time period in which the first transmission period does not overlap with the second transmission period, wherein a first total transmission power during the first time period equals the first transmission power; and transmits a second portion of the first uplink transmission during a second time period in which the first transmission period overlaps with the second transmission period, wherein: a second total transmission power during the second time period is greater than or equal to the first total transmission power; and in response to the second total transmission power being equal to the first total transmission power, the second portion of the first uplink transmission is transmitted with a transmission power less than the first transmission power.

In certain embodiments: the processor: determines a second transmission power for the second uplink transmission based at least partly on the second scheduling information; determines a third transmission power equal to a minimum of: the first transmission power; and the second transmission power; the transmitter transmits, during the second time period, the second uplink transmission with the third transmission power; the processor determines a fourth transmission power equal to a maximum of: zero; and the first transmission power minus the third transmission power; and the transmitter transmits, during the second time period, the second portion of the first uplink transmission with the fourth transmission power.

In some embodiments, the transmitter transmits, during a third time period after the second time period, a third portion of the first uplink transmission with the first transmission power.

In various embodiments, the first portion of the first uplink transmission, the second portion of the first uplink transmission, and the third portion of the first uplink transmission have a same symbol timing.

In one embodiment, the transmitter ceases transmission of the second portion of the first uplink transmission in response to the fourth transmission power being less than a predetermined threshold, a configured threshold, a dynamically indicated threshold, a semi dynamically indicated threshold, or some combination thereof.

In certain embodiments, a first demodulation reference signal is transmitted with the first uplink transmission, and, in response to the second total transmission power being greater than the first total transmission power, the first demodulation reference signal is transmitted with the first portion of the first uplink transmission and a second demodulation reference signal is transmitted with the second portion of the first uplink transmission.

In some embodiments, the transmitter transmits an indication indicating that the first uplink transmission is ceased, punctured, dropped, power scaled, or some combination thereof during the second time period.

In various embodiments, the indication comprises a power offset field that indicates a transmit power change from the first time period to the second time period for the first uplink transmission.

In one embodiment, the indication is transmitted on a set of subcarriers on resources of a symbol of the first uplink transmission, the set of subcarriers is predetermined or configured, and the symbol is predetermined or configured.

In certain embodiments, the second time instant occurs after the first time instant.

In some embodiments, the first numerology comprises a first subcarrier spacing, a first symbol length for a cyclic prefix, or a combination thereof.

In various embodiments, the first transmission power is determined so that a total transmission power is constant during the first transmission period and the second transmission period.

In one embodiment, the processor determines a second transmission power for the second uplink transmission, wherein the first transmission power is determined before the second transmission power.

In certain embodiments, the processor determines a second transmission power for the second uplink transmission, wherein the first transmission power is determined based on the second transmission power.

In some embodiments, one power amplifier is used to transmit the first uplink transmission and the second uplink transmission.

In various embodiments, the first serving cell is on a first carrier, the second serving cell is on a second carrier, and the first carrier and the second carrier are in a same frequency band.

In one embodiment, the first carrier and the second carrier are contiguous in the same frequency band.

In certain embodiments, the first portion of the first uplink transmission is transmitted with the first transmission power up to an end of a latest transmission symbol of the first uplink transmission prior to a start of the second time period.

In some embodiments, a duration of the transmission symbol is based on the first numerology.

In various embodiments, the first portion of the first uplink transmission and the second portion of the first uplink transmission have a same symbol timing.

In one embodiment: the processor determines a second transmission power for the second uplink transmission based at least partly on the second scheduling information; the transmitter transmits, during the second time period, the second uplink transmission with the second transmission power; the processor determines a third transmission power for transmitting the second portion of the first uplink transmission; and the transmitter transmits, during the second time period, the second portion of the first uplink transmission and a first demodulation reference signal with the third transmission power; wherein the first demodulation reference signal punctures a portion of the first uplink transmission.

In certain embodiments, the transmitter transmits, in a third time period after the second time period, a third portion of the first uplink transmission with a fourth transmission power, wherein the fourth transmission power is determined based on: the first transmission power; the second transmission power; the third transmission power; a power boosting factor for the first uplink transmission, the second uplink transmission, or a combination thereof; a scale factor for the first uplink transmission, the second uplink transmission, or a combination thereof; a configured maximum output power for the first serving cell; a total configured maximum output power; or some combination thereof.

In some embodiments, in response to a difference between the fourth transmission power and the second total transmission power being greater than a threshold, the transmission of the third portion of the first uplink transmission includes a second demodulation reference signal.

In various embodiments, the transmitter, in response to the difference between the fourth transmission power and the second total transmission power being less than the threshold, transmits the third portion of the first uplink transmission with the second total transmission power and not transmitting the second demodulation reference signal.

In one embodiment, the transmitter ceases transmission of the third portion of the first uplink transmission in response to: a number of symbols of the third portion being smaller than a first threshold; the fourth transmission power being smaller than a second threshold; or a combination thereof.

In certain embodiments, the fourth transmission power is equal to the second total transmission power.

In some embodiments, the third transmission power is determined based on: the first transmission power; the second transmission power; a power boosting factor for the first uplink transmission, the second uplink transmission, or a combination thereof a scale factor for the first uplink transmission, the second uplink transmission, or a combination thereof; a configured maximum output power for the first serving cell; a total configured maximum output power; or some combination thereof.

In various embodiments, the transmitter transmits an indication indicating that the first uplink transmission is ceased, punctured, dropped, power scaled, or some combination thereof after the second time period.

In one embodiment, the indication comprises a power offset field that indicates a transmit power change from the third transmission power to the fourth transmission power for the first uplink transmission.

In certain embodiments, the indication is transmitted on a set of subcarriers on resources of a symbol of the first uplink transmission, the set of subcarriers is predetermined or configured, and the symbol is predetermined or configured.

In some embodiments, the first scheduling information corresponds to a dynamic scheduling grant, a configured grant, or a combination thereof.

In various embodiments, power scaling a first symbol of the first uplink transmission, power boosting the first symbol, ceasing transmission of the first symbol, puncturing transmission of the first symbol, dropping transmission of the first symbol, or some combination thereof applies to an entire length of the first symbol if the first symbol overlaps a second symbol of the second uplink transmission.

In one embodiment, the receiver receives an indication indicating information for determining a third transmission power for transmitting the second uplink transmission during the second time period and for determining a fourth transmission power for transmitting the second portion of the first uplink transmission during the second time period, the information comprising: a first difference between the first transmission power and a configured maximum power for the first serving cell; a second difference between the configured maximum power and a configured maximum total power; the first transmission power; a second transmission power corresponding to the second uplink transmission; a duration of the first time period; a duration of the second time period; a first priority of contents of the first uplink transmission during the first time period and the second time period; a second priority of contents of the second uplink transmission; or some combination thereof.

In certain embodiments, the first priority of the contents of the first uplink transmission is based on a predetermined priority rule for uplink transmissions that gives higher priority to contents comprising uplink control information.

In some embodiments, the first priority corresponds to the contents of the first uplink transmission during the first time period, the second time period, and the third time period.

In various embodiments, the first uplink transmission and the second uplink transmission are decoded based on an estimated received power change, power limiting information that indicates whether a user equipment is power limited, an estimated transmit power difference, or some combination thereof, and the estimated received power change, the power limiting information, the estimated transmit power difference, or some combination thereof is used to scale a log likelihood ratio.

In one embodiment, the second uplink transmission occurs semi-persistently within the first transmission period such that there are alternating periods of time in which the first uplink transmission and the second uplink transmission overlap, and transmission power for the first uplink transmission alternates between a second transmission power while the first uplink transmission and the second uplink transmission overlap and a third transmission power while the first uplink transmission and the second uplink transmission do not overlap.

In one embodiment, a method comprises: transmitting first scheduling information for a first uplink transmission on a first serving cell at a first time instant, wherein the first scheduling information comprises a first transmission period and a first numerology; transmitting second scheduling information for a second uplink transmission on a second serving cell at a second time instant, wherein the second scheduling information comprises a second transmission period and a second numerology, and the first transmission period at least partially overlaps the second transmission period; receiving a first portion of the first uplink transmission with a first transmission power during a first time period in which the first transmission period does not overlap with the second transmission period, wherein the first transmission power is based at least partly on the first scheduling information, and a first total transmission power during the first time period equals the first transmission power; and receiving a second portion of the first uplink transmission during a second time period in which the first transmission period overlaps with the second transmission period, wherein: a second total transmission power during the second time period is greater than or equal to the first total transmission power; and in response to the second total transmission power being equal to the first total transmission power, the second portion of the first uplink transmission is received with a transmission power less than the first transmission power.

In certain embodiments, the method comprises: receiving, during the second time period, the second uplink transmission with a third transmission power, wherein the third transmission power is determined to be equal to a minimum of the first transmission power and a second transmission power, and the second transmission power is determined based at least partly on the second scheduling information; and receiving, during the second time period, the second portion of the first uplink transmission with a fourth transmission power, wherein the fourth transmission power is equal to a maximum of zero and the first transmission power minus the third transmission power.

In some embodiments, the method comprises receiving, during a third time period after the second time period, a third portion of the first uplink transmission with the first transmission power.

In various embodiments, the first portion of the first uplink transmission, the second portion of the first uplink transmission, and the third portion of the first uplink transmission have a same symbol timing.

In one embodiment, a first demodulation reference signal is received with the first uplink transmission, and, in response to the second total transmission power being greater than the first total transmission power, the first demodulation reference signal is received with the first portion of the first uplink transmission and a second demodulation reference signal is received with the second portion of the first uplink transmission.

In certain embodiments, the method comprises receiving an indication indicating that the first uplink transmission is ceased, punctured, dropped, power scaled, or some combination thereof during the second time period.

In some embodiments, the indication comprises a power offset field that indicates a transmit power change from the first time period to the second time period for the first uplink transmission.

In various embodiments, the indication is received on a set of subcarriers on resources of a symbol of the first uplink transmission, the set of subcarriers is predetermined or configured, and the symbol is predetermined or configured.

In one embodiment, the second time instant occurs after the first time instant.

In certain embodiments, the first numerology comprises a first subcarrier spacing, a first symbol length for a cyclic prefix, or a combination thereof.

In some embodiments, the first transmission power is determined so that a total transmission power is constant during the first transmission period and the second transmission period.

In various embodiments, the first serving cell is on a first carrier, the second serving cell is on a second carrier, and the first carrier and the second carrier are in a same frequency band.

In one embodiment, the first carrier and the second carrier are contiguous in the same frequency band.

In certain embodiments, the first portion of the first uplink transmission is received with the first transmission power up to an end of a latest transmission symbol of the first uplink transmission prior to a start of the second time period.

In some embodiments, a duration of the transmission symbol is based on the first numerology.

In various embodiments, the first portion of the first uplink transmission and the second portion of the first uplink transmission have a same symbol timing.

In one embodiment, the method comprises: receiving, during the second time period, the second uplink transmission with a second transmission power, wherein the second transmission power is determined based at least partly on the second scheduling information; and receiving, during the second time period, the second portion of the first uplink transmission and a first demodulation reference signal with a third transmission power; wherein the first demodulation reference signal punctures a portion of the first uplink transmission.

In certain embodiments, the method comprises receiving, in a third time period after the second time period, a third portion of the first uplink transmission with a fourth transmission power, wherein the fourth transmission power is determined based on: the first transmission power; the second transmission power; the third transmission power; a power boosting factor for the first uplink transmission, the second uplink transmission, or a combination thereof; a scale factor for the first uplink transmission, the second uplink transmission, or a combination thereof; a configured maximum output power for the first serving cell; a total configured maximum output power; or some combination thereof.

In some embodiments, in response to a difference between the fourth transmission power and the second total transmission power being greater than a threshold, the reception of the third portion of the first uplink transmission includes a second demodulation reference signal.

In various embodiments, the method comprises, in response to the difference between the fourth transmission power and the second total transmission power being less than the threshold, receiving the third portion of the first uplink transmission with the second total transmission power and not receiving the second demodulation reference signal.

In one embodiment, the fourth transmission power is equal to the second total transmission power.

In certain embodiments, the third transmission power is determined based on: the first transmission power; the second transmission power; a power boosting factor for the first uplink transmission, the second uplink transmission, or a combination thereof; a scale factor for the first uplink transmission, the second uplink transmission, or a combination thereof; a configured maximum output power for the first serving cell; a total configured maximum output power; or some combination thereof.

In some embodiments, the method comprises receiving an indication indicating that the first uplink transmission is ceased, punctured, dropped, power scaled, or some combination thereof after the second time period.

In various embodiments, the indication comprises a power offset field that indicates a transmit power change from the third transmission power to the fourth transmission power for the first uplink transmission.

In one embodiment, the indication is received on a set of subcarriers on resources of a symbol of the first uplink transmission, the set of subcarriers is predetermined or configured, and the symbol is predetermined or configured.

In certain embodiments, the first scheduling information corresponds to a dynamic scheduling grant, a configured grant, or a combination thereof.

In some embodiments, the method comprises transmitting an indication indicating information for determining a third transmission power for receiving the second uplink transmission during the second time period and for determining a fourth transmission power for receiving the second portion of the first uplink transmission during the second time period, the information comprising: a first difference between the first transmission power and a configured maximum power for the first serving cell; a second difference between the configured maximum power and a configured maximum total power; the first transmission power; a second transmission power corresponding to the second uplink transmission; a duration of the first time period; a duration of the second time period; a first priority of contents of the first uplink transmission during the first time period and the second time period; a second priority of contents of the second uplink transmission; or some combination thereof.

In various embodiments, the first priority of the contents of the first uplink transmission is based on a predetermined priority rule for uplink transmissions that gives higher priority to contents comprising uplink control information.

In one embodiment, the first priority corresponds to the contents of the first uplink transmission during the first time period, the second time period, and the third time period.

In certain embodiments, the method comprises decoding the first uplink transmission and the second uplink transmission based on an estimated received power change, power limiting information that indicates whether a user equipment is power limited, an estimated transmit power difference, or some combination thereof, and the estimated received power change, the power limiting information, the estimated transmit power difference, or some combination thereof is used to scale a log likelihood ratio.

In some embodiments, the second uplink transmission occurs semi-persistently within the first transmission period such that there are alternating periods of time in which the first uplink transmission and the second uplink transmission overlap, and transmission power for the first uplink transmission alternates between a second transmission power while the first uplink transmission and the second uplink transmission overlap and a third transmission power while the first uplink transmission and the second uplink transmission do not overlap.

In one embodiment, an apparatus comprises: a transmitter that: transmits first scheduling information for a first uplink transmission on a first serving cell at a first time instant, wherein the first scheduling information comprises a first transmission period and a first numerology; and transmits second scheduling information for a second uplink transmission on a second serving cell at a second time instant, wherein the second scheduling information comprises a second transmission period and a second numerology, and the first transmission period at least partially overlaps the second transmission period; and a receiver that: receives a first portion of the first uplink transmission with a first transmission power during a first time period in which the first transmission period does not overlap with the second transmission period, wherein the first transmission power is based at least partly on the first scheduling information, and a first total transmission power during the first time period equals the first transmission power; and receives a second portion of the first uplink transmission during a second time period in which the first transmission period overlaps with the second transmission period, wherein: a second total transmission power during the second time period is greater than or equal to the first total transmission power; and in response to the second total transmission power being equal to the first total transmission power, the second portion of the first uplink transmission is received with a transmission power less than the first transmission power.

In certain embodiments, the receiver: receives, during the second time period, the second uplink transmission with a third transmission power, wherein the third transmission power is determined to be equal to a minimum of the first transmission power and a second transmission power, and the second transmission power is determined based at least partly on the second scheduling information; and receives, during the second time period, the second portion of the first uplink transmission with a fourth transmission power, wherein the fourth transmission power is equal to a maximum of zero and the first transmission power minus the third transmission power.

In some embodiments, the receiver receives, during a third time period after the second time period, a third portion of the first uplink transmission with the first transmission power.

In various embodiments, the first portion of the first uplink transmission, the second portion of the first uplink transmission, and the third portion of the first uplink transmission have a same symbol timing.

In one embodiment, a first demodulation reference signal is received with the first uplink transmission, and, in response to the second total transmission power being greater than the first total transmission power, the first demodulation reference signal is received with the first portion of the first uplink transmission and a second demodulation reference signal is received with the second portion of the first uplink transmission.

In certain embodiments, the receiver receives an indication indicating that the first uplink transmission is ceased, punctured, dropped, power scaled, or some combination thereof during the second time period.

In some embodiments, the indication comprises a power offset field that indicates a transmit power change from the first time period to the second time period for the first uplink transmission.

In various embodiments, the indication is received on a set of subcarriers on resources of a symbol of the first uplink transmission, the set of subcarriers is predetermined or configured, and the symbol is predetermined or configured.

In one embodiment, the second time instant occurs after the first time instant.

In certain embodiments, the first numerology comprises a first subcarrier spacing, a first symbol length for a cyclic prefix, or a combination thereof.

In some embodiments, the first transmission power is determined so that a total transmission power is constant during the first transmission period and the second transmission period.

In various embodiments, the first serving cell is on a first carrier, the second serving cell is on a second carrier, and the first carrier and the second carrier are in a same frequency band.

In one embodiment, the first carrier and the second carrier are contiguous in the same frequency band.

In certain embodiments, the first portion of the first uplink transmission is received with the first transmission power up to an end of a latest transmission symbol of the first uplink transmission prior to a start of the second time period.

In some embodiments, a duration of the transmission symbol is based on the first numerology.

In various embodiments, the first portion of the first uplink transmission and the second portion of the first uplink transmission have a same symbol timing.

In one embodiment, the receiver: receives, during the second time period, the second uplink transmission with a second transmission power, wherein the second transmission power is determined based at least partly on the second scheduling information; and receives, during the second time period, the second portion of the first uplink transmission and a first demodulation reference signal with a third transmission power; wherein the first demodulation reference signal punctures a portion of the first uplink transmission.

In certain embodiments, the receiver receives, in a third time period after the second time period, a third portion of the first uplink transmission with a fourth transmission power, wherein the fourth transmission power is determined based on: the first transmission power; the second transmission power; the third transmission power; a power boosting factor for the first uplink transmission, the second uplink transmission, or a combination thereof; a scale factor for the first uplink transmission, the second uplink transmission, or a combination thereof; a configured maximum output power for the first serving cell; a total configured maximum output power; or some combination thereof.

In some embodiments, in response to a difference between the fourth transmission power and the second total transmission power being greater than a threshold, the reception of the third portion of the first uplink transmission includes a second demodulation reference signal.

In various embodiments, the receiver, in response to the difference between the fourth transmission power and the second total transmission power being less than the threshold, receives the third portion of the first uplink transmission with the second total transmission power and not receiving the second demodulation reference signal.

In one embodiment, the fourth transmission power is equal to the second total transmission power.

In certain embodiments, the third transmission power is determined based on: the first transmission power; the second transmission power; a power boosting factor for the first uplink transmission, the second uplink transmission, or a combination thereof; a scale factor for the first uplink transmission, the second uplink transmission, or a combination thereof; a configured maximum output power for the first serving cell; a total configured maximum output power; or some combination thereof.

In some embodiments, the receiver receives an indication indicating that the first uplink transmission is ceased, punctured, dropped, power scaled, or some combination thereof after the second time period.

In various embodiments, the indication comprises a power offset field that indicates a transmit power change from the third transmission power to the fourth transmission power for the first uplink transmission.

In one embodiment, the indication is received on a set of subcarriers on resources of a symbol of the first uplink transmission, the set of subcarriers is predetermined or configured, and the symbol is predetermined or configured.

In certain embodiments, the first scheduling information corresponds to a dynamic scheduling grant, a configured grant, or a combination thereof.

In some embodiments, the transmitter transmits an indication indicating information for determining a third transmission power for receiving the second uplink transmission during the second time period and for determining a fourth transmission power for receiving the second portion of the first uplink transmission during the second time period, the information comprising: a first difference between the first transmission power and a configured maximum power for the first serving cell; a second difference between the configured maximum power and a configured maximum total power; the first transmission power; a second transmission power corresponding to the second uplink transmission; a duration of the first time period; a duration of the second time period; a first priority of contents of the first uplink transmission during the first time period and the second time period; a second priority of contents of the second uplink transmission; or some combination thereof.

In various embodiments, the first priority of the contents of the first uplink transmission is based on a predetermined priority rule for uplink transmissions that gives higher priority to contents comprising uplink control information.

In one embodiment, the first priority corresponds to the contents of the first uplink transmission during the first time period, the second time period, and the third time period.

In certain embodiments, the apparatus comprises a processor that decodes the first uplink transmission and the second uplink transmission based on an estimated received power change, power limiting information that indicates whether a user equipment is power limited, an estimated transmit power difference, or some combination thereof, and the estimated received power change, the power limiting information, the estimated transmit power difference, or some combination thereof is used to scale a log likelihood ratio.

In some embodiments, the second uplink transmission occurs semi-persistently within the first transmission period such that there are alternating periods of time in which the first uplink transmission and the second uplink transmission overlap, and transmission power for the first uplink transmission alternates between a second transmission power while the first uplink transmission and the second uplink transmission overlap and a third transmission power while the first uplink transmission and the second uplink transmission do not overlap.

In one embodiment, a method comprises: receiving a first configuration indicating a plurality of bandwidth parts on a first serving cell and configuration information corresponding to the plurality of bandwidth parts, wherein the configuration information comprises an open-loop power control configuration, a closed loop power control configuration, or a combination thereof corresponding to each bandwidth part of the plurality of bandwidth parts; receiving scheduling information for a first uplink transmission on a first bandwidth part of the plurality of bandwidth parts; determining a first transmission power for the first uplink transmission based on the configuration information and the scheduling information; and performing the first uplink transmission with the first transmission power.

In certain embodiments, the method comprises triggering a power headroom report in response to an initial configuration of a bandwidth part of the plurality of bandwidth parts.

In some embodiments, the open-loop power control configuration comprises pathloss estimation reference signal information.

In various embodiments, the pathloss estimation reference signal information comprises: a first set of pathloss estimation reference signals for at least one spatial transmit filter corresponding to a transmitted synchronization signal block or physical broadcast channel; a second set of pathloss estimation reference signals for at least one spatial transmit filter corresponding to a physical uplink shared channel configuration, at least one configured sounding reference signal resource for physical uplink shared channel transmission, at least one configured sounding reference signal resource for channel state information acquisition, or a combination thereof; a third set of pathloss estimation reference signals for at least one spatial transmit filter corresponding to at least one channel state information reference signal resource for channel state information acquisition; a fourth set of pathloss estimation reference signals for at least one spatial transmit filter corresponding to at least one configured sounding reference signal resource for an uplink beam management procedure; a fifth set of pathloss estimation reference signals for at least one spatial transmit filter corresponding to a physical uplink control channel configuration; a sixth set of pathloss estimates for at least one network beam configured for a radio link monitoring procedure, a radio link failure procedure, a beam failure recovery procedure, a link recovery procedure, a beam failure detection procedure, a link failure detection procedure, or some combination thereof; or some combination thereof.

In one embodiment, a number of pathloss estimation reference signals simultaneously maintained at a user equipment is bounded by a function corresponding to: a number of transmitted synchronization signal blocks; a number of physical broadcast channels; a number equal to a function, multiple, offset, or combination thereof of a number of spatial transmission filters configured for operation; or some combination thereof.

In certain embodiments, the pathloss estimation reference signal information for a physical uplink shared channel comprises the first set of pathloss estimation reference signals, the second set of pathloss estimation reference signals, the third set of pathloss estimation reference signals, the sixth set of pathloss estimation reference signals, or some combination thereof.

In some embodiments, the pathloss estimation reference signal information for sounding reference signal transmission comprises the first set of pathloss estimation reference signals, the second set of pathloss estimation reference signals, the third set of pathloss estimation reference signals, the fourth set of pathloss estimation reference signals, the sixth set of pathloss estimation reference signals, or some combination thereof.

In various embodiments, the pathloss estimation reference signal information for a physical uplink control channel comprises the first set of pathloss estimation reference signals, the second set of pathloss estimation reference signals, the third set of pathloss estimation reference signals, the fifth set of pathloss estimation reference signals, the sixth set of pathloss estimation reference signals, or some combination thereof.

In one embodiment, the open loop power control configuration comprises a configuration for: an enhanced mobile broadband service; an ultra-reliable low-latency communication service; two uplinks of a supplementary uplink configuration; different spatial transmission filters for uplink transmission; a configured grant operation; or some combination thereof.

In certain embodiments, a number of uplink power control configurations is bounded by a number of supported traffic types, a number of supported service types, a number of uplinks per serving cell, a number of spatial transmission filters for uplink transmission, a number of configured grant configurations, or some combination thereof.

In some embodiments, the closed loop power control configuration is dependent upon at least a set of spatial transmission filters configured for uplink transmission.

In various embodiments, a same closed loop power control process is configured for a first traffic type, a first service type, or a combination thereof and a second traffic type, a second service type, or a combination thereof, in response to a same spatial transmission filter configuration for both the first traffic type, the first service type, or the combination thereof and the second traffic type, the second service type, or the combination thereof.

In one embodiment, a same closed loop power control process is configured for a first dynamically scheduled uplink transmission and a second configured grant uplink transmission, in response to a same spatial transmission filter configuration for both the first dynamically scheduled uplink transmission and the second configured grant uplink transmission.

In certain embodiments, the closed loop power control configuration includes at least one step size for a transmit power control command and at least one application time for the transmit power control command for each closed loop power control configuration of a plurality of closed loop power control configurations.

In some embodiments, the at least one step size for the transmit power control command and the at least one application time for the transmit power control command are configured to be based on a grant type, a service type, a traffic type, or some combination thereof corresponding to each closed loop power control configuration of the plurality of closed loop power control configurations.

In various embodiments, step sizes for the transmit power control command configured for an ultra-reliable low-latency communication service are larger than those configured for an enhanced mobile broadband service.

In one embodiment, application times for the transmit power control command configured for an ultra-reliable low-latency communication service are smaller than those configured for an enhanced mobile broadband service.

In certain embodiments, step sizes for the transmit power control command configured for a configured grant uplink transmission are larger than those configured for a dynamically scheduled uplink transmission.

In some embodiments, application times for the transmit power control command configured for a configured grant uplink transmission are smaller than those configured for a dynamically scheduled uplink transmission.

In various embodiments, the method comprises receiving a second configuration indicating: a new spatial transmission filter to be added to a set of configured spatial transmission filters; a new pathloss estimation reference signal to be added to a set of configured pathloss estimation reference signals; or a combination thereof.

In one embodiment, a current accumulation status of a closed-loop power control corresponding to an existing spatial transmission filter of the set of configured spatial transmission filters is applied to the new spatial transmission filter in response to the new spatial transmission filter having spatial characteristics, quasi-location information, or a combination thereof similar to the existing spatial transmission filter.

In certain embodiments, a current accumulation status of a closed-loop power control corresponding to an existing pathloss estimation reference signal of the set of configured pathloss estimation reference signals is applied to the new pathloss estimation reference signal in response to the new pathloss estimation reference signal having spatial characteristics, quasi-location information, or a combination thereof similar to the pathloss estimation reference signal.

In some embodiments, an accumulation status of a closed-loop power control corresponding to the new spatial transmission filter is reset in response to the new spatial transmission filter having spatial characteristics, quasi-location information, or a combination thereof different from existing spatial transmission filters in the set of configured spatial transmission filters.

In various embodiments, an accumulation status of a closed-loop power control corresponding to the new pathloss estimation reference signal is reset in response to the new pathloss estimation reference signal having spatial characteristics, quasi-location information, or a combination thereof different from existing pathloss estimation reference signals in the set of configured pathloss estimation reference signals.

In one embodiment, in response to a sounding reference signal resource not being tied to a physical uplink shared channel transmission, the closed loop power control configuration comprises one separate closed-loop power control for the sounding reference signal resource.

In certain embodiments, in response to a sounding reference signal resource not being tied to a physical uplink shared channel transmission, the closed loop power control configuration comprises no closed-loop power control for the sounding reference signal resource.

In some embodiments, in response to: a first periodic sounding reference signal resource set for uplink beam management and a second aperiodic sounding reference signal resource set for uplink beam management being associated with a same set of spatial transmission filters; and the closed loop power control configuration comprising a first configured closed loop power control process for the first periodic sounding reference signal resource set; then the closed loop power control configuration comprises the first configured closed loop power control process for the second aperiodic sounding reference signal resource set.

In various embodiments, the first configured closed loop power control process carries over an accumulated power control adjustment state if switching transmission between the first periodic sounding reference signal resource set and the second aperiodic sounding reference signal resource set.

In one embodiment, in response to a third aperiodic sounding reference signal resource set for uplink beam management being associated with a different set of spatial transmission filters than those associated with any periodic sounding reference signal resource sets for uplink beam management, the closed loop power control configuration comprises no closed-loop power control for the third aperiodic sounding reference signal resource set.

In one embodiment, an apparatus comprises: a receiver that: receives a first configuration indicating a plurality of bandwidth parts on a first serving cell and configuration information corresponding to the plurality of bandwidth parts, wherein the configuration information comprises an open-loop power control configuration, a closed loop power control configuration, or a combination thereof corresponding to each bandwidth part of the plurality of bandwidth parts; and receives scheduling information for a first uplink transmission on a first bandwidth part of the plurality of bandwidth parts; and a processor that: determines a first transmission power for the first uplink transmission based on the configuration information and the scheduling information; and performs the first uplink transmission with the first transmission power.

In certain embodiments, the processor triggers a power headroom report in response to an initial configuration of a bandwidth part of the plurality of bandwidth parts.

In some embodiments, the open-loop power control configuration comprises pathloss estimation reference signal information.

In various embodiments, the pathloss estimation reference signal information comprises: a first set of pathloss estimation reference signals for at least one spatial transmit filter corresponding to a transmitted synchronization signal block or physical broadcast channel; a second set of pathloss estimation reference signals for at least one spatial transmit filter corresponding to a physical uplink shared channel configuration, at least one configured sounding reference signal resource for physical uplink shared channel transmission, at least one configured sounding reference signal resource for channel state information acquisition, or a combination thereof; a third set of pathloss estimation reference signals for at least one spatial transmit filter corresponding to at least one channel state information reference signal resource for channel state information acquisition; a fourth set of pathloss estimation reference signals for at least one spatial transmit filter corresponding to at least one configured sounding reference signal resource for an uplink beam management procedure; a fifth set of pathloss estimation reference signals for at least one spatial transmit filter corresponding to a physical uplink control channel configuration; a sixth set of pathloss estimates for at least one network beam configured for a radio link monitoring procedure, a radio link failure procedure, a beam failure recovery procedure, a link recovery procedure, a beam failure detection procedure, a link failure detection procedure, or some combination thereof; or some combination thereof.

In one embodiment, a number of pathloss estimation reference signals simultaneously maintained at a user equipment is bounded by a function corresponding to: a number of transmitted synchronization signal blocks; a number of physical broadcast channels; a number equal to a function, multiple, offset, or combination thereof of a number of spatial transmission filters configured for operation; or some combination thereof.

In certain embodiments, the pathloss estimation reference signal information for a physical uplink shared channel comprises the first set of pathloss estimation reference signals, the second set of pathloss estimation reference signals, the third set of pathloss estimation reference signals, the sixth set of pathloss estimation reference signals, or some combination thereof.

In some embodiments, the pathloss estimation reference signal information for sounding reference signal transmission comprises the first set of pathloss estimation reference signals, the second set of pathloss estimation reference signals, the third set of pathloss estimation reference signals, the fourth set of pathloss estimation reference signals, the sixth set of pathloss estimation reference signals, or some combination thereof.

In various embodiments, the pathloss estimation reference signal information for a physical uplink control channel comprises the first set of pathloss estimation reference signals, the second set of pathloss estimation reference signals, the third set of pathloss estimation reference signals, the fifth set of pathloss estimation reference signals, the sixth set of pathloss estimation reference signals, or some combination thereof.

In one embodiment, the open loop power control configuration comprises a configuration for: an enhanced mobile broadband service; an ultra-reliable low-latency communication service; two uplinks of a supplementary uplink configuration; different spatial transmission filters for uplink transmission; a configured grant operation; or some combination thereof.

In certain embodiments, a number of uplink power control configurations is bounded by a number of supported traffic types, a number of supported service types, a number of uplinks per serving cell, a number of spatial transmission filters for uplink transmission, a number of configured grant configurations, or some combination thereof.

In some embodiments, the closed loop power control configuration is dependent upon at least a set of spatial transmission filters configured for uplink transmission.

In various embodiments, a same closed loop power control process is configured for a first traffic type, a first service type, or a combination thereof and a second traffic type, a second service type, or a combination thereof, in response to a same spatial transmission filter configuration for both the first traffic type, the first service type, or the combination thereof and the second traffic type, the second service type, or the combination thereof.

In one embodiment, a same closed loop power control process is configured for a first dynamically scheduled uplink transmission and a second configured grant uplink transmission, in response to a same spatial transmission filter configuration for both the first dynamically scheduled uplink transmission and the second configured grant uplink transmission.

In certain embodiments, the closed loop power control configuration includes at least one step size for a transmit power control command and at least one application time for the transmit power control command for each closed loop power control configuration of a plurality of closed loop power control configurations.

In some embodiments, the at least one step size for the transmit power control command and the at least one application time for the transmit power control command are configured to be based on a grant type, a service type, a traffic type, or some combination thereof corresponding to each closed loop power control configuration of the plurality of closed loop power control configurations.

In various embodiments, step sizes for the transmit power control command configured for an ultra-reliable low-latency communication service are larger than those configured for an enhanced mobile broadband service.

In one embodiment, application times for the transmit power control command configured for an ultra-reliable low-latency communication service are smaller than those configured for an enhanced mobile broadband service.

In certain embodiments, step sizes for the transmit power control command configured for a configured grant uplink transmission are larger than those configured for a dynamically scheduled uplink transmission.

In some embodiments, application times for the transmit power control command configured for a configured grant uplink transmission are smaller than those configured for a dynamically scheduled uplink transmission.

In various embodiments, the receiver receives a second configuration indicating: a new spatial transmission filter to be added to a set of configured spatial transmission filters; a new pathloss estimation reference signal to be added to a set of configured pathloss estimation reference signals; or a combination thereof.

In one embodiment, a current accumulation status of a closed-loop power control corresponding to an existing spatial transmission filter of the set of configured spatial transmission filters is applied to the new spatial transmission filter in response to the new spatial transmission filter having spatial characteristics, quasi-location information, or a combination thereof similar to the existing spatial transmission filter.

In certain embodiments, a current accumulation status of a closed-loop power control corresponding to an existing pathloss estimation reference signal of the set of configured pathloss estimation reference signals is applied to the new pathloss estimation reference signal in response to the new pathloss estimation reference signal having spatial characteristics, quasi-location information, or a combination thereof similar to the pathloss estimation reference signal.

In some embodiments, an accumulation status of a closed-loop power control corresponding to the new spatial transmission filter is reset in response to the new spatial transmission filter having spatial characteristics, quasi-location information, or a combination thereof different from existing spatial transmission filters in the set of configured spatial transmission filters.

In various embodiments, an accumulation status of a closed-loop power control corresponding to the new pathloss estimation reference signal is reset in response to the new pathloss estimation reference signal having spatial characteristics, quasi-location information, or a combination thereof different from existing pathloss estimation reference signals in the set of configured pathloss estimation reference signals.

In one embodiment, in response to a sounding reference signal resource not being tied to a physical uplink shared channel transmission, the closed loop power control configuration comprises one separate closed-loop power control for the sounding reference signal resource.

In certain embodiments, in response to a sounding reference signal resource not being tied to a physical uplink shared channel transmission, the closed loop power control configuration comprises no closed-loop power control for the sounding reference signal resource.

In some embodiments, in response to: a first periodic sounding reference signal resource set for uplink beam management and a second aperiodic sounding reference signal resource set for uplink beam management being associated with a same set of spatial transmission filters; and the closed loop power control configuration comprising a first configured closed loop power control process for the first periodic sounding reference signal resource set; then the closed loop power control configuration comprises the first configured closed loop power control process for the second aperiodic sounding reference signal resource set.

In various embodiments, the first configured closed loop power control process carries over an accumulated power control adjustment state if switching transmission between the first periodic sounding reference signal resource set and the second aperiodic sounding reference signal resource set.

In one embodiment, in response to a third aperiodic sounding reference signal resource set for uplink beam management being associated with a different set of spatial transmission filters than those associated with any periodic sounding reference signal resource sets for uplink beam management, the closed loop power control configuration comprises no closed-loop power control for the third aperiodic sounding reference signal resource set.

In one embodiment, a method comprises: transmitting a first configuration indicating a plurality of bandwidth parts on a first serving cell and configuration information corresponding to the plurality of bandwidth parts, wherein the configuration information comprises an open-loop power control configuration, a closed loop power control configuration, or a combination thereof corresponding to each bandwidth part of the plurality of bandwidth parts; transmitting scheduling information for a first uplink transmission on a first bandwidth part of the plurality of bandwidth parts; and receiving the first uplink transmission with a first transmission power, wherein the first transmission power is determined based on the configuration information and the scheduling information.

In certain embodiments, the open-loop power control configuration comprises pathloss estimation reference signal information.

In some embodiments, the pathloss estimation reference signal information comprises: a first set of pathloss estimation reference signals for at least one spatial transmit filter corresponding to a transmitted synchronization signal block or physical broadcast channel; a second set of pathloss estimation reference signals for at least one spatial transmit filter corresponding to a physical uplink shared channel configuration, at least one configured sounding reference signal resource for physical uplink shared channel transmission, at least one configured sounding reference signal resource for channel state information acquisition, or a combination thereof; a third set of pathloss estimation reference signals for at least one spatial transmit filter corresponding to at least one channel state information reference signal resource for channel state information acquisition; a fourth set of pathloss estimation reference signals for at least one spatial transmit filter corresponding to at least one configured sounding reference signal resource for an uplink beam management procedure; a fifth set of pathloss estimation reference signals for at least one spatial transmit filter corresponding to a physical uplink control channel configuration; a sixth set of pathloss estimates for at least one network beam configured for a radio link monitoring procedure, a radio link failure procedure, a beam failure recovery procedure, a link recovery procedure, a beam failure detection procedure, a link failure detection procedure, or some combination thereof; or some combination thereof.

In various embodiments, a number of pathloss estimation reference signals simultaneously maintained at a user equipment is bounded by a function corresponding to: a number of transmitted synchronization signal blocks; a number of physical broadcast channels; a number equal to a function, multiple, offset, or combination thereof of a number of spatial transmission filters configured for operation; or some combination thereof.

In one embodiment, the pathloss estimation reference signal information for a physical uplink shared channel comprises the first set of pathloss estimation reference signals, the second set of pathloss estimation reference signals, the third set of pathloss estimation reference signals, the sixth set of pathloss estimation reference signals, or some combination thereof.

In certain embodiments, the pathloss estimation reference signal information for sounding reference signal transmission comprises the first set of pathloss estimation reference signals, the second set of pathloss estimation reference signals, the third set of pathloss estimation reference signals, the fourth set of pathloss estimation reference signals, the sixth set of pathloss estimation reference signals, or some combination thereof.

In some embodiments, the pathloss estimation reference signal information for a physical uplink control channel comprises the first set of pathloss estimation reference signals, the second set of pathloss estimation reference signals, the third set of pathloss estimation reference signals, the fifth set of pathloss estimation reference signals, the sixth set of pathloss estimation reference signals, or some combination thereof.

In various embodiments, the open loop power control configuration comprises a configuration for: an enhanced mobile broadband service; an ultra-reliable low-latency communication service; two uplinks of a supplementary uplink configuration; different spatial transmission filters for uplink transmission; a configured grant operation; or some combination thereof.

In one embodiment, a number of uplink power control configurations is bounded by a number of supported traffic types, a number of supported service types, a number of uplinks per serving cell, a number of spatial transmission filters for uplink transmission, a number of configured grant configurations, or some combination thereof.

In certain embodiments, the closed loop power control configuration is dependent upon at least a set of spatial transmission filters configured for uplink transmission.

In some embodiments, a same closed loop power control process is configured for a first traffic type, a first service type, or a combination thereof and a second traffic type, a second service type, or a combination thereof, in response to a same spatial transmission filter configuration for both the first traffic type, the first service type, or the combination thereof and the second traffic type, the second service type, or the combination thereof.

In various embodiments, a same closed loop power control process is configured for a first dynamically scheduled uplink transmission and a second configured grant uplink transmission, in response to a same spatial transmission filter configuration for both the first dynamically scheduled uplink transmission and the second configured grant uplink transmission.

In one embodiment, the closed loop power control configuration includes at least one step size for a transmit power control command and at least one application time for the transmit power control command for each closed loop power control configuration of a plurality of closed loop power control configurations.

In certain embodiments, the at least one step size for the transmit power control command and the at least one application time for the transmit power control command are configured to be based on a grant type, a service type, a traffic type, or some combination thereof corresponding to each closed loop power control configuration of the plurality of closed loop power control configurations.

In some embodiments, step sizes for the transmit power control command configured for an ultra-reliable low-latency communication service are larger than those configured for an enhanced mobile broadband service.

In various embodiments, application times for the transmit power control command configured for an ultra-reliable low-latency communication service are smaller than those configured for an enhanced mobile broadband service.

In one embodiment, step sizes for the transmit power control command configured for a configured grant uplink transmission are larger than those configured for a dynamically scheduled uplink transmission.

In certain embodiments, application times for the transmit power control command configured for a configured grant uplink transmission are smaller than those configured for a dynamically scheduled uplink transmission.

In some embodiments, the method comprises transmitting a second configuration indicating: a new spatial transmission filter to be added to a set of configured spatial transmission filters; a new pathloss estimation reference signal to be added to a set of configured pathloss estimation reference signals; or a combination thereof.

In various embodiments, a current accumulation status of a closed-loop power control corresponding to an existing spatial transmission filter of the set of configured spatial transmission filters is applied to the new spatial transmission filter in response to the new spatial transmission filter having spatial characteristics, quasi-location information, or a combination thereof similar to the existing spatial transmission filter.

In one embodiment, a current accumulation status of a closed-loop power control corresponding to an existing pathloss estimation reference signal of the set of configured pathloss estimation reference signals is applied to the new pathloss estimation reference signal in response to the new pathloss estimation reference signal having spatial characteristics, quasi-location information, or a combination thereof similar to the pathloss estimation reference signal.

In certain embodiments, an accumulation status of a closed-loop power control corresponding to the new spatial transmission filter is reset in response to the new spatial transmission filter having spatial characteristics, quasi-location information, or a combination thereof different from existing spatial transmission filters in the set of configured spatial transmission filters.

In some embodiments, an accumulation status of a closed-loop power control corresponding to the new pathloss estimation reference signal is reset in response to the new pathloss estimation reference signal having spatial characteristics, quasi-location information, or a combination thereof different from existing pathloss estimation reference signals in the set of configured pathloss estimation reference signals.

In various embodiments, in response to a sounding reference signal resource not being tied to a physical uplink shared channel transmission, the closed loop power control configuration comprises one separate closed-loop power control for the sounding reference signal resource.

In one embodiment, in response to a sounding reference signal resource not being tied to a physical uplink shared channel transmission, the closed loop power control configuration comprises no closed-loop power control for the sounding reference signal resource.

In certain embodiments, in response to: a first periodic sounding reference signal resource set for uplink beam management and a second aperiodic sounding reference signal resource set for uplink beam management being associated with a same set of spatial transmission filters; and the closed loop power control configuration comprising a first configured closed loop power control process for the first periodic sounding reference signal resource set; then the closed loop power control configuration comprises the first configured closed loop power control process for the second aperiodic sounding reference signal resource set.

In some embodiments, the first configured closed loop power control process carries over an accumulated power control adjustment state if switching transmission between the first periodic sounding reference signal resource set and the second aperiodic sounding reference signal resource set.

In various embodiments, in response to a third aperiodic sounding reference signal resource set for uplink beam management being associated with a different set of spatial transmission filters than those associated with any periodic sounding reference signal resource sets for uplink beam management, the closed loop power control configuration comprises no closed-loop power control for the third aperiodic sounding reference signal resource set.

In one embodiment, an apparatus comprises: a transmitter that: transmits a first configuration indicating a plurality of bandwidth parts on a first serving cell and configuration information corresponding to the plurality of bandwidth parts, wherein the configuration information comprises an open-loop power control configuration, a closed loop power control configuration, or a combination thereof corresponding to each bandwidth part of the plurality of bandwidth parts; and transmits scheduling information for a first uplink transmission on a first bandwidth part of the plurality of bandwidth parts; and a receiver that receives the first uplink transmission with a first transmission power, wherein the first transmission power is determined based on the configuration information and the scheduling information.

In certain embodiments, the open-loop power control configuration comprises pathloss estimation reference signal information.

In some embodiments, the pathloss estimation reference signal information comprises: a first set of pathloss estimation reference signals for at least one spatial transmit filter corresponding to a transmitted synchronization signal block or physical broadcast channel; a second set of pathloss estimation reference signals for at least one spatial transmit filter corresponding to a physical uplink shared channel configuration, at least one configured sounding reference signal resource for physical uplink shared channel transmission, at least one configured sounding reference signal resource for channel state information acquisition, or a combination thereof; a third set of pathloss estimation reference signals for at least one spatial transmit filter corresponding to at least one channel state information reference signal resource for channel state information acquisition; a fourth set of pathloss estimation reference signals for at least one spatial transmit filter corresponding to at least one configured sounding reference signal resource for an uplink beam management procedure; a fifth set of pathloss estimation reference signals for at least one spatial transmit filter corresponding to a physical uplink control channel configuration; a sixth set of pathloss estimates for at least one network beam configured for a radio link monitoring procedure, a radio link failure procedure, a beam failure recovery procedure, a link recovery procedure, a beam failure detection procedure, a link failure detection procedure, or some combination thereof; or some combination thereof.

In various embodiments, a number of pathloss estimation reference signals simultaneously maintained at a user equipment is bounded by a function corresponding to: a number of transmitted synchronization signal blocks; a number of physical broadcast channels; a number equal to a function, multiple, offset, or combination thereof of a number of spatial transmission filters configured for operation; or some combination thereof.

In one embodiment, the pathloss estimation reference signal information for a physical uplink shared channel comprises the first set of pathloss estimation reference signals, the second set of pathloss estimation reference signals, the third set of pathloss estimation reference signals, the sixth set of pathloss estimation reference signals, or some combination thereof.

In certain embodiments, the pathloss estimation reference signal information for sounding reference signal transmission comprises the first set of pathloss estimation reference signals, the second set of pathloss estimation reference signals, the third set of pathloss estimation reference signals, the fourth set of pathloss estimation reference signals, the sixth set of pathloss estimation reference signals, or some combination thereof.

In some embodiments, the pathloss estimation reference signal information for a physical uplink control channel comprises the first set of pathloss estimation reference signals, the second set of pathloss estimation reference signals, the third set of pathloss estimation reference signals, the fifth set of pathloss estimation reference signals, the sixth set of pathloss estimation reference signals, or some combination thereof.

In various embodiments, the open loop power control configuration comprises a configuration for: an enhanced mobile broadband service; an ultra-reliable low-latency communication service; two uplinks of a supplementary uplink configuration; different spatial transmission filters for uplink transmission; a configured grant operation; or some combination thereof.

In one embodiment, a number of uplink power control configurations is bounded by a number of supported traffic types, a number of supported service types, a number of uplinks per serving cell, a number of spatial transmission filters for uplink transmission, a number of configured grant configurations, or some combination thereof.

In certain embodiments, the closed loop power control configuration is dependent upon at least a set of spatial transmission filters configured for uplink transmission.

In some embodiments, a same closed loop power control process is configured for a first traffic type, a first service type, or a combination thereof and a second traffic type, a second service type, or a combination thereof, in response to a same spatial transmission filter configuration for both the first traffic type, the first service type, or the combination thereof and the second traffic type, the second service type, or the combination thereof.

In various embodiments, a same closed loop power control process is configured for a first dynamically scheduled uplink transmission and a second configured grant uplink transmission, in response to a same spatial transmission filter configuration for both the first dynamically scheduled uplink transmission and the second configured grant uplink transmission.

In one embodiment, the closed loop power control configuration includes at least one step size for a transmit power control command and at least one application time for the transmit power control command for each closed loop power control configuration of a plurality of closed loop power control configurations.

In certain embodiments, the at least one step size for the transmit power control command and the at least one application time for the transmit power control command are configured to be based on a grant type, a service type, a traffic type, or some combination thereof corresponding to each closed loop power control configuration of the plurality of closed loop power control configurations.

In some embodiments, step sizes for the transmit power control command configured for an ultra-reliable low-latency communication service are larger than those configured for an enhanced mobile broadband service.

In various embodiments, application times for the transmit power control command configured for an ultra-reliable low-latency communication service are smaller than those configured for an enhanced mobile broadband service.

In one embodiment, step sizes for the transmit power control command configured for a configured grant uplink transmission are larger than those configured for a dynamically scheduled uplink transmission.

In certain embodiments, application times for the transmit power control command configured for a configured grant uplink transmission are smaller than those configured for a dynamically scheduled uplink transmission.

In some embodiments, the transmitter transmits a second configuration indicating: a new spatial transmission filter to be added to a set of configured spatial transmission filters; a new pathloss estimation reference signal to be added to a set of configured pathloss estimation reference signals; or a combination thereof.

In various embodiments, a current accumulation status of a closed-loop power control corresponding to an existing spatial transmission filter of the set of configured spatial transmission filters is applied to the new spatial transmission filter in response to the new spatial transmission filter having spatial characteristics, quasi-location information, or a combination thereof similar to the existing spatial transmission filter.

In one embodiment, a current accumulation status of a closed-loop power control corresponding to an existing pathloss estimation reference signal of the set of configured pathloss estimation reference signals is applied to the new pathloss estimation reference signal in response to the new pathloss estimation reference signal having spatial characteristics, quasi-location information, or a combination thereof similar to the pathloss estimation reference signal.

In certain embodiments, an accumulation status of a closed-loop power control corresponding to the new spatial transmission filter is reset in response to the new spatial transmission filter having spatial characteristics, quasi-location information, or a combination thereof different from existing spatial transmission filters in the set of configured spatial transmission filters.

In some embodiments, an accumulation status of a closed-loop power control corresponding to the new pathloss estimation reference signal is reset in response to the new pathloss estimation reference signal having spatial characteristics, quasi-location information, or a combination thereof different from existing pathloss estimation reference signals in the set of configured pathloss estimation reference signals.

In various embodiments, in response to a sounding reference signal resource not being tied to a physical uplink shared channel transmission, the closed loop power control configuration comprises one separate closed-loop power control for the sounding reference signal resource.

In one embodiment, in response to a sounding reference signal resource not being tied to a physical uplink shared channel transmission, the closed loop power control configuration comprises no closed-loop power control for the sounding reference signal resource.

In certain embodiments, in response to: a first periodic sounding reference signal resource set for uplink beam management and a second aperiodic sounding reference signal resource set for uplink beam management being associated with a same set of spatial transmission filters; and the closed loop power control configuration comprising a first configured closed loop power control process for the first periodic sounding reference signal resource set; then the closed loop power control configuration comprises the first configured closed loop power control process for the second aperiodic sounding reference signal resource set.

In some embodiments, the first configured closed loop power control process carries over an accumulated power control adjustment state if switching transmission between the first periodic sounding reference signal resource set and the second aperiodic sounding reference signal resource set.

In various embodiments, in response to a third aperiodic sounding reference signal resource set for uplink beam management being associated with a different set of spatial transmission filters than those associated with any periodic sounding reference signal resource sets for uplink beam management, the closed loop power control configuration comprises no closed-loop power control for the third aperiodic sounding reference signal resource set.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   receiving a first configuration indicating a plurality of bandwidth parts on a first serving cell and configuration information corresponding to the plurality of bandwidth parts, wherein the configuration information comprises an open-loop power control configuration, a closed loop power control configuration, or a combination thereof corresponding to each bandwidth part of the plurality of bandwidth parts, and each bandwidth part of the plurality of bandwidth parts comprises a different numerology;
   receiving scheduling information for a first uplink transmission on a first bandwidth part of the plurality of bandwidth parts;
   determining a first transmission power for the first uplink transmission based on the configuration information and the scheduling information; and
   performing the first uplink transmission with the first transmission power.

2. The method of claim 1, further comprising triggering a power headroom report in response to an initial configuration of a bandwidth part of the plurality of bandwidth parts.

3. The method of claim 1, wherein the open-loop power control configuration comprises pathloss estimation reference signal information.

4. The method of claim 3, wherein the pathloss estimation reference signal information comprises:
   a first set of pathloss estimation reference signals for at least one spatial transmit filter corresponding to a transmitted synchronization signal block or physical broadcast channel;
   a second set of pathloss estimation reference signals for at least one spatial transmit filter corresponding to a physical uplink shared channel configuration, at least one configured sounding reference signal resource for physical uplink shared channel transmission, at least one configured sounding reference signal resource for channel state information acquisition, or a combination thereof;
a third set of pathloss estimation reference signals for at least one spatial transmit filter corresponding to at least one channel state information reference signal resource for channel state information acquisition;
a fourth set of pathloss estimation reference signals for at least one spatial transmit filter corresponding to at least one configured sounding reference signal resource for an uplink beam management procedure;
a fifth set of pathloss estimation reference signals for at least one spatial transmit filter corresponding to a physical uplink control channel configuration;
a sixth set of pathloss estimates for at least one network beam configured for a radio link monitoring procedure, a radio link failure procedure, a beam failure recovery procedure, a link recovery procedure, a beam failure detection procedure, a link failure detection procedure, or some combination thereof; or
some combination thereof.

5. The method of claim 1, wherein a number of pathloss estimation reference signals simultaneously maintained at a user equipment is bounded by a function corresponding to:
a number of transmitted synchronization signal blocks;
a number of physical broadcast channels;
a number equal to a function, multiple, offset, or combination thereof of a number of spatial transmission filters configured for operation; or
some combination thereof.

6. The method of claim 1, wherein the open loop power control configuration comprises a configuration for:
an enhanced mobile broadband service;
an ultra-reliable low-latency communication service;
two uplinks of a supplementary uplink configuration;
different spatial transmission filters for uplink transmission;
a configured grant operation; or
some combination thereof.

7. The method of claim 1, wherein a number of uplink power control configurations is bounded by a number of supported traffic types, a number of supported service types, a number of uplinks per serving cell, a number of spatial transmission filters for uplink transmission, a number of configured grant configurations, or some combination thereof.

8. The method of claim 1, wherein the closed loop power control configuration is dependent upon at least a set of spatial transmission filters configured for uplink transmission.

9. The method of claim 1, wherein a same closed loop power control process is configured for a first traffic type, a first service type, or a combination thereof and a second traffic type, a second service type, or a combination thereof, in response to a same spatial transmission filter configuration for both the first traffic type, the first service type, or the combination thereof and the second traffic type, the second service type, or the combination thereof.

10. The method of claim 1, wherein a same closed loop power control process is configured for a first dynamically scheduled uplink transmission and a second configured grant uplink transmission, in response to a same spatial transmission filter configuration for both the first dynamically scheduled uplink transmission and the second configured grant uplink transmission.

11. The method of claim 1, wherein the closed loop power control configuration includes at least one step size for a transmit power control command and at least one application time for the transmit power control command for each closed loop power control configuration of a plurality of closed loop power control configurations.

12. The method of claim 11, wherein the at least one step size for the transmit power control command and the at least one application time for the transmit power control command are configured to be based on a grant type, a service type, a traffic type, or some combination thereof corresponding to each closed loop power control configuration of the plurality of closed loop power control configurations.

13. The method of claim 12, wherein step sizes for the transmit power control command configured for an ultra-reliable low-latency communication service are larger than those configured for an enhanced mobile broadband service.

14. The method of claim 12, wherein application times for the transmit power control command configured for an ultra-reliable low-latency communication service are smaller than those configured for an enhanced mobile broadband service.

15. The method of claim 12, wherein step sizes for the transmit power control command configured for a configured grant uplink transmission are larger than those configured for a dynamically scheduled uplink transmission.

16. The method of claim 12, wherein application times for the transmit power control command configured for a configured grant uplink transmission are smaller than those configured for a dynamically scheduled uplink transmission.

17. The method of claim 1, further comprising receiving a second configuration indicating: a new spatial transmission filter to be added to a set of configured spatial transmission filters; a new pathloss estimation reference signal to be added to a set of configured pathloss estimation reference signals; or a combination thereof.

18. The method of claim 17, wherein a current accumulation status of a closed-loop power control corresponding to an existing spatial transmission filter of the set of configured spatial transmission filters is applied to the new spatial transmission filter in response to the new spatial transmission filter having spatial characteristics, quasi-location information, or a combination thereof similar to the existing spatial transmission filter.

19. The method of claim 17, wherein a current accumulation status of a closed-loop power control corresponding to an existing pathloss estimation reference signal of the set of configured pathloss estimation reference signals is applied to the new pathloss estimation reference signal in response to the new pathloss estimation reference signal having spatial characteristics, quasi-location information, or a combination thereof similar to the pathloss estimation reference signal.

20. The method of claim 1, wherein, in response to a sounding reference signal resource not being tied to a physical uplink shared channel transmission, the closed loop power control configuration comprises one separate closed-loop power control for the sounding reference signal resource.

21. The method of claim 1, wherein, in response to a sounding reference signal resource not being tied to a physical uplink shared channel transmission, the closed loop power control configuration comprises no closed-loop power control for the sounding reference signal resource.

22. The method of claim 1, wherein, in response to:
a first periodic sounding reference signal resource set for uplink beam management and a second aperiodic sounding reference signal resource set for uplink beam management being associated with a same set of spatial transmission filters; and the closed loop power control configuration comprising a first configured closed loop power control process for the first periodic sounding reference signal resource set;

then the closed loop power control configuration comprises the first configured closed loop power control process for the second aperiodic sounding reference signal resource set.

23. The method of claim 22, wherein the first configured closed loop power control process carries over an accumulated power control adjustment state if switching transmission between the first periodic sounding reference signal resource set and the second aperiodic sounding reference signal resource set.

24. The method of claim 1, wherein, in response to a third aperiodic sounding reference signal resource set for uplink beam management being associated with a different set of spatial transmission filters than those associated with any periodic sounding reference signal resource sets for uplink beam management, the closed loop power control configuration comprises no closed-loop power control for the third aperiodic sounding reference signal resource set.

25. An apparatus comprising:

a receiver that:
   receives a first configuration indicating a plurality of bandwidth parts on a first serving cell and configuration information corresponding to the plurality of bandwidth parts, wherein the configuration information comprises an open-loop power control configuration, a closed loop power control configuration, or a combination thereof corresponding to each bandwidth part of the plurality of bandwidth parts, and each bandwidth part of the plurality of bandwidth parts comprises a different numerology; and
   receives scheduling information for a first uplink transmission on a first bandwidth part of the plurality of bandwidth parts; and a processor that:
   determines a first transmission power for the first uplink transmission based on the configuration information and the scheduling information; and
   performs the first uplink transmission with the first transmission power.

* * * * *